(12) United States Patent
Isozaki et al.

(10) Patent No.: US 7,885,509 B2
(45) Date of Patent: Feb. 8, 2011

(54) INFORMATION PROCESSING SYSTEM, INFORMATION PROCESSING METHOD, AND COMPUTER PROGRAM

(75) Inventors: Masaaki Isozaki, Kanagawa (JP); Yuichi Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 1152 days.

(21) Appl. No.: 11/061,877

(22) Filed: Feb. 18, 2005

(65) Prior Publication Data
US 2005/0185931 A1  Aug. 25, 2005

(30) Foreign Application Priority Data
Feb. 24, 2004 (JP) ............................ P2004-048682

(51) Int. Cl.
  *H04N 5/91* (2006.01)
(52) U.S. Cl. ............................ 386/83; 386/95; 386/125
(58) Field of Classification Search ................... 386/95, 386/125, 83
See application file for complete search history.

(56) References Cited

U.S. PATENT DOCUMENTS

| | | | |
|---|---|---|---|
| 5,816,920 A * | 10/1998 | Hanai ........................... | 463/42 |
| 6,240,240 B1 * | 5/2001 | Nagano et al. ................. | 386/83 |
| 7,035,363 B1 * | 4/2006 | Ikeda .......................... | 375/356 |
| 2002/0044764 A1 * | 4/2002 | Akamatsu et al. ............. | 386/92 |
| 2002/0097986 A1 * | 7/2002 | Matoba et al. ................ | 386/83 |
| 2003/0106071 A1 | 6/2003 | Akamatsu et al. | |
| 2003/0108328 A1 | 6/2003 | Kawasaki et al. | |
| 2004/0117831 A1 * | 6/2004 | Ellis et al. ..................... | 725/53 |
| 2005/0076288 A1 * | 4/2005 | Poslinski .................... | 715/500 |

FOREIGN PATENT DOCUMENTS

| | | |
|---|---|---|
| EP | 0924927 | 6/1999 |
| EP | 1189390 | 3/2002 |
| JP | 09-065270 | 7/1997 |
| JP | 11-126193 | 5/1999 |
| JP | 11-177919 | 7/1999 |
| JP | 11-259926 | 9/1999 |

(Continued)

OTHER PUBLICATIONS

Japanese Office Action issued on Mar. 2, 2010 for corresponding Japanese patent application 2004-048682.

(Continued)

*Primary Examiner*—Thai Tran
*Assistant Examiner*—Girumsew Wendmagegn
(74) *Attorney, Agent, or Firm*—K&L Gates LLP

(57) ABSTRACT

A system and method is disclosed by which two or more information processing apparatus having a recording reservation function are linked in recording reservation setting to each other. The information processing apparatus exchange schedule information such as recording reservations with each other. The recording reservation program information of all of the information processing apparatus are displayed in a merged form on a GUI of any of the information processing apparatus. When a user wants to reserve a number of programs for recording within the same time zone, the user can confirm, on the GUI of a particular information processing apparatus, a recording reservation situation of another information processing apparatus or an unoccupied situation of an external recording section and perform setting of a reservation for a further information processing apparatus.

30 Claims, 36 Drawing Sheets

FOREIGN PATENT DOCUMENTS

| | | |
|---|---|---|
| JP | 2000-278639 | 10/2000 |
| JP | 2002-084484 | 3/2002 |
| JP | 2002-157821 | 5/2002 |
| JP | 2002-218364 | 8/2002 |
| JP | 2003-092711 | 3/2003 |
| JP | 2003-199004 | 7/2003 |
| JP | 2003-199011 | 7/2003 |
| JP | 2006-229792 | 8/2006 |

OTHER PUBLICATIONS

Japanese Search Report issued on Nov. 10, 2009 for corresponding Application No. JP2004-048682.

Japanese Office Action for corresponding JP 2004-048682 issued on Jun. 15, 2010.

* cited by examiner

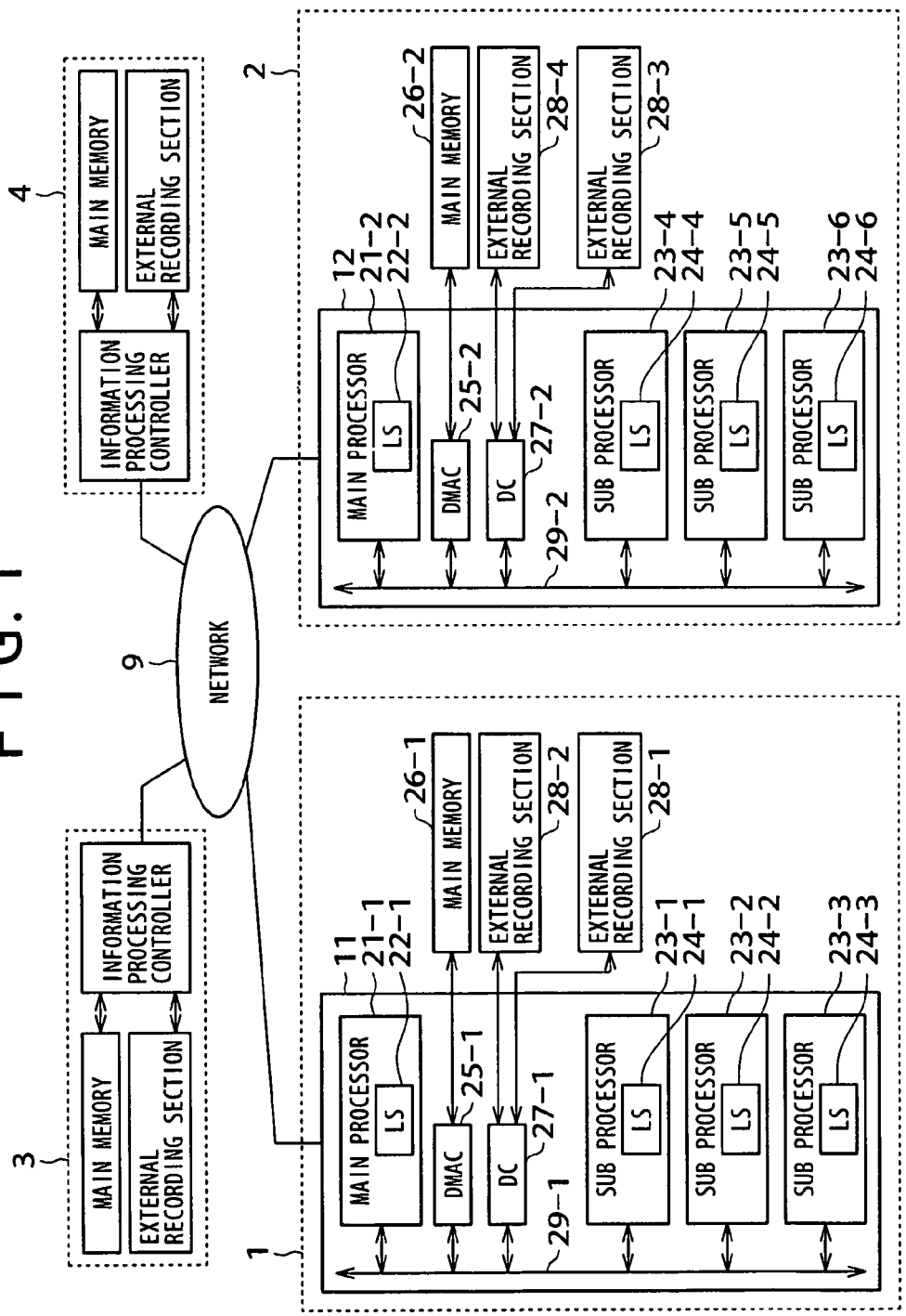

FIG. 2A
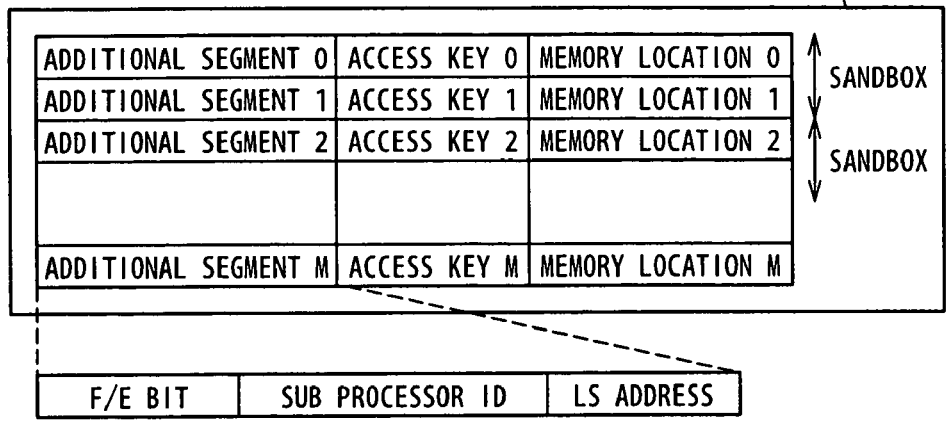
FIG. 2B
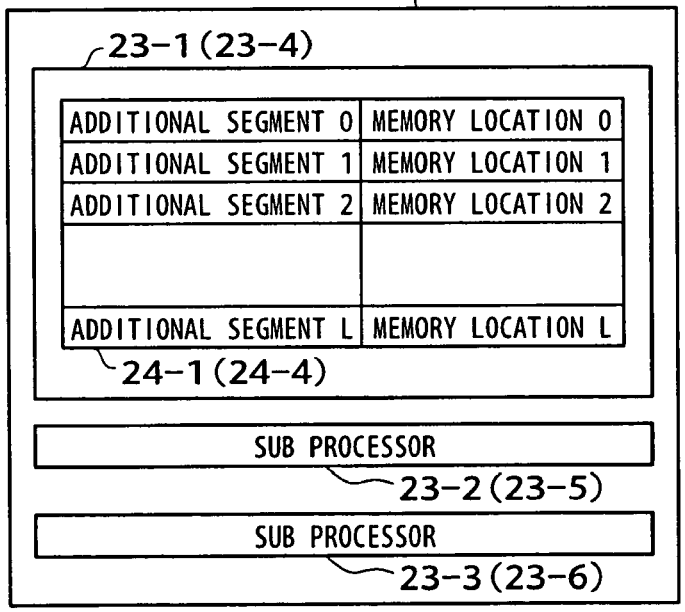
FIG. 2C
KEY MANAGEMENT TABLE
| SUB PROCESSOR ID | | |
|---|---|---|
| 0 | SUB PROCESSOR KEY 0 | KEY MASK 0 |
| 1 | SUB PROCESSOR KEY 1 | KEY MASK 1 |
| 2 | SUB PROCESSOR KEY 2 | KEY MASK 2 |
| | | |
| N | SUB PROCESSOR KEY N | KEY MASK N |

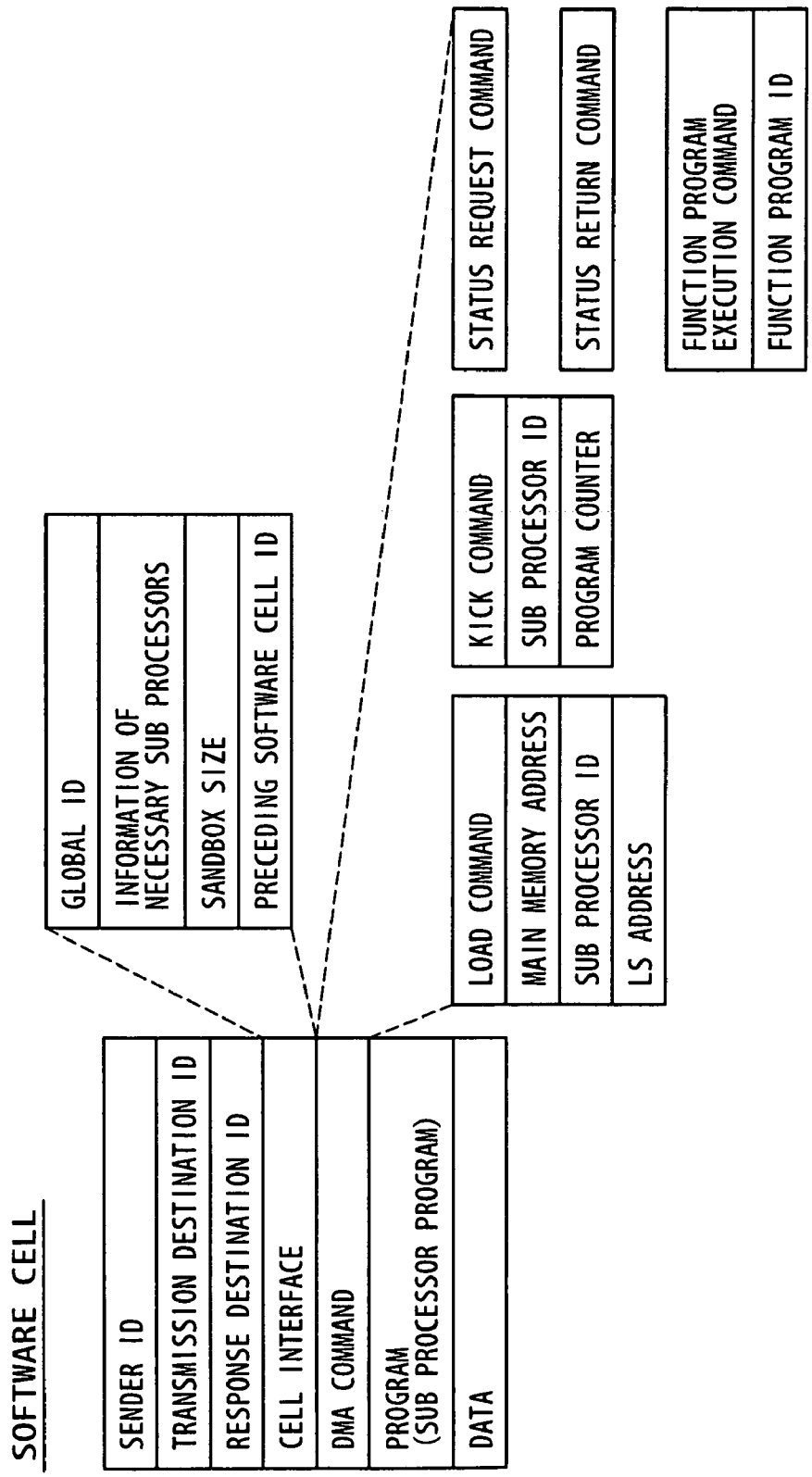

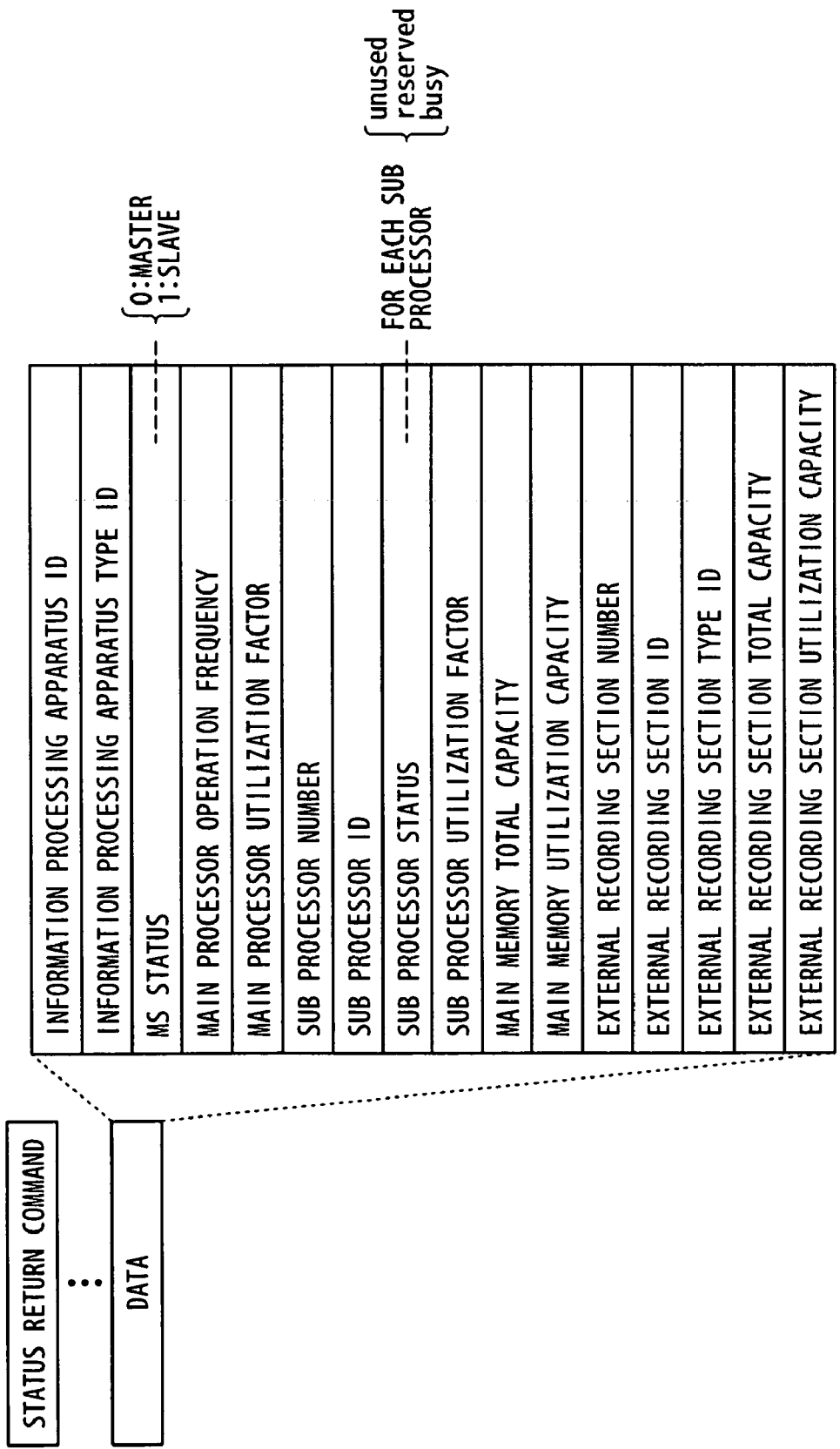

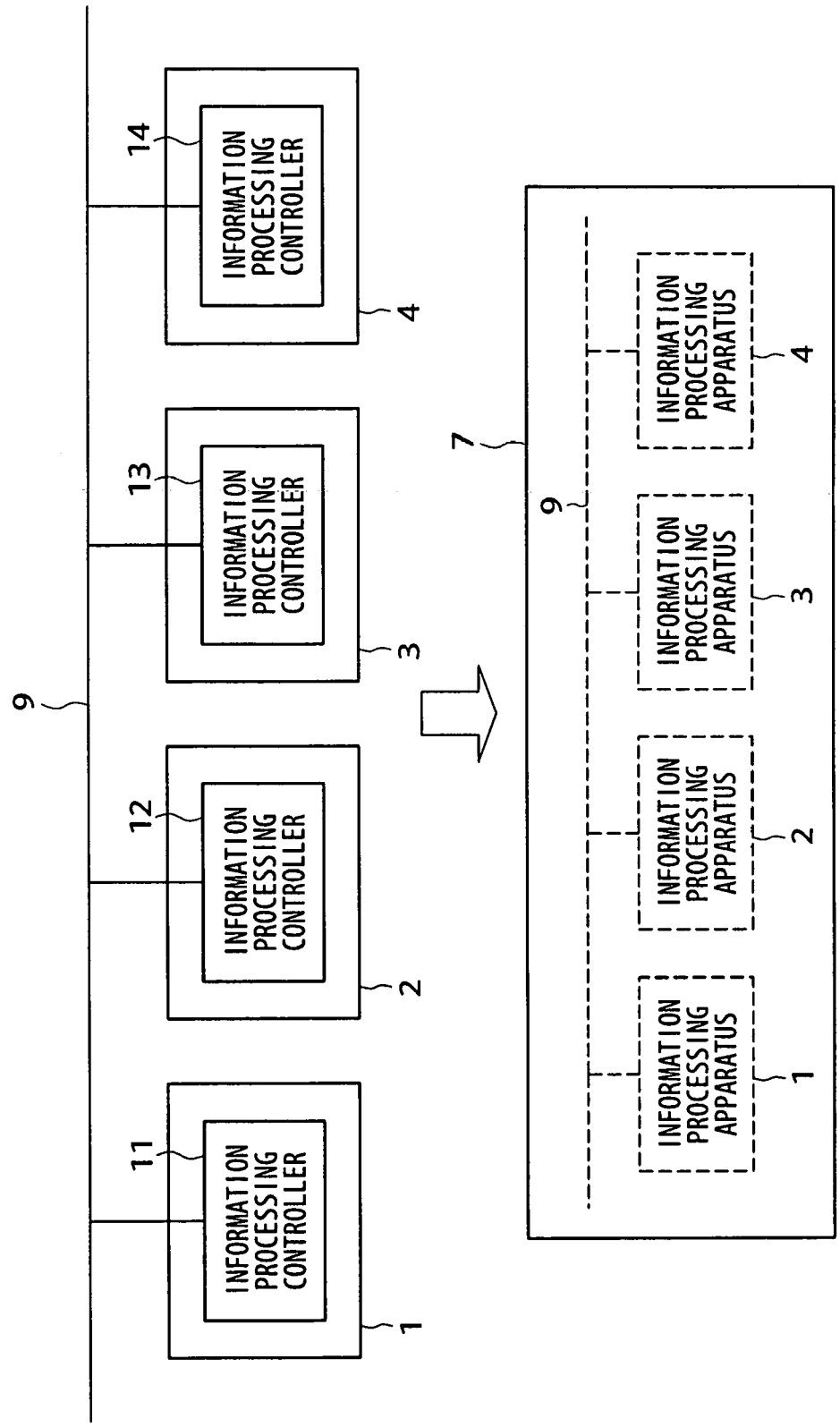

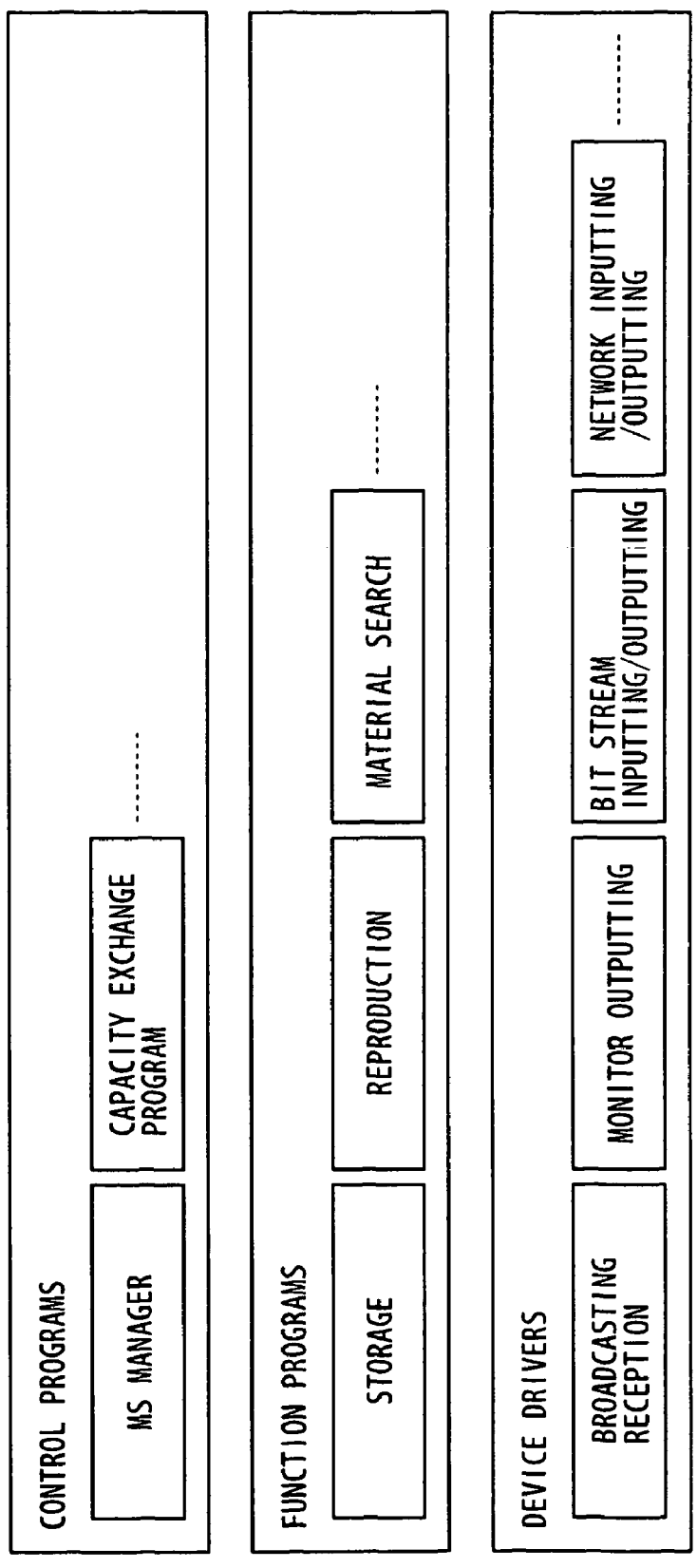

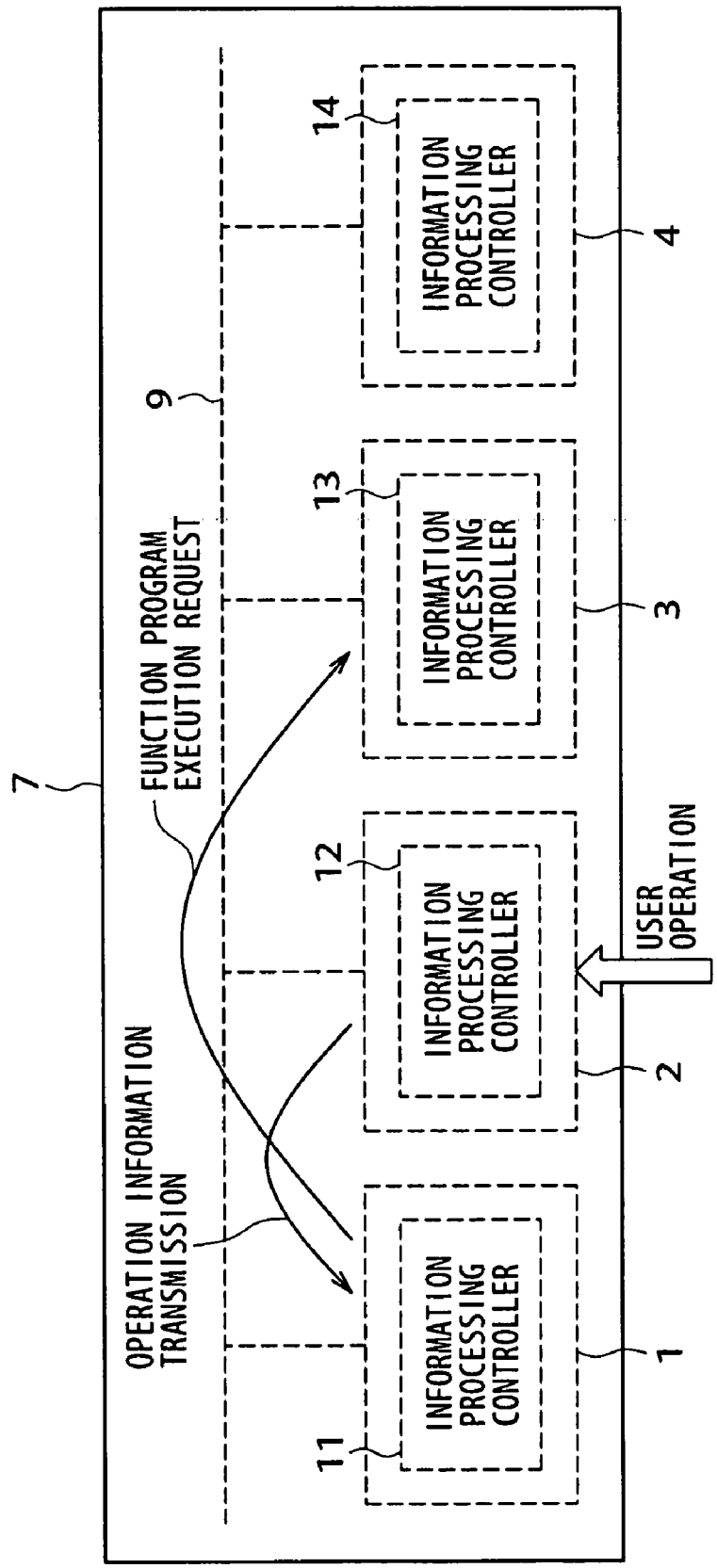

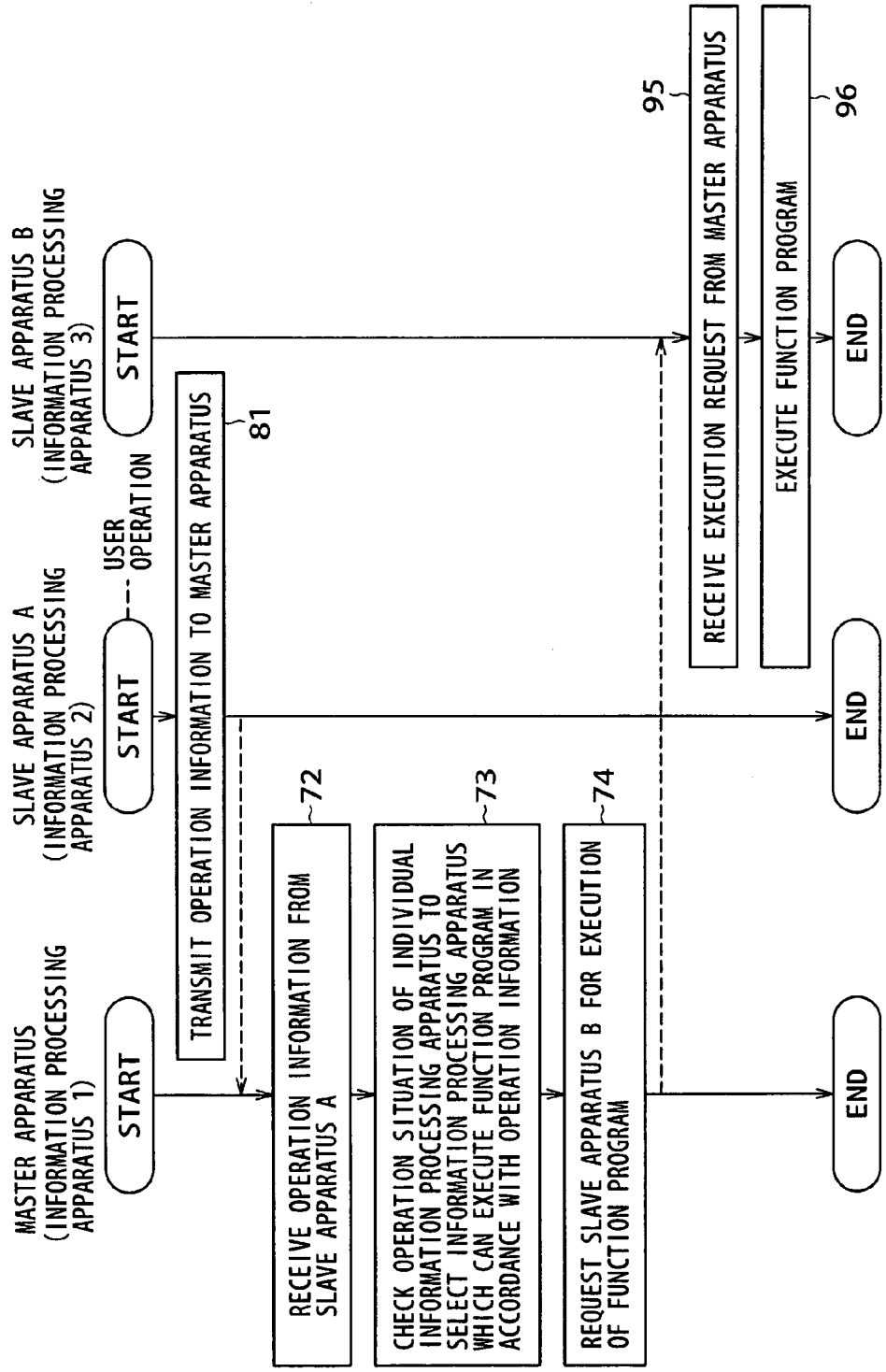

SOFTWARE CONFIGURATION OF INFORMATION PROCESSING CONTROLLER 14 (INFORMATION PROCESSING APPARATUS 4)

FIG. 16
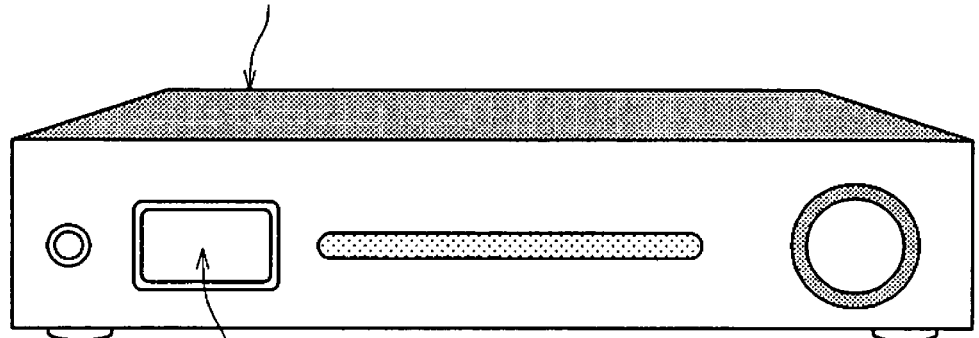
INFORMATION PROCESSING APPARATUS
HAVING RECORDING RESERVATION FUNCTION
LIQUID CRYSTAL DISPLAY SECTION
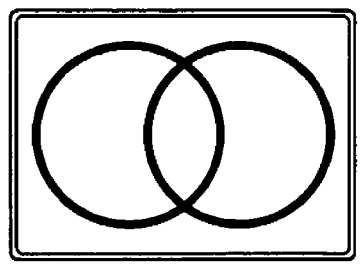
SOLE OPERATION
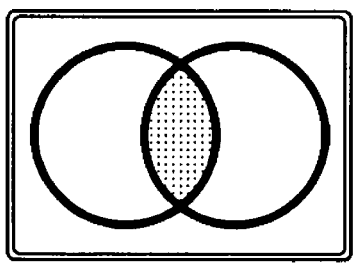
COOPERABLE
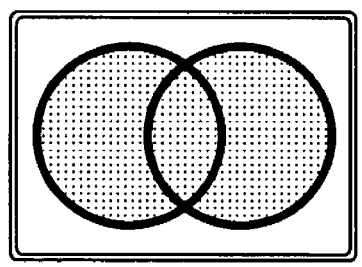
IN COOPERATION

FIG. 17

| RESERVATION DAY | START TIME | END TIME | CHANNEL | RECORDING MODE | GENRE | INFORMATION PROCESSING APPARATUS NAME |
|---|---|---|---|---|---|---|
| TUE/APR/15 | 19:00 | ~ 22:00 | 8ch | SP | BASEBALL | PSX1 |
| TUE/APR/15 | 19:00 | ~ 20:00 | 4ch | LP | ANIMATION | PSX2 |
| TUE/APR/15 | 20:00 | ~ 21:00 | 10ch | SP | DRAMA | PSX2 |
| TUE/APR/15 | 21:00 | ~ 22:00 | 6ch | LP | VARIETY | PSX2 |
| WED/APR/16 | 20:00 | ~ 21:00 | 8ch | LP | DRAMA | PSX1 |

| APPARATUS INFORMATION |
|---|

| |
|---|
| INFORMATION PROCESSING APPARATUS ID |
| INFORMATION PROCESSING APPARATUS TYPE ID |
| MS STATUS |
| MAIN PROCESSOR OPERATION FREQUENCY |
| MAIN PROCESSOR UTILIZATION FACTOR |
| SUB PROCESSOR NUMBER |
| SUB PROCESSOR ID |
| SUB PROCESSOR STATUS |
| SUB PROCESSOR UTILIZATION FACTOR |
| MAIN MEMORY TOTAL CAPACITY |
| MAIN MEMORY UTILIZATION CAPACITY |
| EXTERNAL RECORDING SECTION NUMBER |
| EXTERNAL RECORDING SECTION ID |
| EXTERNAL RECORDING SECTION TYPE ID |
| EXTERNAL RECORDING SECTION TOTAL CAPACITY |
| EXTERNAL RECORDING SECTION UTILIZATION CAPACITY |

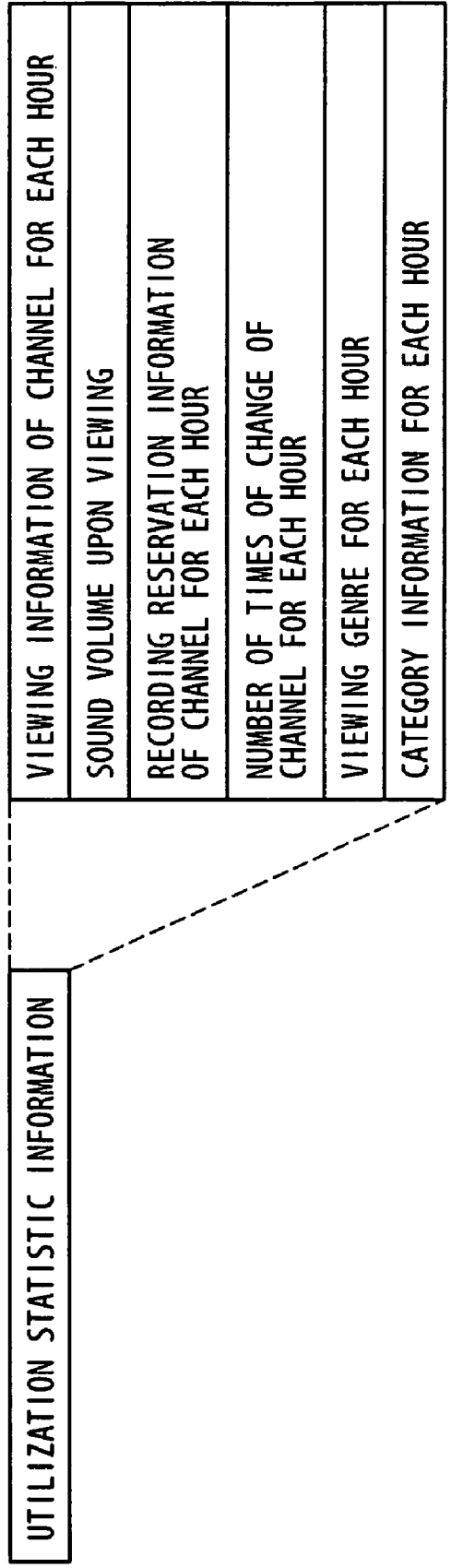

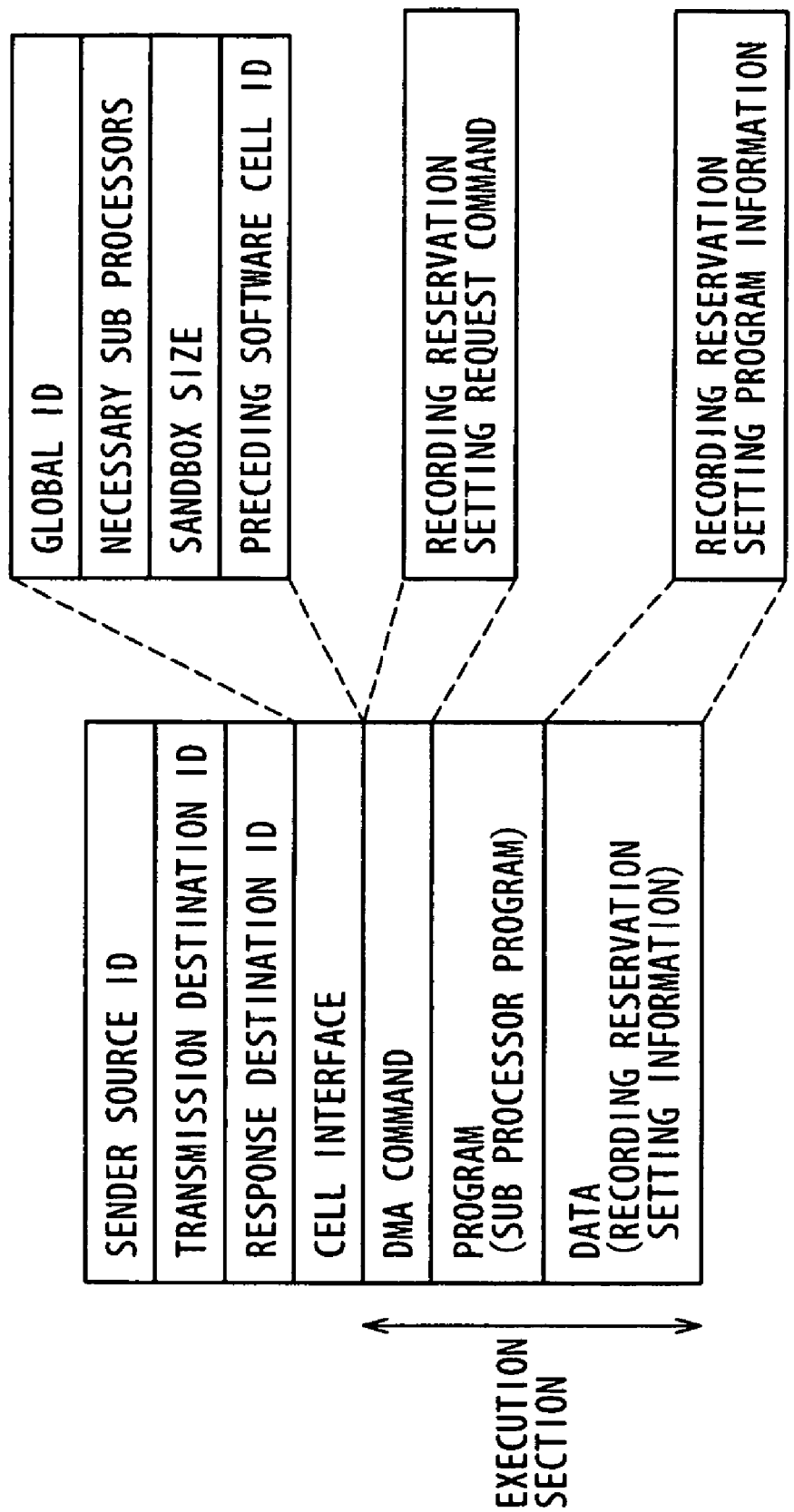

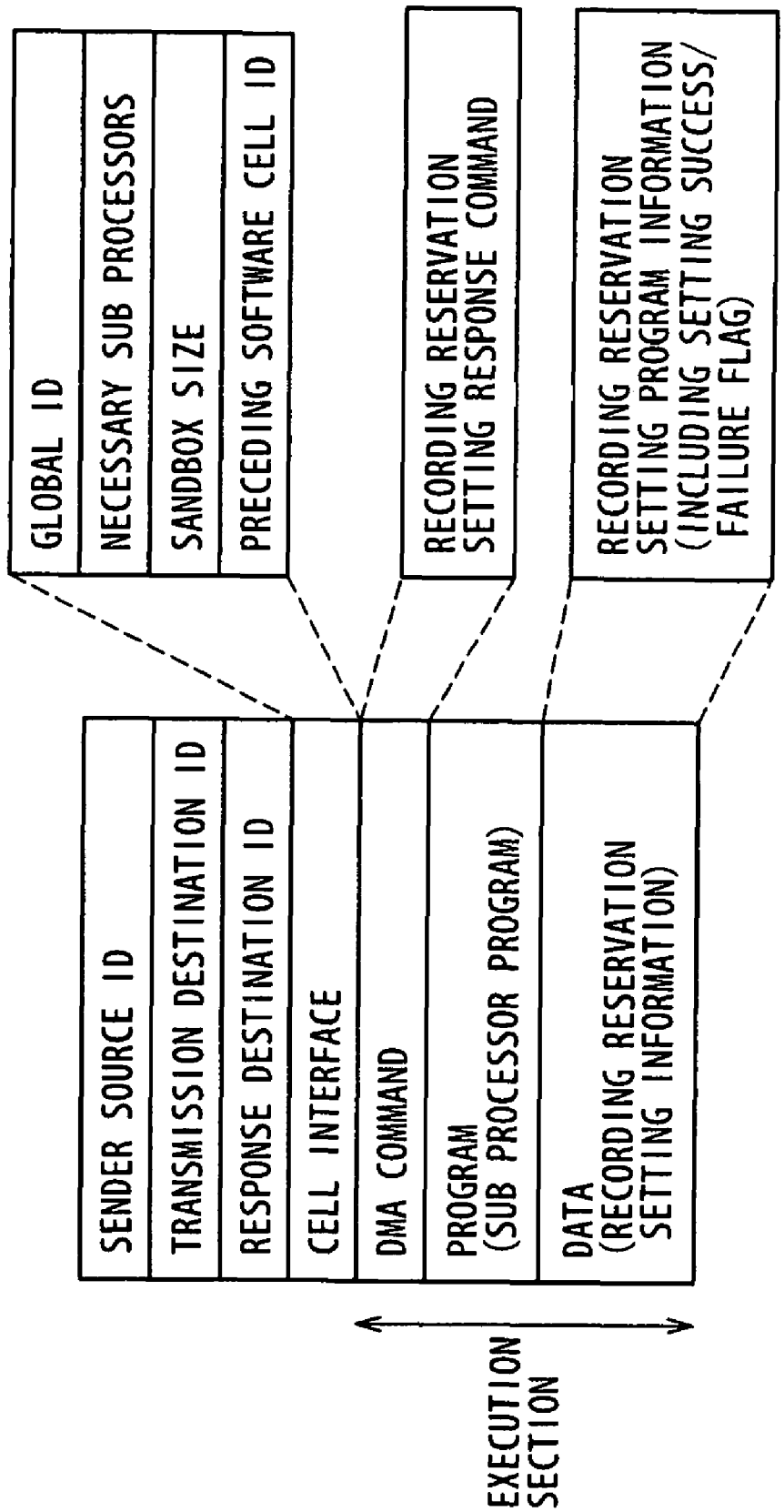

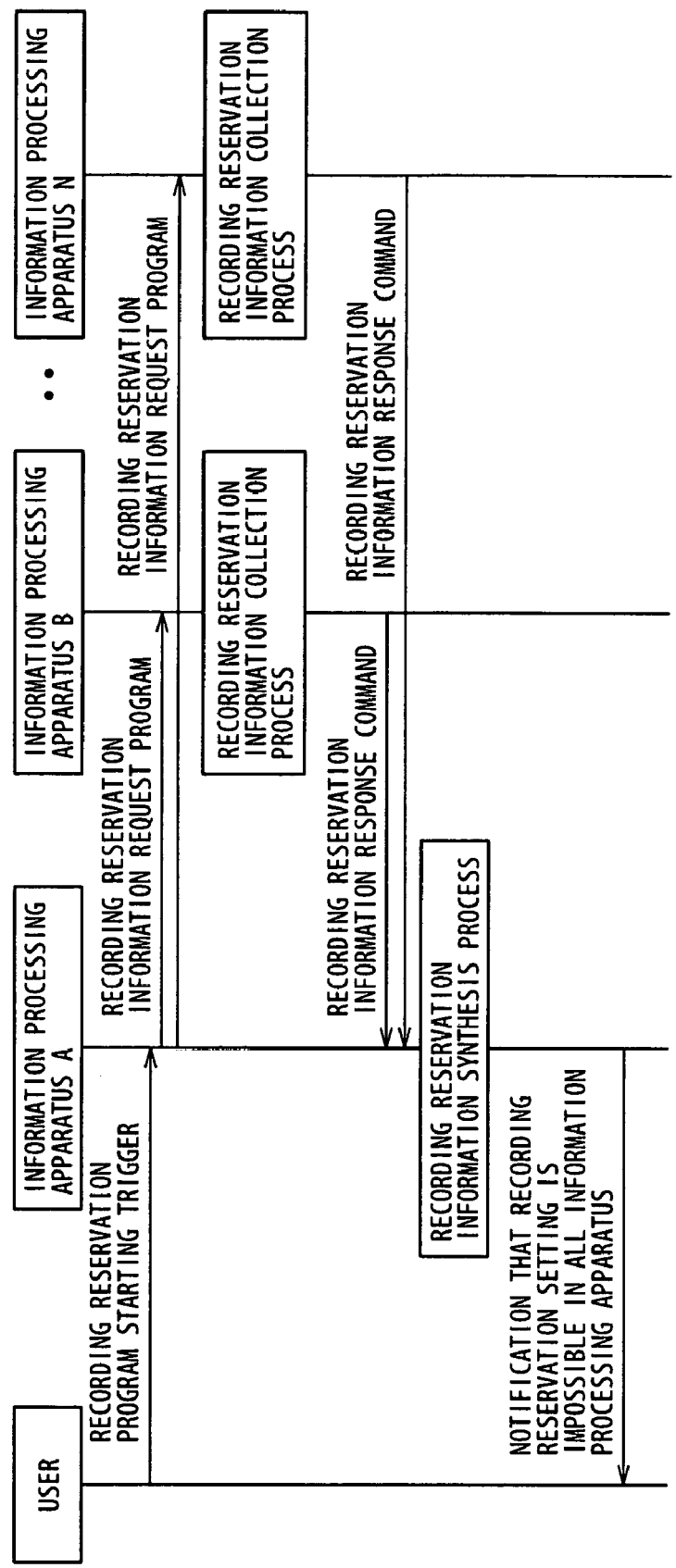

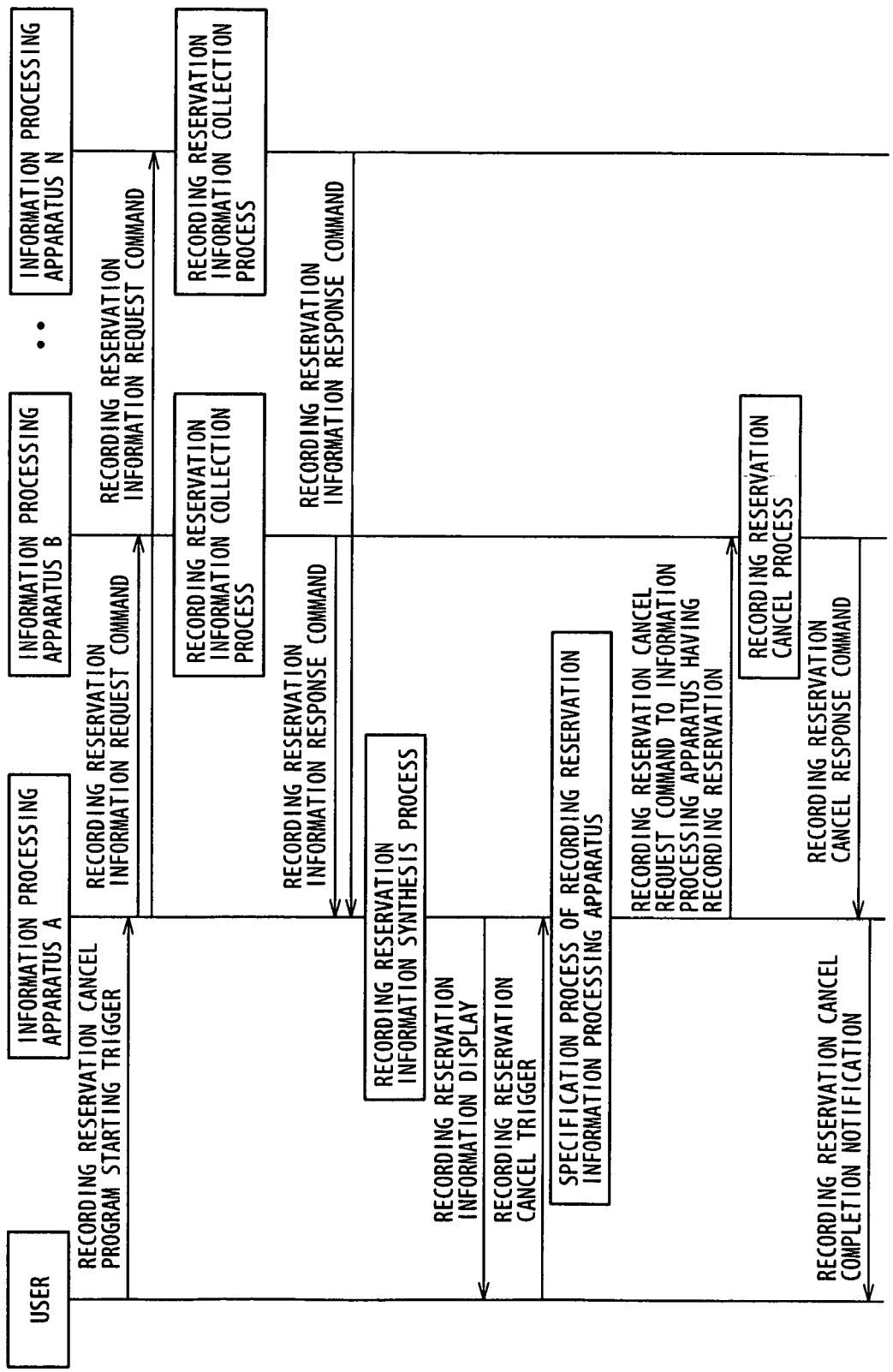

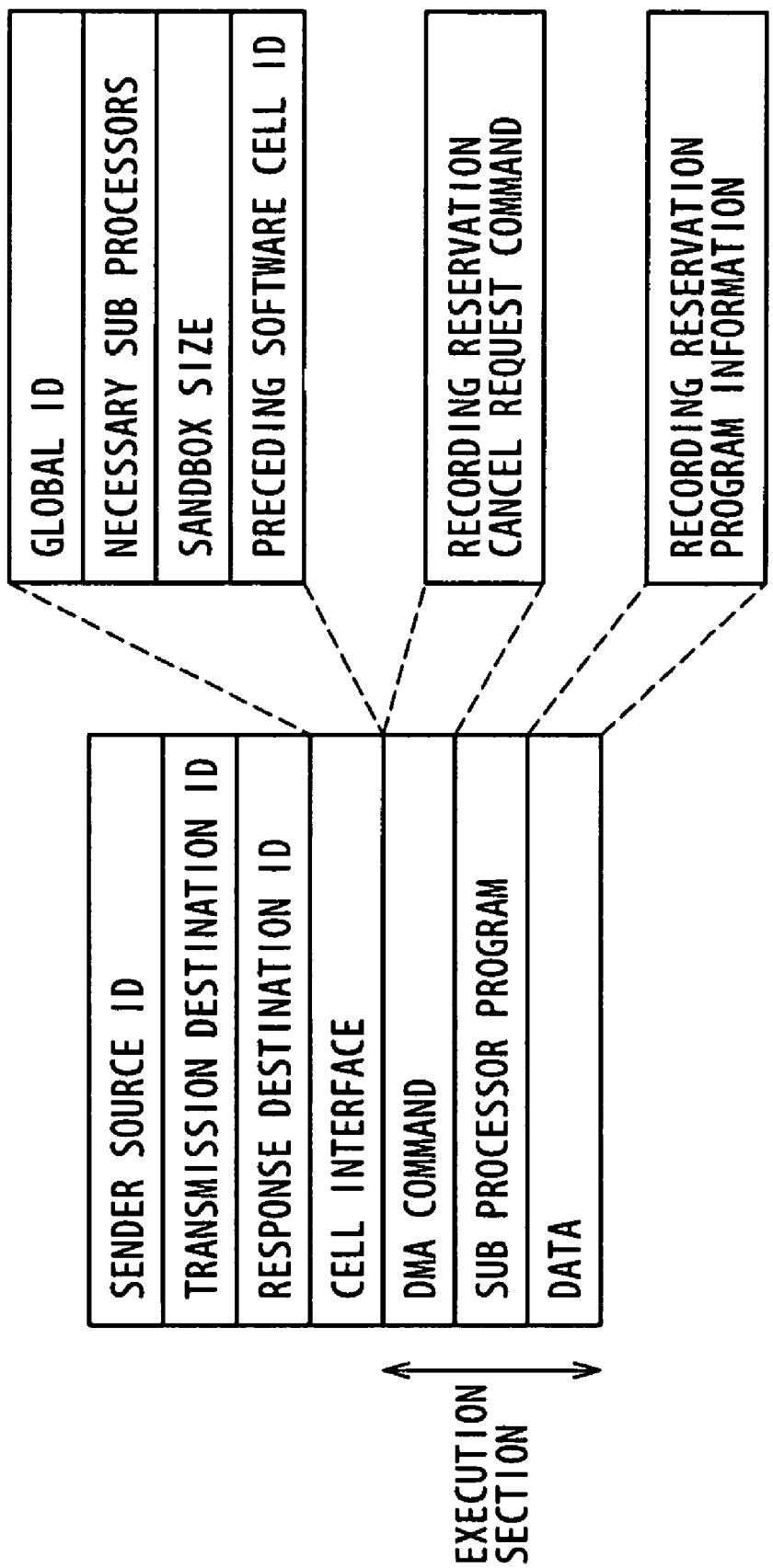

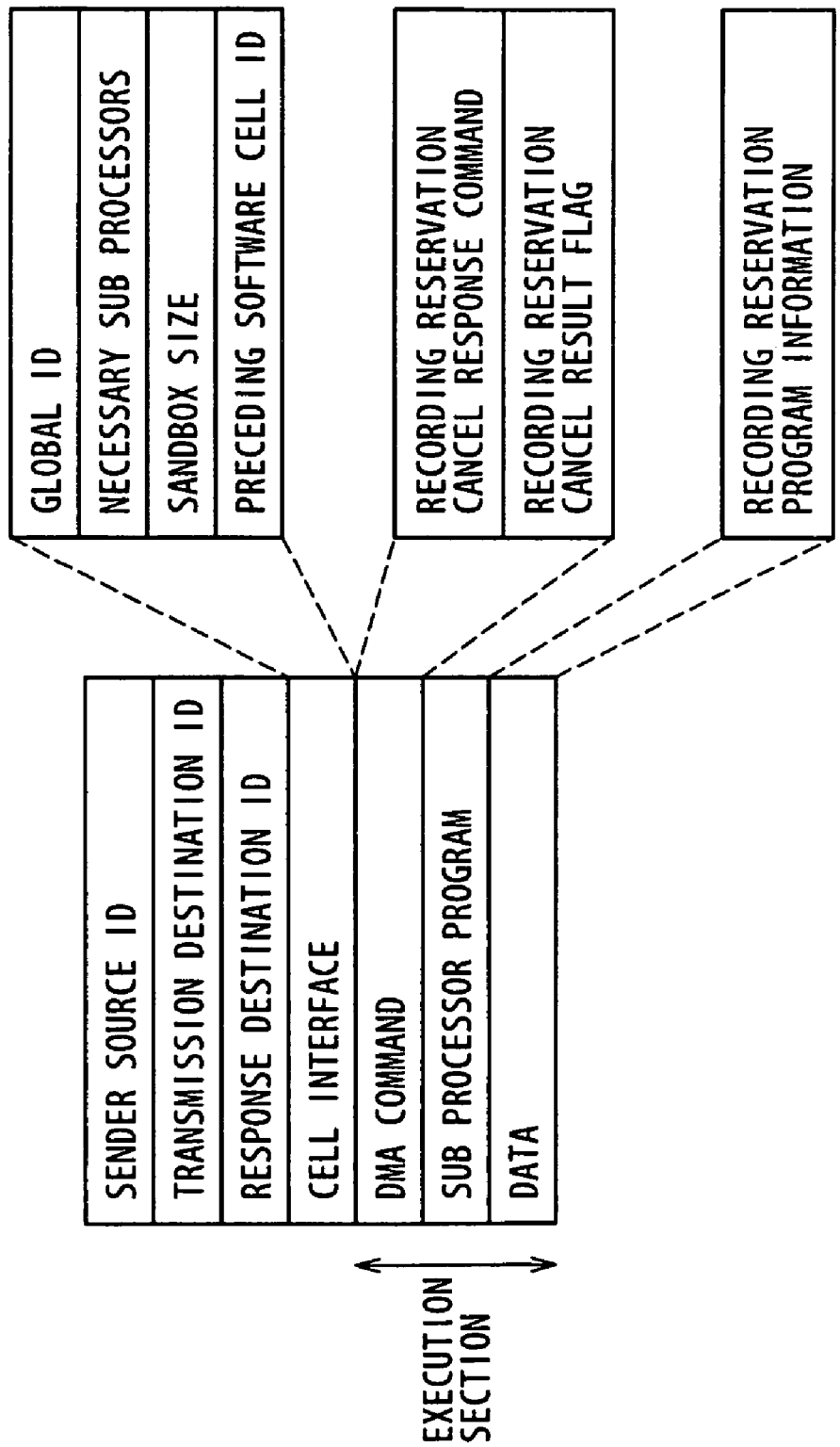

FIG. 36

| RESERVATION DAY | START TIME | END TIME | CHANNEL | RECORDING MODE | GENRE |
|---|---|---|---|---|---|
| TUE/APR/15 | 19:00 | ~ 22:00 | 8ch | SP | BASEBALL |

FIG. 37

| TUE/APR/15 | 19:00 ~ 22:00 | 8ch | SP | BASEBALL | PSX1 |
| WED/APR/16 | 20:00 ~ 21:00 | 8ch | LP | DRAMA | PSX1 |

INFORMATION PROCESSING SYSTEM, INFORMATION PROCESSING METHOD, AND COMPUTER PROGRAM

BACKGROUND OF THE INVENTION

The present invention relates to an information processing system, an information processing method and a computer program wherein two or more apparatus connected to each other by a network are linked in operation with each other and, more particularly, to an information processing system, an information processing method and a computer program wherein two or more information processing apparatus connected to each other by a network are linked in operation with each other.

Specifically, the present invention relates to an information processing system, an information processing method and a computer program wherein two or more apparatus having a reservation recording function are linked in reservation recording setting operation with each other through a home network and, even more particularly, to an information processing system, an information processing method and a computer program wherein reservation recording operations of different apparatus individually set at different places are simplified and facilitated.

It is known to implement the sharing of information resources, sharing of hardware resources and collaboration among a number of users by connecting a number of computers to each other by a network. A LAN (Local Area Network), a WAN (Wide Area Network), the Internet and so forth are known as connection media between a number of users.

Recently, techniques of a computer and a network have been and are entering deeply into general homes. Various information apparatus in a home such as a personal computer and a PDA (Personal Digital Assistant), AV apparatus such as a television receiver and a video reproduction apparatus, various information appliances, CE (Consumer Electronics) apparatus and so forth are connected to each other by a home network. Further, such a home network as just mentioned is, in most cases, connected to an external wide area network beginning with the Internet through a router.

Although a utilization form that a number of AV apparatus are connected on a home network in this manner is supposed, the utilization form has a problem that sufficient cooperation is not established between a number of AV apparatus.

For example, where two or more AV apparatus such as a video cassette deck, a DVD apparatus and a hard disk drive (HDD) are installed in a home (including a case wherein an AV apparatus has a multiple tuner function of allowing reception and/or recording of a number of channels at a time), a first program and a second program having reservation time bands which overlap with each other can be recorded at a time.

However, although most AV apparatus which incorporate such recording media as described above have a reservation recording function for a television broadcast and other contents which are distributed in accordance with a time schedule, where two such AV apparatus exist on a home network, they do not cooperate with each other.

For example, when a user tries to set a recording reservation on a certain AV apparatus, the user cannot know whether or not a recording reservation of the same program exists on another AV apparatus. Reserved recording of the same program on a number of AV apparatus results in useless consumption of media. Further, if a user tries to make a recording reservation on one of a number of AV apparatus and finds out that the medium of the AV apparatus does not have a free area, then since it is unknown to the user whether or not a second one of the AV apparatus has a free area, the user must move to the location of the second AV apparatus and perform a recording reservation perform newly. Thus, complicated operation is required.

Usually, such a reservation information setting screen as shown in FIG. 36 is presented on an AV apparatus. A user can perform a setting operation for reserved recording through the reservation information setting screen. Further, such a reservation information confirmation screen as shown in FIG. 37 is presented, and the user can confirm the contents of the recording reservation through the reservation information confirmation screen.

However, reservation information is managed independently on a number of AV apparatus, wherein such a reservation information setting screen and a reservation information confirmation screen as described above represent mere information only on the single AV apparatus which is being operated.

Therefore, for example, if a user tries to set a recording reservation for two programs in the same time zone, then since the reservation screen on the second AV apparatus cannot be known from the setting screen of the first AV apparatus, in order to confirm the status regarding whether or not the second AV apparatus has a free area, it is necessary to open the reservation confirmation or setting screen on the second AV apparatus and perform setting on the screen. In other words, in such an instance, it is necessary to open different reservation screens on the two AV apparatus and perform reservation setting separately on the reservation screens. Where two such AV apparatus are provided at separate places, the reservation setting operations are considerably cumbersome to the user.

For example, a recording and reproduction system is disclosed in Japanese Patent Laid-Open No. Hei 11-259926 (hereinafter referred to as Patent Document 1) wherein a number of recording and reproduction apparatus are used to make a recording reservation of a number of programs efficiently while saving labor as far as possible. However, the recording and reproduction system does not have a countermeasure for facilitation and simplification of recording reservation operations for different recording and reproduction apparatus where the apparatus are provided at different places.

As an increase of channels proceeds together with the development of broadcasting enterprises such as BS broadcasting, CS broadcasting and ground wave digital broadcasting, the needs to simultaneously record different programs whose reservation times overlap with each other are increasing. Thus, it is estimated that the demand for cooperation of reservation recording functions and simultaneous or synchronous reproduction functions by different apparatus connected to each other by a home network increases more and more.

Additional features and advantages of the present invention are described in, and will be apparent from, the following Detailed Description of the Invention and the Figures.

SUMMARY OF THE INVENTION

The present invention seeks to provide an information processing system, an information processing method and a computer program by which two or more information processing apparatus connected by a network to each other can be linked in operation suitably.

The present invention also seeks to provide an information processing system, an information processing method and a computer program wherein two or more apparatus having a recording reservation function can be linked suitably in recording reservation setting through a network.

The present invention further seeks to provide an information processing system, an information processing method and a computer program wherein recording reservation operations on different apparatus set at different places from each other can be performed simply and readily.

In order to attain these, according to an embodiment of the present invention, there is provided an information processing system wherein a number of apparatus having a recording reservation function cooperate with each other on a network, including a recording reservation information collection section for acquiring recording reservation information of the apparatus, a recording reservation information synthesis section for synthesizing the acquired recording reservation information of the apparatus, and a recording reservation information display section for displaying the recording reservation information of the apparatus in a merged form on the same recording reservation information presentation screen.

It is to be noted here that the term "system" is used to represent a logical set apparatus composed of a number of apparatus or a number of modules for implementing predetermined functions, which may be included in the same housing or provided discretely.

For example, in such an environment that network techniques enter deeply in everyday life, AV apparatus such as an HD recorder installed in a home and having a recording reservation function and other CE apparatus are connected to each other by a home network. Conventionally, if a user wants to make a recording reservation of a certain program, the user would operate one of the information processing apparatus on the network.

According to the present invention, cooperative operation between apparatus connected to each other by a network is implemented, and the multiple information processing apparatus operate virtually as a single apparatus.

In the information processing system, reservation information of all of the apparatus is displayed in a merged form on a GUI screen. Accordingly, while the user operates one of the apparatus, the user may consider the multiple CE apparatus on the home network virtually as a single apparatus to perform setting operation of a recording reservation. Consequently, the operability is enhanced significantly. Further, when the user wants to set reservations of a number of programs within the same time zone, the user can confirm, on the GUI of the particular apparatus, a reservation situation of another apparatus or an unoccupied situation of a disk and perform setting of a reservation for a further apparatus.

According to another embodiment of the present invention, there is provided an information processing method for allowing a number of apparatus having a recording reservation function to cooperate with each other on a network, including a recording reservation information collection step of acquiring recording reservation information of the apparatus, a recording reservation information synthesis step of synthesizing the acquired recording reservation information of the apparatus, and a recording reservation information display step of displaying the recording reservation information of the apparatus in a merged form on a same recording reservation information presentation screen.

According to a further embodiment of the present invention, there is provided a computer program described in a computer-readable form for causing a computer system to execute a process for allowing a number of apparatus having a recording reservation function to cooperate with each other on a network, including a recording reservation information collection step of acquiring recording reservation information of the apparatus, a recording reservation information synthesis step of synthesizing the acquired recording reservation information of the apparatus, a recording reservation information display step of displaying the recording reservation information of the apparatus in a merged form on a same recording reservation information presentation screen, and a user inputting step of inputting a request from a user regarding a recording reservation through the recording reservation information presentation screen.

The computer program defines a computer program described in a computer-readable form so that a predetermined process may be implemented on a computer system. In other words, where the computer program is installed into a computer system, cooperative operation is exhibited on the computer program, and advantages similar to those provided by the information processing system of the present invention can be achieved.

In summary, with the information processing system and method and the computer program, it is possible to allow two or more CE apparatus connected to each other by a home network to cooperate suitably in operation with each other.

Further, with the information processing system and method and the computer program, it is possible to allow recording reservation setting on two or more apparatus having a recording reservation function to be performed suitably in a cooperative relationship with each other through a home network.

Further, with the information processing system and method and the computer program, recording reservation operation on each of apparatus set at different places from each other connected to each other by a network can be performed simply and easily.

Furthermore, with the information processing system and method and the computer program, if a user wants, for example, to set recording reservations of two programs within the same time zone, it is possible to perform reservation setting for the second AV apparatus if the user opens a reservation setting screen on the first AV apparatus and performs setting operation. Therefore, the usability is enhanced significantly.

Additional features and advantages of the present invention are described in, and will be apparent from, the following Detailed Description of the Invention and the Figures.

BRIEF DESCRIPTION OF THE FIGURES

FIG. 1 is a block diagram showing a configuration of a network system to which the present invention is applied.

FIGS. 2A, 2B and 2C are views illustrating an accessing procedure from a sub-processor to a main memory in the network system of FIG. 1.

FIG. 3 is a view showing an example of a configuration of a software cell.

FIG. 4 is a view illustrating a data area of a software cell where a DMA command is a status returning command.

FIG. 5 is a diagrammatic view showing a number of information processing apparatus in a manner wherein they operate as a virtual single information processing apparatus.

FIG. 6 is a diagrammatic view illustrating an example of a software configuration of an information processing controller.

FIG. 7 is a diagrammatic view showing four information processing apparatus in a manner wherein they operate as a virtual single information processing apparatus.

FIG. 8 is a diagrammatic view illustrating an example of distributed processing by the system shown in FIG. 7.

FIG. 16 is a schematic view showing an information processing apparatus having a liquid crystal display section or an LED indicator disposed on a front face thereof.

FIG. 17 is a view showing an example of a configuration of a GUI recording reservation setting screen on which recording reservation program information is illustrated in the form of a line.

FIGS. 18 to 21 are schematic views showing different examples of a configuration of a GUI recording reservation setting screen on which recording reservation program information is indicated in the form of a calendar.

FIG. 28 is a view illustrating a configuration of apparatus information included in data as recording reservation information.

FIG. 29 is a view illustrating a configuration of utilization statistics information included in data as recording reservation information.

FIG. 30 is a view showing a software cell configuration of a recording reservation setting request command used for setting of recording reservation on an information processing apparatus on the cooperating side on a network.

FIG. 31 is a view showing a software cell configuration of a recording reservation setting response command used for setting of a recording reservation on an information processing apparatus on the cooperating side on a network.

FIG. 32 is a sequence diagram illustrating an operation procedure in a case wherein a number of information processing apparatus having a recording reservation function are connected to each other by a network and, when a user performs a recording reservation setting operation on one of the information processing apparatus, recording reservation setting cannot be finally performed on any one of the information processing apparatus.

FIG. 33 is a sequence diagram illustrating an operation procedure in a case wherein a number of information processing apparatus having a recording reservation function are connected to each other by a network and, when a user performs a recording reservation setting operation on one of the information processing apparatus, recording reservation setting is finally canceled.

FIG. 34 is a view showing a software cell configuration of a recording reservation cancel request command used for cancellation of a recording reservation set once through cooperation between information processing apparatus on a network.

FIG. 35 is a view showing a software cell configuration of a recording reservation information cancel response command used for cancellation of a recording reservation set once through cooperation between information processing apparatus on a network.

FIG. 36 is a view shown an example of a configuration of a conventional recording reservation information setting screen.

FIG. 37 is a view showing an example of a configuration of a conventional recording reservation information confirmation screen.

DETAILED DESCRIPTION OF THE INVENTION

A. System Configuration

Figure 9:
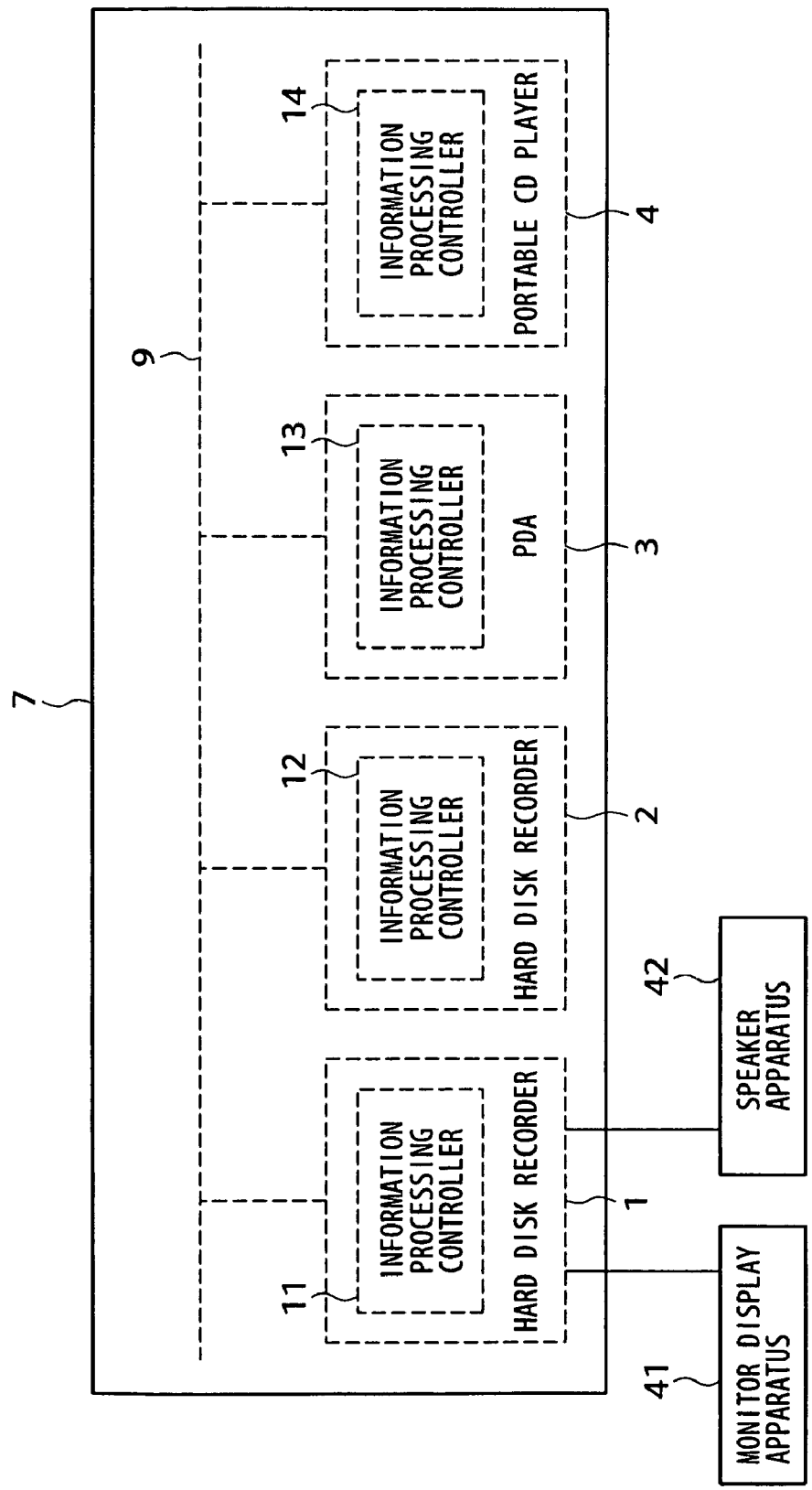
FIG. 9 is a diagrammatic view showing a particular example of information processing apparatus and a system.

The present invention allows two or more CE apparatus having a reservation recording function and set at different places from each other to be linked in operation with each other through a home network to achieve simplified, easy, and efficient reservation recording operation on the apparatus. In order to allow the apparatus on the home network to cooperate with each other, the present invention makes use of a grid computing technique for achieving a high arithmetic operation performance through cooperation of the apparatus.

FIG. 1 schematically shows a configuration of a network system formed applying the grid computing.

The network may be formed from the Internet or some other wide area network and a private network such as a LAN (Local Area Network) or a home network which is connected to the wide area network through a gateway or the like. The home network may be physically formed from a standard network interface such as a 10 Base T interface, a 100 Base TX interface, or a Giga eather interface. Further, as a mechanism for discovering another apparatus on the home network, the Upnp (Universal Plug and Play) can be utilized. According to the Upnp, a definition file described in the XML (eXtended Markup Language) form is exchanged between different apparatus connected to each other by a network, and mutual authentication is performed through an addressing process, a discovery process, and a service request process. Such mutual authentication also can be achieved by broadcasting of a packet that describes prescribed apparatus information within the same segment.

A number of information processing apparatus are connected on the home network. The information processing apparatus may include an AV apparatus such as a DVD recorder or an HD recorder, which incorporates a recording medium and has a reservation recording function, an AV apparatus for exclusive use for reproduction such as a compact disk player, which does not have a recording function, and other CE apparatus. The information recording apparatus may further include a computer processing system such as a PDA or a personal computer. In the example shown in FIG. 1, a number of information processing apparatus 1, 2, 3, and 4 are connected to each other through a network 9.

A-1. Information Processing Apparatus and Information Processing Controller

The information processing apparatus 1, 2, 3, and 4 typically are various AV (Audio and Visual) apparatus and portable apparatus hereinafter described.

The information processing apparatus 1 includes an information processing controller 11 as a computer function section. The information processing controller 11 includes a main processor 21-1, sub-processors 23-1, 23-2, and 23-3, a direct memory access controller (DMAC) 25-1, and a disk controller (DC) 27-1. The information processing controller 11 is preferably formed as a one-chip IC (Integrated Circuit).

The main processor 21-1 performs schedule management of program execution (data processing) by the sub-processors 23-1, 23-2, and 23-3 and general management of the information processing controller 11 (information processing apparatus 1). However, the main processor 21-1 may be configured otherwise such that a program other than the program for performing the management operates in the main processor 21-1. In this instance, the main processor 21-1 functions also as a sub-processor. The main processor 21-1 includes a local storage (LS) 22-1.

Although each information processing apparatus may include a single sub-processor, preferably it includes a number of sub-processors. In the example shown in FIG. 1, each of the information processing apparatus 1, 2, 3, and 4 includes a number of sub-processors. The sub-processors 23-1, 23-2, and 23-3 execute programs parallelly and independently of each other to process data under the control of the main processor 21-1. Further, according to circumstances, a program in the main processor 21-1 can operate in cooperation with a program in any of the sub-processors 23-1, 23-2, and 23-3. Also, the sub-processors 23-1, 23-2, and 23-3 include local storages 24-1, 24-2, and 24-3, respectively.

The direct memory access controller 25-1 accesses programs and data stored in a main memory 26-1 connected to the information processing controller 11 and formed from a DRAM (dynamic RAM) or the like without intervention of a processor. The disk controller 27-1 controls an accessing operation to external recording sections 28-1 and 28-2 connected to the information processing controller 11.

The external recording sections 28-1 and 28-2 may have a form of any of a fixed disk (hard disk) and a removable disk. As such, a removable disk as just mentioned, various recording media such as an MO (magnetic disk), an optical disk such as a CD±RW or a DVD±RW, a memory disk, an SRAM (static RAM), and a ROM can be used. The disk controller 27-1 is an external recording section controller although it is called disk controller. The information processing controller 11 can be configured such that a number of external recording sections 28 are connected thereto as seen in FIG. 1.

The main processor 21-1, sub-processors 23-1, 23-2, and 23-3, direct memory access controller 25-1, and disk controller 27-1 are connected to each other by a bus 29-1.

An identifier is allocated as an information processing apparatus ID to the information processing controller 11. The identifier can identify the information processing apparatus 1, which incorporates the information processing controller 11, uniquely over the entire network. Also, to each of the main processor 21-1 and the sub-processors 23-1, 23-2, and 23-3, an identifier with which it can be identified is allocated as a main processor ID or a sub-processor ID similarly.

Moreover, the other information processing apparatus 2, 3, and 4 are configured in a similar manner and, therefore, overlapping description of them is omitted herein to avoid redundancy. Here, it is to be noticed that those units of reference characters having the same parent number operate similarly unless otherwise specified even if they have different branch numbers. Thus, in the following description, where the branch number of reference characters is omitted, the units are the same irrespective of the difference in branch number.

A-2. Accessing from Each Sub-Processor to the Main Memory

As described hereinabove, although each of the sub-processors 23 in one information processing controller executes a program independently to process data, if different sub-processors perform reading out or writing at a time from or into the same areas in the main memories 26, then mismatching of data possibly may occur. Therefore, accessing from the sub-processors 23 to the main memories 26 is performed in accordance with the following procedure.

FIG. 2A illustrates locations in the main memory 26. As seen in FIG. 2A, the main memory 26 is formed from memory locations with which a number of addresses can be designated, and an additional segment for storing information indicative of a state of data is allocated to each memory location. The additional segment includes an F/E bit, a sub-processor ID, and an LS address (Local Storage address). Also, an access key hereinafter described is allocated to each memory location. The F/E bit is defined in the following manner.

The F/E bit=0 represents that the data in the corresponding memory location is data being read and processed by a sub-processor 23 or invalid data which it not the latest data since the location is in a blank state and is disabled from being reads out. Further, the F/E bit=0 indicates that data can be written into the corresponding memory location, and the F/E bit is set to 1 after writing into the memory location.

The F/E bit=1 represents that data of the corresponding memory location is not read out by any sub-processor 23 and is the latest data not processed as yet. The data of the memory location can be read out. After the sub-processor 23 read out the data, the F/E bit is set to 0. Further, the F/E bit=1 represents that the memory location is disabled from writing of data.

Further, in the state of the F/E bit=0 (readout disabled/writing enabled), it is possible to set a readout reservation with regard to the memory location. When readout reservation is to be performed with regard to a memory location with regard to which the F/E bit=0, a sub-processor 23 writes the sub-processor ID and the LS address of the sub-processor 23 as readout reservation information into the additional segment of the memory location with regard to which the readout reservation is performed.

Thereafter, the sub-processor 23 on the data writing side writes the data into the memory location having the readout reservation, and the F/E bit is set to F/E bit=1 (readout enabled/writing disabled). Then, the sub-processor ID and the LS address written as the readout reservation information in the additional segment in advance are read out.

Where there is the necessity to process data at multiple stages using a number of sub-processors, if readout/writing of data of each memory location are controlled in such a manner as described above, then immediately after data processed by a processor 23, which performs a process at a preceding stage, is written into a predetermined address on the main memory 26, another sub-processor 23, which performs a process at a succeeding stage, can read out the pre-processed data.

FIG. 2B illustrates memory locations of a local storage 24 in each sub-processor 23. Referring to FIG. 2B, the local storage 24 in each sub-processor 23 is formed from memory locations with which a number of addresses can be designated. An additional segment is allocated similarly to each of the memory locations. The additional segment includes a busy bit.

When the sub-processor 23 is to read out data in the main memory 26 into a memory location of the local storage 24 thereof, it sets the corresponding busy bit to 1 to make reservation. Other data cannot be stored into any memory location with regard to which the busy bit is 1. After reading out of the memory location of the local storage 24, the busy bit is changed to 0 so that the memory location can be used for an arbitrary object later.

Referring back to FIG. 2A, the main memory 26 connected to each information processing controller includes a number of sandboxes for defining areas in the main memory 26. While the main memory 26 is formed from a number of memory locations, a sandbox is a set of such memory locations. Each sandbox is allocated for each sub-processor 23 and can be used exclusively by the pertaining sub-processor. In other words, each of the sub-processors 23 can use a sandbox allocated thereto but cannot access data exceeding the area of the sandbox.

Further, in order to implement exclusive control of the main memory 26, such a key management table as shown in FIG. 2C is used. The key management table is stored in a comparatively high-speed memory such as an SRAM in the information processing controller and is coordinated with a direct memory access controller 25. Each entry in the key management table includes a sub-processor ID, a sub-processor key, and a key mask.

The process when the sub-processor 23 uses the main memory 26 is such as described below. First, the sub-processor 23 outputs a readout or writing command to the direct memory access controller 25. This command includes the sub-processor ID of the sub-processor and an address of the main memory 26, which is a destination of the request for use.

Before the direct memory access controller 25 executes this command, it refers to the key management table to detect the sub-processor key of the sub-processor of the source of the request for use. Then, the direct memory access controller 25 compares the detected sub-processor key of the source of the request for use with the access key allocated to the memory location shown in FIG. 2A in the main memory 26, which is the destination of the request for use. Then, only when the keys coincide with each other, the direct memory access controller 25 executes the command described above.

The key mask on the key management table shown in FIG. 2C can set, when an arbitrary bit thereof is set to the value 1, a corresponding bit of the sub-processor key coordinated with the key mask to 0 or 1.

It is assumed that, for example, the sub-processor key is 1010. Usually, the sub-processor key enables accessing only to a sandbox having the access key of 1010. However, if the key mask coordinated with the sub-processor key is set to 0001, then the coincidence determination between a sub-processor key and an access key is masked only with regard to the digit in which the bit of the key mask is set to 1. Consequently, the sub-processor key of 1010 enables accessing to a sandbox having the access key of 1010 or 1011.

The exclusive property of the sandboxes of the main memory 26 is implemented in such a manner as described above. In short, where there is the necessity for a number of sub-processors in an information processing controller to process data at multiple stages, only a sub-processor performing a process at a preceding stage and another sub-processor performing a process at a succeeding stage are permitted to access a predetermined address of the main memory 26. Consequently, the data can be protected.

Such exclusive control of the memory can be used, for example, in the following manner. First, immediately after the information processing apparatus is started, the values of the key masks are all zero. It is assumed that a program in the main processor is executed and operates in a cooperating relationship with programs in the sub-processors. When it is intended to store processing result data outputted from a first sub-processor once into the main memory and then input the processing result data to a second sub-processor, it is necessary that the pertaining main memory area can be accessed from the two sub-processors. In such an instance, the program in the main processor changes the values of the key masks suitably to provide a main memory area, which can be accessed from the number of sub-processors, to allow multi-stage processing by the sub-processors.

More particularly, when multi-stage processing is to be performed in the process of data from a different information processing apparatus→processing by the first sub-processor→first main memory area→processing by the second sub-processor→second main memory area, the second processor cannot access the first main memory area if the following settings are maintained:

sub-processor key of the first sub-processor, 0100;
access key of the first main memory area, 0100;
sub-processor key of the second sub-processor, 0101; and
access key of the second main memory area, 0101.

Thus, if the key mask of the second sub-processor is changed to 0001, then the second sub-processor is permitted to access the first main memory area.

A-3. Production and Configuration of a Software Cell

In the network system of FIG. 1, a software cell is transmitted between the information processing apparatus 1, 2, 3, and 4 so that distributed processing may be performed by the information processing apparatus 1, 2, 3, and 4. In particular, the main processor 21 included in the information processing controller in a certain information processing apparatus produces a software cell including a command, a program, and data and transmits the software cell to another information processing apparatus through the network 9 to achieve distribution of processing.

FIG. 3 shows an example of a configuration of a software cell. Referring to FIG. 3, the software cell shown includes a sender ID, a transmission destination ID, a response destination ID, a cell interface, a DMA command, a program, and data.

The sender ID includes a network address of an information processing apparatus of the sender of the software cell and the information processing apparatus ID of the information processing controller in the information processing apparatus. The sender ID includes identifiers (main processor ID and sub-processor IDs) of the main processor 21 and the sub-processors 23 included in the information processing controller in the information processing apparatus.

The sender ID and the response destination ID individually include the same information regarding an information processing apparatus of the transmission destination of the software cell and an information processing apparatus of the response destination of a result of execution of the software cell.

The cell interface is information necessary for utilization of the software cell and includes a global ID, information of necessary sub-processors, a sandbox size, and a preceding software cell ID.

The global ID allows unique identification of the software cell through the entire network and is produced based on the sender ID and the date and hour of production or transmission of the software cell.

The information of necessary sub-processors has set therein the number of sub-processors necessary for execution of the software cell. The sandbox side has set therein the memory capacities in the main memory 26 and the local storages 24 of the sub-processors 23 necessary for execution of the software cell.

The preceding software cell ID is an identifier of a preceding software cell among software cells of one group, which requires sequential execution such as streaming data.

An execution section of a software cell is formed from the DMA command, program, and data. The DMA command includes a series of DMA commands necessary to start the program, and the program includes sub-processor programs to be executed by the sub-processors 23. The data here is data to be processed by the program including the sub-processor programs.

The DMA command further includes a load command, a kick command, a function program execution command, a status request command, and a status return command.

The load command is a command for loading information in the main memory 26 into the local storage 24 of a sub-processor 23 and includes, in addition to the load command itself, a main memory address, a sub-processor ID, and an LS (Local Storage) address. The main memory address indicates an address of a predetermined area in the main memory 26, which is a load source of the information. The sub-processor ID and the LS address indicate the identifier and the address of the local storage 24 of the sub-processor 23 of a load destination of the information.

The kick command is a command for starting execution of a program and includes, in addition to the kick command, a sub-processor ID and a program counter. The sub-processor ID identifies a sub-processor 23 of a kicking object, and the program counter provides an address for the program counter for execution of the program.

The function program execution command is a command (hereinafter described) used for a certain information processing apparatus to request another information processing apparatus for execution of a function program. The information processing controller in the information processing apparatus, which receives the function program execution command, identifies a function program to be started from a function program ID (hereinafter described).

The status request command is a command for requesting for transmission of apparatus information regarding a current operation state (situation) of an information processing apparatus indicated by the transmission destination ID to an information processing apparatus indicated by the response destination ID. While the function program is hereinafter described, it is a program categorized into a function program in FIG. 6, which illustrates a configuration of software stored in the main memory 26. The function program is loaded into the main memory 26 and executed by the main processor 21.

The status return command is a command used for an information processing apparatus, which receives the status request command, to issue a response of apparatus information of the information processing apparatus itself to an information processing apparatus indicated by the response destination ID included in the status request command.

FIG. 4 illustrates a structure of the data area of a software cell where the DMA command is the status return command.

Referring to FIG. 4, the information processing apparatus ID is an identifier for identifying an information processing apparatus, which includes an information processing controller, and represents the ID of an information processing apparatus that transmits the status return command. The information processing apparatus ID is produced, when the power supply is made available, based on the date and hour when the power supply is made available, the network address of the information processing apparatus, the number of sub-processors 23 included in the information processing controller in the information processing apparatus, and so forth by the main processor 21 included in the information processing controller in the information processing apparatus.

The information processing apparatus type ID includes a value representative of a characteristic of the information processing apparatus. The characteristic of the information processing apparatus here is, for example, a hard disk recorder (hereinafter described), a PDA (Personal Digital Assistant), a portable CD (Compact Disc) player, or the like. The information processing apparatus type ID may be of the type representing a function that the information processing apparatus has such as image and sound recording or image and sound reproduction. The value representative of a characteristic or a function of an information processing apparatus is determined in advance. If the information processing apparatus type ID is recalled, then a characteristic or a function of the information processing apparatus can be grasped.

The MS (Master/Slave) status represents which one of a master apparatus and a slave apparatus operates the information processing apparatus as hereinafter described. Where the MS status is set to 0, this represents that the information processing apparatus should operate as a master apparatus. Where the MS status is set to 1, this represents that the information processing apparatus should operate as a slave apparatus.

The main processor operation frequency represents an operation frequency of the main processor 21 in the information processing controller. The main processor utilization factor represents the utilization factor in the main processor 21 regarding all programs, which are operating in the main processor 21 at present. The main processor utilization factor is a value representing the ratio of the processing capacity being currently used to the overall processing capacity of the object main processor and is calculated, for example, in a unit of MIPS, which is a unit for evaluation of the processor processing capacity, or based on the processor utilization time per unit time. This similarly applies to a sub-processor utilization factor hereinafter described.

The sub-processor number represents the number of sub-processors 23 provided in the information processing controller. The sub-processor ID represents an identifier for identification of a sub-processor 23 in the information processing controller.

The sub-processor status represents a status of the sub-processor 23 and may be one of an unused status, a reserved status, a busy status, and so forth. The unused status indicates that the sub-processor is not used at present and is not reserved for use either. The reserved status indicates that the sub-processor is not used but is reserved for use. The busy status indicates that the sub-processor is currently used.

The sub-processor utilization factor represents the utilization factor in the sub-processor regarding a program being executed by the sub-processor or being reserved for execution in the sub-processor. In other words, the sub-processor utilization factor indicates the utilization factor at present where the sub-processor status is busy, but indicates an estimated utilization factor with which the sub-processor is planned to be used later where the sub-processor status is reserved.

One set of the sub-processor ID, sub-processor status, and sub-processor utilization factor is set for one sub-processor 23. Consequently, a number of sets corresponding to the number of sub-processors 23 in one information processing controller are set.

The main memory total capacity and the main memory utilization capacity represent the total capacity and the capacity being currently used of the main memory 26 connected to the information processing controller, respectively.

The external recording section number represents the number of external recording sections 28 connected to the information processing controller. The external recording section ID is information for unique identification of each of the external recording sections 28 connected to the information processing controller. The external recording section type ID represents the type of each of the external recording sections 28 (for example, a hard disk, a CD±RW, a DVD±RW, a memory disk, an SRAM, a ROM, or the like).

The external recording section total capacity and the external recording section utilization capacity represent the total capacity and the currently used capacity of an external recording section 28 identified with the external recording section ID, respectively.

A set of the external recording section ID, external recording section type ID, external recording section total capacity, and external recording section utilization capacity is set for one external recording section 28. Consequently, a number of sets corresponding to the number of external recording sections 28 connected to the information processing controller are set. In particular, where a number of external recording sections are connected to an information processing controller, different external recording section IDs are applied individually to the external recording sections, and also the external recording section type IDs, external recording section total capacities, and external recording section utilization capacities are managed separately from each other.

A-4. Execution of a Software Cell

The main processor 21 included in the information processing controller in a certain information processing apparatus produces a software cell having such a configuration as described above and transmits a different information processing apparatus and the information processing controller in the different information processing apparatus through the network 9. The information processing apparatus of the sender, the information processing apparatus of the transmission destination, the information processing apparatus of the response destination, and the information processing controllers in the apparatus mentioned are individually identified with the sender ID, transmission destination ID, and response destination ID described hereinabove, respectively.

The main processor 21 included in the information processing controller in the information processing apparatus receiving the software cell stores the software cell into the main memory 26. Further, the main processor 21 of the transmission destination reads out the software cell and processes the DMA command included in the software cell.

In particular, the main processor 21 of the transmission destination first executes the load command. Consequently, the information is loaded from the main address indicated by the load command into a predetermined area of the local storage 24 in a sub-processor specified by the sub-processor ID and the LS address included in the load command. The information loaded here is a sub-processor program or data or some other indicated data included in the received software cell.

Then, the main processor 21 outputs the kick command to a sub-processor indicated by the sub-processor ID included in the kick command together with a program counter included in the kick command similarly.

The indicated sub-processor executes the sub-processor program in accordance with the kick command and the program counter. Then, the sub-processor stores a result of the execution into the main memory 26, and then notifies the main processor 21 of completion of the execution.

It is to be noted that the processor executing the software cell in the information processing controller in the information processing apparatus of the transmission destination is not limited to a sub-processor 23, but it is possible to designate the main processor 21 so as to execute a main memory program such as a function program included in the software cell.

In this instance, the information processing apparatus of the sender transmits, to the information processing apparatus of the transmission destination, a software cell whose DMA command is the load command. The software cell includes a main memory program and data to be processed by the main memory program in place of the sub-processor program. The main memory program and the data to be processed by the main memory program are stored into the main memory 26.

Then, the information processing apparatus of the sender transmits, to the information processing apparatus of the transmission destination, a software cell whose DMA command is the kick command or the function program execution command. The software cell includes the main processor ID and main memory address of the information processing controller in the information processing apparatus of the transmission destination, an identifier for identification of the main memory program such as a function program ID hereinafter described, and a program counter. Thus, the main processor 21 may execute the main memory program.

As described above, in the network system according to the present embodiment, an information processing apparatus of the sender transmits a sub-processor program or a main memory program in the form of a software cell to an information processing apparatus of the transmission destination. Further, the information processing apparatus of the sender causes the information processing controller in the information processing apparatus of the transmission destination to load the sub-processor program into a sub-processor 23. Consequently, the information processing apparatus of the sender can cause the information processing apparatus of the transmission destination to execute the sub-processor program or the main memory program.

Where the program included in the received software cell is a sub-processor program, the information processing controller in the information processing apparatus of the transmission destination loads the sub-processor program into a designated sub-processor. Thus, the information processing controller causes the sub-processor to execute the sub-processor program or the main memory program included in the software cell.

Accordingly, even if the user does not operate the information processing apparatus of the transmission destination, the sub-processor program or the main memory program can be executed automatically by the information processing controller in the information processing apparatus of the transmission destination.

In this manner, any information processing apparatus can acquire, where the information processing controller thereof does not include a sub-processor program or a main memory program such as a function program, such programs from anther information processing apparatus connected thereto by the network. Further, different sub-processors can transfer data therebetween in accordance with the DMA system and such sandboxes as described hereinabove are used. In such a case, even where it is necessary to process data at multiple states within one information processing controller, the processing can be executed at a high speed and with a high degree of security.

A-5. Distributed Processing of the Network System

FIG. 5 illustrates a manner wherein a number of information processing apparatus operate as a virtual single information processing apparatus. As a result of the distributed processing through use of a software cell, the multiple information processing apparatus 1, 2, 3, and 4 connected to the network 9 as seen at the upper stage in FIG. 5 operate as a virtual single information processing apparatus 7 as seen at the lower stage in FIG. 5. However, in order to implement such virtual operation as just described, processes described below must be executed.

A-6. Software Configuration of the System and Loading of a Program

FIG. 6 illustrates a configuration of software to be stored by the main memories 26 of the individual information processing controllers. Referring to FIG. 6, the pieces of software (programs) are recorded in an external recording section 28 connected to the information processing controller before the power supply is made available to the information processing apparatus. The programs are classified, depending upon the function or characteristic thereof, into control programs, function programs, and device drivers.

The control programs are provided commonly in the information processing controllers and executed by the main processor 21 in each of the information processing controllers. The control programs include an MS (Master/Slave) manager and a capacity exchange program hereinafter described.

The main processors 21 execute the function programs, and for each information processing apparatus, such function programs as a recording program, a reproduction program, a material search program, and so forth are provided for the information processing controller.

The device drivers are provided for inputting and outputting (transmission and reception) of each information processing controller (information processing apparatus), and such devices as those for broadcast reception, monitor outputting, bit stream inputting/outputting, network inputting/outputting, and so forth, which are suitable for each of the information processing apparatus, are provided for the information processing controller.

When the power supply is made available to an information processing apparatus in a state wherein the information processing apparatus is physically connected to the network 9 by connection of a cable or the like and, consequently, the information processing apparatus is connected to the network 9 electrically and functionally, the main processor 21 of the information processing controller of the information processing apparatus loads the programs belonging to the control programs and the programs belonging to the device drivers into the main memory 26.

As a loading procedure of the programs, the main processor 21 first controls the disk controller 27 to execute a reading out instruction to read out the programs from the external recording section 28 and then controls the direct memory access controller 25 to execute a writing instruction to write the programs into the main memory 26.

The programs belonging to the function programs may be handled such that only a necessary one of the programs is loaded when necessary or otherwise such that all of them are loaded immediately after the main power supply is made available similarly to the programs belonging to the other categories.

The programs belonging to the function programs need not necessarily be recorded in the external recording sections 28 of all of the information processing apparatus connected to the network. However, if they are recorded in an external recording section 28 of any one of the information processing apparatus, they can be loaded into the other information processing apparatus by the method described hereinabove. As a result, the function programs can be executed by the virtual single information processing apparatus 7 as shown at the lower stage of FIG. 5.

As described hereinabove in connection with the software cell shown in FIG. 3, an identifier, which can be identified uniquely, is allocated as a function program ID to each of the function programs. The function program ID is determined from the date and hour of production, the information processing apparatus ID, and so forth at a stage of production of the function program.

The main processor 21 secures, in the main memory 26, an area for storing apparatus information (information relating to an operation state) of the information processing apparatus in which the main processor 21 operates, and records the information as an apparatus information table of the information processing apparatus itself. The apparatus information here is information of the information processing apparatus ID and so forth in the data area of the status return command illustrated in FIG. 4.

A-7. Determination of the Master/Slave in the System

In the network system described above, when the main power supply to a certain information processing apparatus is made available, the main processor 21 of the information processing controller of the information processing apparatus loads a master/slave manager (hereinafter referred to as MS manager) into the main memory 26 and executes the master/slave manager.

After the MS manager detects that the information processing apparatus in which the MS manager operates is connected to the network 9, it confirms the presence of the other information processing apparatus connected to the same network 9. The "connection" or "presence" here represents that the information processing apparatus is connected to the network 9 not only physically but also electrically and functionally.

The information processing apparatus in which the MS manager itself operates is hereinafter referred to as self apparatus, and any other information processing apparatus is referred to as different apparatus. Also the term pertaining apparatus represents the pertaining information processing apparatus.

A method by which the MS manager confirms the presence of a different information processing apparatus connected to the same network 9 is described in the following.

The MS manager produces a software cell that designates the status request command as the DMA command and designates the pertaining information processing apparatus as the sender ID and the response destination ID but does not specify the transmission destination ID. Then, the MS manager transmits the software cell to the network to which the pertaining information processing apparatus is connected, and sets a timer for network connection confirmation. The timeout time of the timer is, for example, 10 minutes.

If a different information processing apparatus is connected to the network system, then the different apparatus receives the software cell of the status request command and transmits a software cell whose DMA command is the status return command and which includes apparatus information of the self apparatus (different apparatus) as the data to an information processing apparatus which is specified by the response destination ID of the received software cell and has issued the status request command. The software cell of the status return command at least includes information for specifying the different apparatus (information processing apparatus ID, information regarding the main processor, information regarding a sub-processor, or the line) and the MS status of the different apparatus.

The MS manager of the information processing apparatus, which has issued the status request command, supervises reception of a software cell of the status return command transmitted from the different apparatus on the network until timeout occurs with the timer for network connection confirmation. As a result, if the status return command representative of the MS status=0 (master apparatus) is received, then the MS status in the apparatus information table of the self apparatus is set to 1. Consequently, the pertaining apparatus becomes a slave apparatus.

On the other hand, if no status return command is received within the time until timeout occurs with the timer for network connection confirmation, or if the status return command representative of the MS status=0 (master apparatus) is not received, then the MS status in the apparatus information table of the self apparatus is set to 0. Consequently, the pertaining apparatus becomes a master apparatus.

In short, if a new information processing apparatus is connected to the network 9 in a state wherein no apparatus is connected to the network 9 or in another state wherein a master apparatus does not exist on the network 9, then the pertaining apparatus is automatically set as a master apparatus. On the other hand, if a new information processing apparatus is connected to the network 9 in a further state wherein a master apparatus already exists on the network 9, then the pertaining apparatus is automatically set as a slave apparatus.

In any of the master apparatus and slave apparatus, the MS manager periodically transmits the status request command to the different apparatus on the network 9 to inquire about the status information to supervise the situation of the different apparatus. As a result, when the connection state of the network 9 undergoes a variation such as when the main power supply to an information processing apparatus connected to the network 9 is cut or an information processing apparatus is disconnected from the network 9 and, consequently, the status return command is not returned from the particular different apparatus within a predetermined period of time set for the discrimination in advance, the information is conveyed to a capacity exchange program hereinafter described.

A-8. Acquisition of Apparatus Information by the Master Apparatus and a Slave Apparatus If the main processor 21 receives, from the MS manager, a notification of an inquiry about a different apparatus on the network 9 and completion of setting of the MS status of the self apparatus, then it executes a capacity exchange program.

The capacity exchange program acquires, if the self apparatus is a master apparatus, apparatus information of all different apparatus connected to the network 9; that is, apparatus information of all slave apparatus.

The acquisition of apparatus information of a different apparatus can be performed such that the DMA command produces and transmits a software cell of the status request command to the different apparatus and then receives a software cell whose DMA command is the status return command and includes apparatus information of the different apparatus as the data from the different apparatus.

The capacity exchange program secures an area for storing apparatus information of all different apparatus (all slave apparatus) connected to the network 9 in the main memory 26 of the self apparatus and stores the information as apparatus information tables of the different apparatus (slave apparatus) similarly to the apparatus information table of the self apparatus as the master apparatus. In other words, the apparatus information of all of the information processing apparatus connected to the network 9 including the self apparatus is stored as apparatus information tables in the main memory 26 of the master apparatus.

On the other hand, if the self apparatus of the capacity exchange program is a slave apparatus, then the capacity exchange program acquires the apparatus information of all of the different apparatus connected to the network 9, that is, the apparatus information of the master apparatus and all of the slave apparatus other than the self apparatus, and records the information processing apparatus IDs and the MS statuses included in the apparatus information into the main memory 26 of the self apparatus. In other words, in the main memory 26 of each slave apparatus, the apparatus information of the self apparatus is recorded as an apparatus information table, and the information processing apparatus IDs and the MS statuses of all of the master apparatus and the slave apparatus connected to the network 9 other than the self apparatus are recorded as different apparatus information tables.

Further, in any of the master apparatus and the slave apparatus, when the capacity exchange program receives a notification that an information processing apparatus is newly connected to the network 9 from the MS manager as described above, it acquires apparatus information of the information processing apparatus and registers the apparatus information into the main memory 26 as described hereinabove.

It is to be noted that the MS manager and the capacity exchange program may be executed not by the main processor 21 but by any sub-processor 23. Further, the MS manager and the capacity exchange program preferably are resident programs that operate normally while the main power supply to the information processing apparatus is available.

A-9. When an Information Processing Apparatus is Disconnected from the Network

In any of the master apparatus and the slave apparatus, if the capacity exchange program is notified from the MS manager that the main power supply to an information processing apparatus connected to the network 9 is disconnected or an information processing apparatus is disconnected from the network 9, it deletes the apparatus information table of the information processing apparatus from the main memory 26 of the self apparatus.

Further, if the information processing apparatus disconnected from the network 9 is the master apparatus, then another master apparatus is newly determined by the following method.

For example, each of those information processing apparatus that are not disconnected from the network 9 replaces the information processing apparatus IDs of the self apparatus and the different apparatus into numerical values and compares the information processing apparatus ID of the self apparatus with the information processing apparatus IDs of the different apparatus. If the information processing apparatus ID of the self apparatus exhibits the lowest value among the information processing apparatus that are not disconnected from the network 9, then the slave apparatus changes itself to the master apparatus and sets the MS status to zero. Then, it operates as the master apparatus and acquires and records the apparatus information of all of the different apparatus (slave apparatus) connected to the network 9 into the main memory 26 as described hereinabove.

A-10. Distributed Processing Based on Apparatus Information

In order to allow a number of information processing apparatus 1, 2, 3, and 4 connected to the network 9 to operate as a virtual single information processing apparatus 7 as shown at the lower stage of FIG. 5, it is necessary for the master apparatus to grasp an operation of a user and operation states of the slave apparatus.

FIG. 7 shows four information processing apparatus in a state wherein they operate as a virtual single information processing apparatus 7. In the example shown, the information processing apparatus 1 acts as the master apparatus while the information processing apparatus 2, 3, and 4 act as slave apparatus A, B, and C, respectively.

When a user operates any of the information processing apparatus connected to the network 9, if the object of the operation is the master apparatus 1, then the operation information is grasped directly by the master apparatus 1. On the other hand, if the object of the operation is a slave apparatus, then the operation information is transmitted from the operated slave apparatus to the master apparatus 1. In other words, irrespective of whether the object of operation of the user is the master apparatus 1 or one of the slave apparatus, the master apparatus 1 always grasps the operation information. Transmission of the operation information is performed, for example, using a software cell whose DMA command is the operation information transmission command.

Then, the main processor 21-1 included in the information processing controller 11 in the master apparatus 1 selects a function program to be executed in accordance with the operation information. In this instance, if necessary, the main processor 21-1 included in the information processing controller 11 in the master apparatus 1 loads the function program from the external recording sections 28-1 and 28-2 of the self apparatus into the main memory 26-1 using the method described hereinabove. However, the function program otherwise may be transmitted from a different information processing apparatus (slave apparatus) to the master apparatus 1.

The function program defines required specifications regarding apparatus such as an information processing apparatus type ID, a processing capacity of the main processor or a sub-processor, a main memory utilization capacity, and conditions relating to an external recording section (refer to FIG. 4).

The main processor 21-1 included in the information processing controller 11 in the master apparatus 1 reads out such requested specifications required by the individual function programs. Further, the main processor 21-1 refers to the apparatus information tables recorded in the main memory 26-1 by the capacity exchange program in advance to read out the apparatus information of the individual information processing apparatus. The apparatus information here signifies the items of information including the item of the information processing apparatus ID and the succeeding items illustrated in FIG. 4 and is information relating to the main processor, sub-processors, main memory, and external recording sections.

The main processor 21-1 included in the information processing controller 11 in the master apparatus 1 successively compares the apparatus information of the information processing apparatus connected to the network 9 with the required specifications necessary for execution of the function program.

For example, if the function program requires a recording function, then the main processor 21-1 included in the information processing controller 11 in the information processing apparatus 1 specifies and extracts only those information processing apparatus, which have a recording function, based on the information processing apparatus type IDs. Further, the main processor 21-1 specifies that one of the slave apparatus that can assure the processing capacity of the main processor or a sub-processor to execute the processing program, the main memory utilization capacity, and conditions regarding an external recording section as an execution request candidate apparatus. Here, if a number of execution request candidate apparatus are specified, then one of the execution request candidate apparatus is specified and selected.

After a slave apparatus to which an execution request is to be issued is specified, the main processor 21-1 included in the information processing controller 11 in the master apparatus 1 updates the apparatus information table with regard to the specified slave apparatus recorded in the main memory 26-1 included in the information processing controller 11 in the self apparatus.

Further, the main processor 21-1 included in the information processing controller 11 in the information processing apparatus 1 produces a software cell, which includes the load command and the kick command as the DMA commands, and sets information of a necessary sub-processor and the sandbox size (refer to FIG. 3) regarding the function program to the cell interface of the software cell. Then, the main processor 21-1 transmits the resulting software cell to the slave apparatus, which is requested to execute the function program.

The slave apparatus requested to execute the function program executes the function program and updates the apparatus information table of the self apparatus. In this instance, if necessary, the main processor 21 included in the information processing controller in the slave apparatus loads the function program from an external recording section 28 of the self apparatus into the main memory 26 using the method described hereinabove.

The system may be configured such that, if the necessary function program is not recorded in any of the external recording sections 28 of the slave apparatus requested to execute the function program, then a different information processing apparatus transmits the function program as the main memory program described hereinabove to the slave apparatus requested to execute the function program.

Further, similarly to the main memory program, the sub-processor program can be transmitted, if necessary, to a different information processing apparatus via a software cell so that it is loaded into a sub-processor 23 of the different information processing apparatus and then executed by the different information processing apparatus.

After the execution of the function program comes to an end, the main processor 21 included in the information processing controller in the slave apparatus, having executed the function program, transmits an execution end notification to the main processor 21-1 included in the information processing controller in the slave apparatus, and updates the apparatus information table of the self apparatus. The main processor 21-1 included in the information processing controller 11 in the master apparatus 1 receives the end notification and updates the apparatus information table of the slave apparatus having executed the function program.

The main processor 21-1 included in the information processing controller 11 in the master apparatus 1 may possibly select the self apparatus as an information processing apparatus, which can execute the function program, from a result of the reference to the apparatus information tables of the self apparatus and the different apparatus. In this instance, the master apparatus 1 executes the function program.

Distributed processing where a user operates, in the example illustrated in FIG. 7, the slave apparatus A (information processing apparatus 2) and the different slave apparatus B (information processing apparatus 3) executes a function program in response to the operation is described with reference to FIG. 8.

In the example illustrated in FIG. 8, when the user operates the slave apparatus A, distributed processing of the entire network system including the slave apparatus A is started, and the slave apparatus A first transmits operation information to the master apparatus 1 (step 81).

The master apparatus 1 receives the operation information (step 72) and checks the operation states of the information processing apparatus from the apparatus information tables of the self apparatus and the different apparatus recorded in the main memory 26-1 of the self apparatus to select an information processing apparatus, which can execute a function program corresponding to the received operation information (step 73). In the example illustrated in FIG. 8, the slave apparatus B is selected.

Then, the master apparatus 1 issues a request for execution of the function program to the selected slave apparatus B (step 74).

The slave apparatus B receives the execution request (step 95) and executes the function program whose execution is requested (step 96).

In this manner, if a user operates only one of the information processing apparatus, then it can cause the multiple information processing apparatus 1, 2, 3, and 4 to operate as a virtual single information processing apparatus 7 without operating any other of the information processing apparatus.

A-11. Particular Examples of the Information Processing Apparatus and the System Each of the information processing apparatus 1, 2, 3 and 4 connected to each other through the network 9 basically may have any configuration only if information processing is performed by such an information processing controller 11, 12, 13 or 14 as described hereinabove. FIG. 9 shows an example of a configuration of the information processing apparatus.

Figure 10:
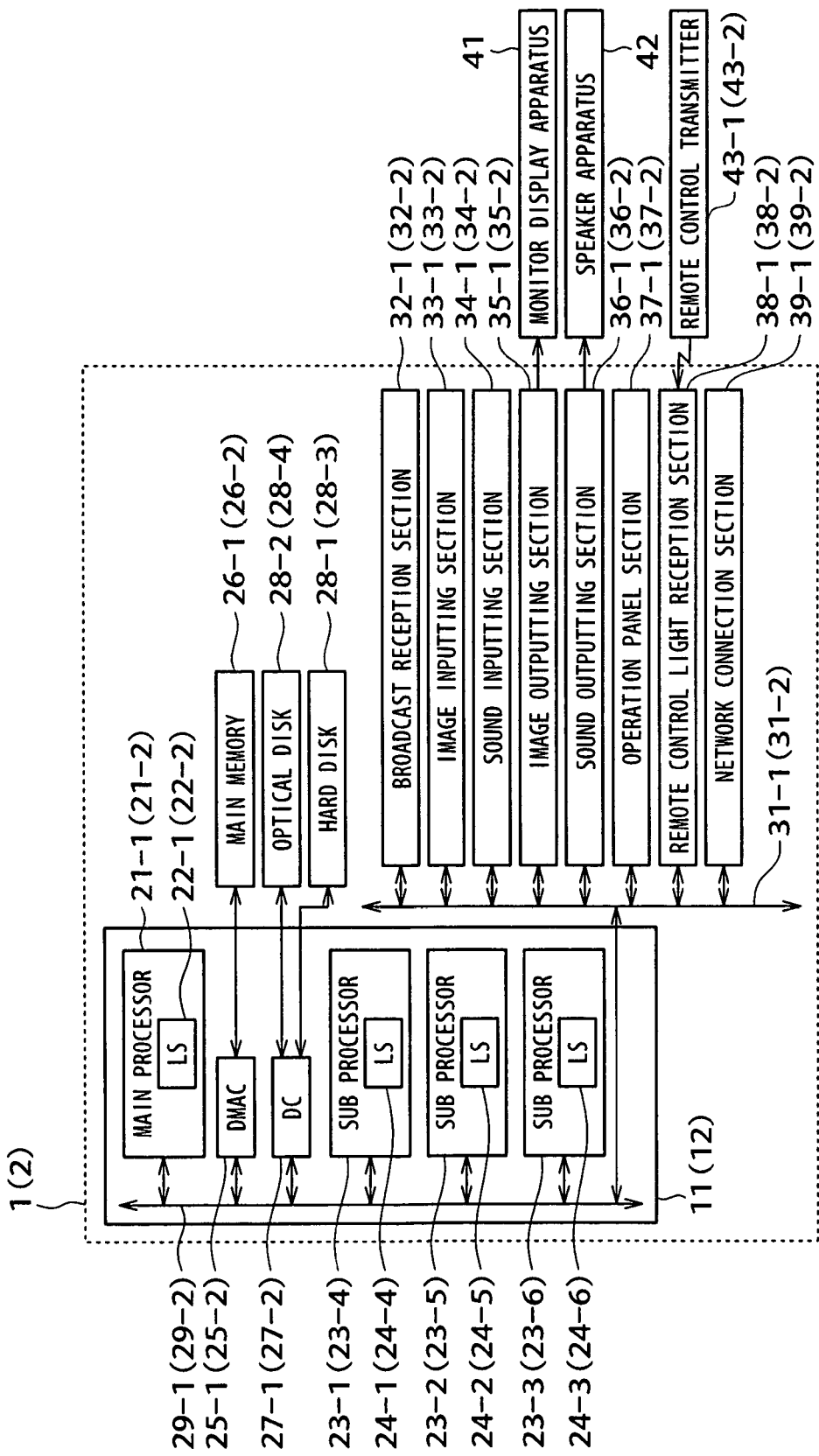
FIG. 10 is a block diagram showing a hardware configuration of a hard disk recorder shown in FIG. 9.
Figure 11:
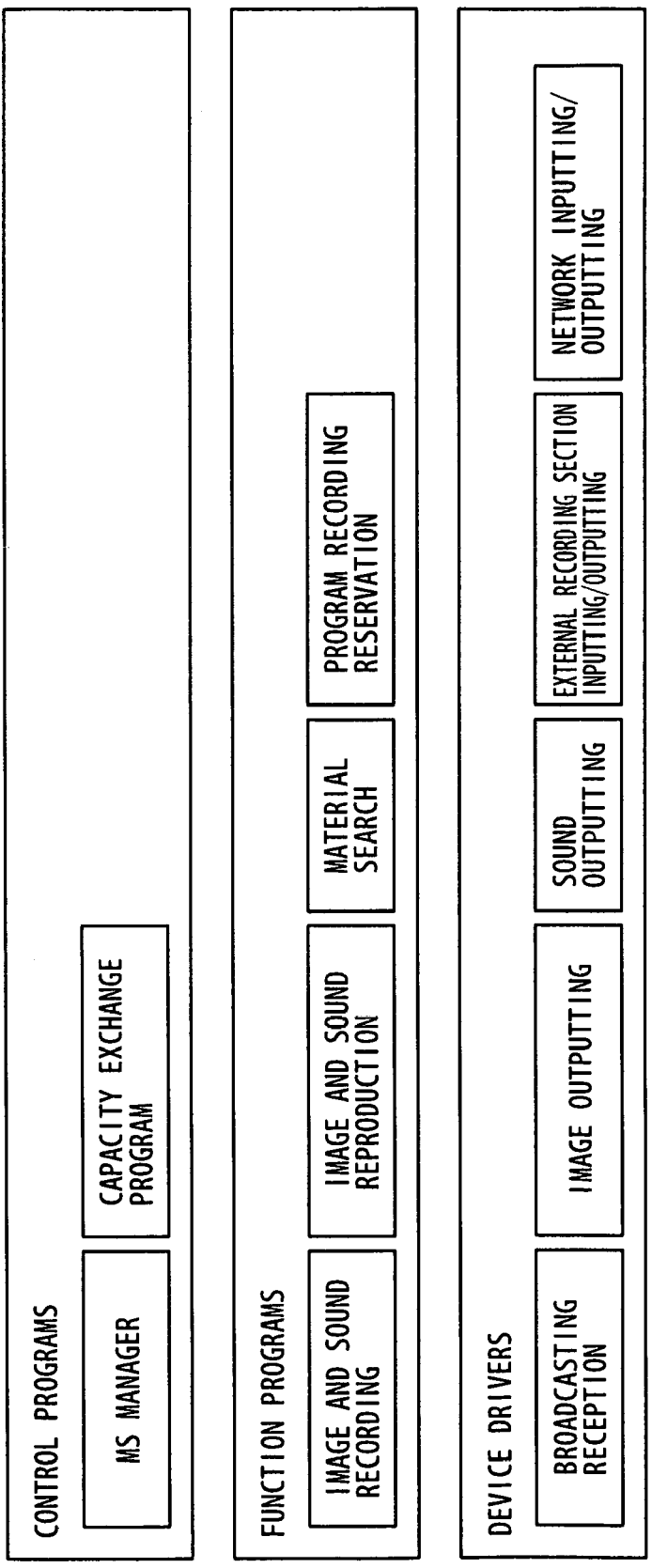
FIG. 11 is a diagrammatic view showing a software configuration of the hard disk recorder shown in FIG. 9.

An example of the information processing apparatus 1 which includes the information processing controller 11 is a hard disk recorder. FIGS. 10 and 11 show a hardware configuration and a software configuration of the hard disk recorder shown in FIG. 9, respectively. Referring to FIG. 10, the information processing apparatus 1 shown includes, as the hardware configuration thereof, a built-in hard disk serving as the external recording section 28-1 shown in FIG. 1. The information processing apparatus 1 further includes the external recording section 28-2 shown in FIG. 1 into which an optical disk such as DVD±R/RW, CD±R/RW, a Bluray-Disc (registered trademark) and so forth can be loaded. The information processing apparatus 1 further includes a broadcast reception section 32-1, an image inputting section 33-1, a sound inputting section 34-1, an image outputting section 35-1, a sound outputting section 36-1, an operation panel section 37-1, a remote control light reception section 38-1 and a network connection section 39-1 connected to a bus 31-1 which is, in turn, connected to the bus 29-1 of the information processing controller 11.

The broadcast reception section 32-1, image inputting section 33-1 and sound inputting section 34-1 receive a broadcasting signal or an image signal and a sound signal from the outside of the information processing apparatus 1, convert the received signal or signals into digital data of a predetermined format, and signals the digital data to the bus 31-1 so as to be processed by the information processing controller 11. The image outputting section 35-1 and the sound outputting section 36-1 process image data and sound data signaled from the information processing controller 11 to the bus 31-1 and signal the image data and the sound data as they are or after converted into analog signals to the outside of the information processing apparatus 1. The remote control light reception section 38-1 receives a remote control infrared signal from a remote control transmitter 43-1.

As seen in FIGS. 9 and 10, a monitor display apparatus 41 and a speaker apparatus 42 are connected to the image outputting section 35-1 and the sound outputting section 36-1 of the information processing apparatus (hard disk recorder) 1, respectively.

Also, the information processing apparatus 2 which includes the information processing controller 12 shown in FIG. 9 is a hard disk recorder and is configured similarly to the information processing apparatus 1 as seen in FIG. 10 in which reference numerals are applied in parentheses. However, a monitor display apparatus and a speaker apparatus are not connected to the information processing apparatus (hard disk recorder) 2 as seen in FIG. 9.

The information processing apparatus (hard disk recorders) 1 and 2, that is, the information processing controllers 11 and 12, include, as the software configuration shown in FIG. 11, the MS manager and the capacity exchange program as the control programs. Further, the information processing controllers 11 and 12 include programs for image signal and sound recording, image and sound reproduction, material search and program recording reservation as the function programs. Furthermore, the information processing controllers 11 and 12 include programs for broadcast reception, image outputting, sound outputting, external recording section inputting/outputting and network inputting/outputting as the device drivers.

Figure 12:
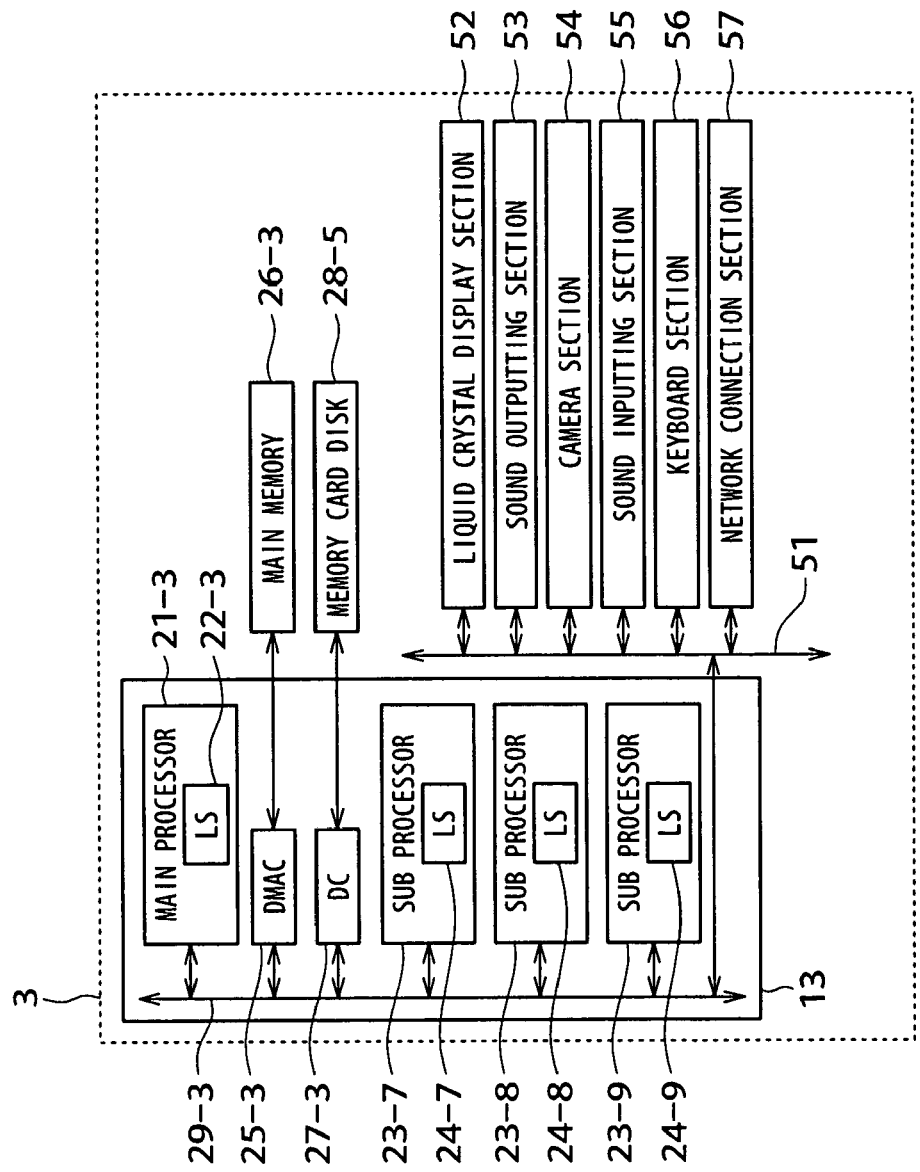
FIG. 12 is a block diagram showing a hardware configuration of a PDA shown in FIG. 9.

An example of the information processing apparatus 3 which includes the information processing controller 13 is a PDA (Personal Digital Assistant). FIG. 12 shows a hardware configuration of the information processing apparatus 3 formed as a PDA. Referring to FIG. 12, in the example shown, the information processing apparatus 3 includes the external recording section 28-5 shown in FIG. 1 into which a memory card disk can be loaded. The information processing apparatus 3 further includes a liquid crystal display section 52, a sound outputting section 53, a camera section 54, a sound inputting section 55, a keyboard section 56 and a network connection section 57 connected to a bus 51 which is, in turn, connected to the bus 29-3 of the information processing controller 13.

It is to be noted that the information processing controller 13 whose internal configuration is not shown in FIG. 1 includes a main processor 21-3, sub-processors 23-7, 23-8 and 23-9, a direct memory access controller (DMAC) 25-3, a disk controller (DC) 27-3, and a bus 29-3. The main processor 21-3 includes a local storage (LS) 22-3, and the sub-processors 23-7, 23-8 and 23-9 include local storages (LS) 27-7, 24-8 and 24-9, respectively.

Figure 13:
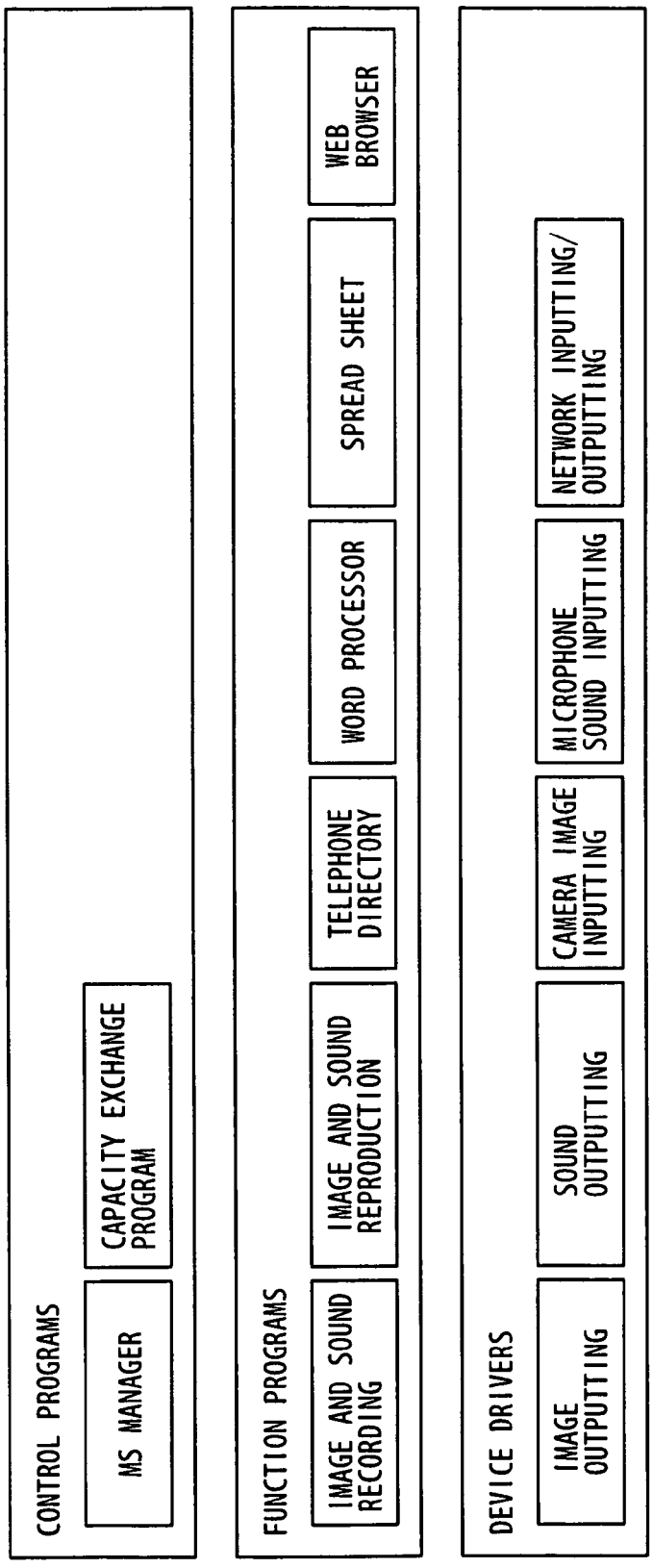
FIG. 13 is a diagrammatic view showing a software configuration of the PDA shown in FIG. 9.

FIG. 13 shows a software configuration of the information processing apparatus (PDA) 3; that is, the information processing controller 13. Referring to FIG. 13, the information processing controller 13 includes the MS manager and the capacity exchange program as the control programs. Further, the information processing controller 13 includes programs for image and sound recording, image and sound reproduction, telephone directory, word processor and spreadsheet as the function programs, and includes a Web browser. Furthermore, the information processing controller 13 includes programs for image outputting, sound outputting, camera image inputting, microphone sound inputting and network inputting/outputting as the device drivers.

Figure 14:
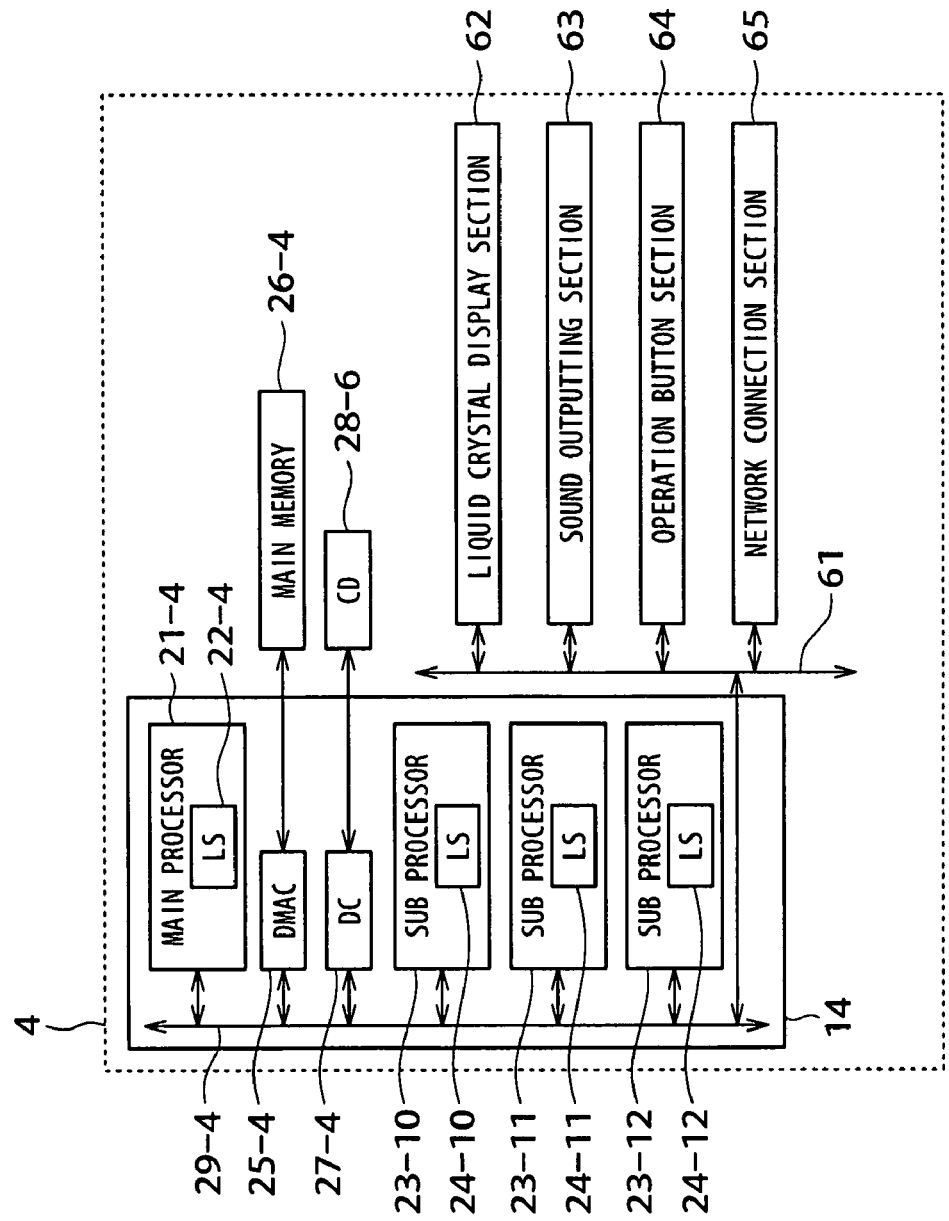
FIG. 14 is a block diagram showing a hardware configuration of a portable CD player shown in FIG. 9.

The information processing apparatus 4 which includes the information processing controller 14 is a portable CD player. FIG. 14 shows a hardware configuration of a portable CD player. Referring to FIG. 14, the portable CD player includes the external recording section 28-6 shown in FIG. 1 into which a CD (Compact Disc) can be loaded. The portable CD player further includes a liquid crystal display section 62, a sound outputting section 63, an operation button section 64 and a network connection section 65 connected to a bus 61 which is, in turn, connected to the bus 29-4 of the information processing controller 14.

It is to be noted that, the information processing controller 14 whose internal configuration is not shown in FIG. 1 includes a main processor 21-4, sub-processors 23-10, 23-11 and 23-12, a direct memory access controller (DMAC) 25-4, a disk controller (DC) 27-4 and a bus 29-4. The main processor 21-4 includes a local storage 22-4, and the sub-processors 23-10, 23-11 and 23-12 include local storages 24-10, 24-11 and 24-12, respectively.

Figure 15:
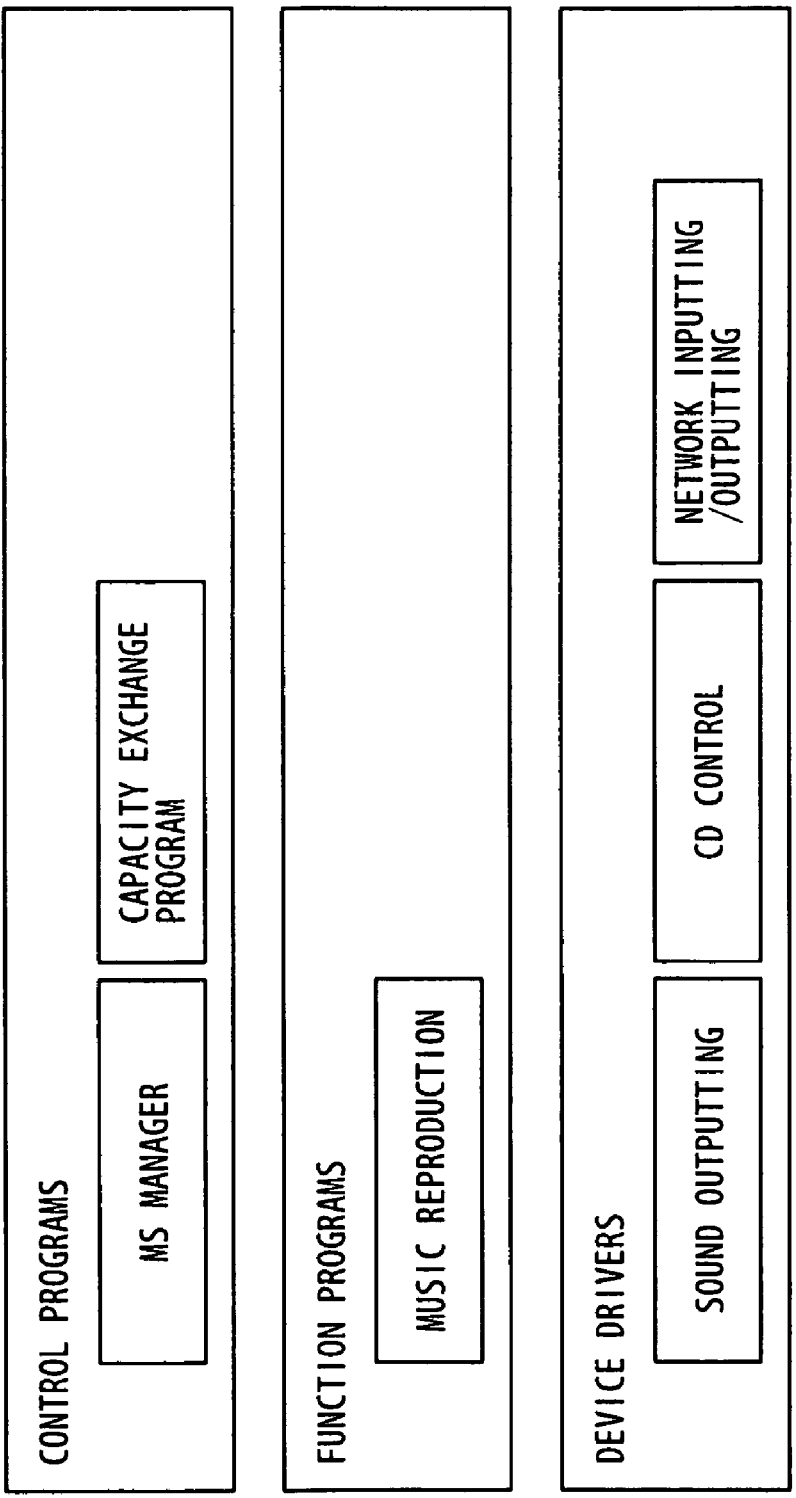
FIG. 15 is a diagrammatic view showing a software configuration of the portable CD player shown in FIG. 9.

FIG. 15 shows a software configuration of the information processing apparatus (portable CD player) 4; that is, the information processing controller 14. Referring to FIG. 15, the information processing controller 14 includes the MS manager and the capacity exchange program as the control programs. Further, the information processing controller 14 includes a program for music reproduction as the function program and includes programs for sound outputting, CD control and network inputting/outputting as the device drivers.

In the network system shown in FIG. 9, the information processing apparatus 1, 3 and 4 are connected to the network 9, and the information processing apparatus 1 is set as the master apparatus (MS status=0) and the information processing apparatus 3 and 4 are set as slave apparatus (MS status=1).

If, in this state, the information processing apparatus 2 is newly connected to the network 9, then the MS manager which is executed in the main processor 21-2 included in the information processing controller 12 in the information processing apparatus 2 inquires the other information processing apparatus 1, 3 and 4 about the MS status and recognizes that the information processing apparatus 1 always exists as the master apparatus. Thus, the MS manager sets the self apparatus (information processing apparatus 2) as a slave apparatus (MS status=1). Meanwhile, the information processing apparatus 1 set as the master apparatus collects the apparatus information of the apparatus including the newly added information processing apparatus 2 and updates the apparatus information tables in the main memory 26-1 based on the collected apparatus information.

Operation of the network system of FIG. 9 when, in this state, the user operates the information processing apparatus 3, which is a slave apparatus, for recording reservation of a broadcasting program for two hours is described below.

In this instance, the information processing apparatus 3 which is a slave apparatus accepts inputting of recording reservation information including information of recording start time, recording end time, a recording object broadcast channel and a recording picture quality, and produces a software cell including the recording reservation information and the recording reservation command as the DMA command. Then, the information processing apparatus 3 transmits the produced software cell to the information processing apparatus 1 which is the master apparatus.

The main processor 21-1 included in the information processing controller 11 in the information processing apparatus 1 which receives the software cell whose DMA command is the recording reservation command reads out the recording reservation command and refers to the apparatus information tables in the main memory 26-1 to specify an information processing apparatus which can execute the recording reservation command.

First, the main processor 21-1 reads out the information processing apparatus type IDs of the information processing apparatus 1, 2, 3 and 4 included in the apparatus information tables to extract those information processing apparatus which can execute the recording reservation command. Here, the information processing apparatus 1 and 2 having the information processing apparatus type ID indicative of the recording function are specified as candidate apparatus while the information processing apparatus 3 and 4 are excepted from candidate apparatus.

The main processor 21-1 included in the information processing controller 11 in the information processing apparatus 1 refers to the apparatus information tables to read out information regarding the apparatus such as the processing capacities of the main processors and sub-processors and information regarding the main memories of the information processing apparatus 1 and 2, and discriminates whether or not the information processing apparatus 1 and 2 satisfy the required specifications necessary for execution of the recording reservation command. It is assumed here that both of the information processing apparatus 1 and 2 satisfy the required specifications necessary for execution of the recording reservation command.

Further, the main processor 21-1 refers to the apparatus information tables to read out the information regarding external recording sections of the information processing apparatus 1 and 2, and discriminates whether or not the free capacities of the external recording sections satisfy the capacity necessary for execution of the recording reservation command. Since the information processing apparatus 1 and 2 are hard disk recorders, the differences between the total capacities and the used capacities of the external recording sections 28-1 and 28-3 individually correspond to the free capacities.

In this instance, it is assumed that the free capacity of the external recording section 28-1 of the information processing apparatus 1 is 10 minutes when it is converted into a recording period of time and the free capacity of the hard disk 28-3 of the information processing apparatus 2 is 20 hours when it is converted into a recording period of time.

In this instance, the main processor 21-1 included in the information processing controller 11 in the information processing apparatus 1 which is the master apparatus specifies the information processing apparatus which can secure the free capacity for two hours necessary for execution of the recording reservation command as a slave apparatus of a destination of an execution request.

As a result, only the information processing apparatus 2 is selected as the execution request destination slave apparatus, and the main processor 21-1 included in the information processing controller 11 in the information processing apparatus 1 which is the master apparatus transmits the recording reservation command including the recording reservation information transmitted from the information processing apparatus 3 operated by the user to the information processing apparatus 2 to request the information processing apparatus 2 for recording reservation of the broadcast program for two hours described hereinabove.

Then, the main processor 21-2 included in the information processing controller 12 in the information processing apparatus 2 analyzes the recording reservation command and loads a function program necessary for recording from the hard disk 28-3, which is an external recording section, into the line memory 26-2. Then, the main processor 21-2 executes recording in accordance with the recording reservation information. As a result, image and sound data of the broadcast program for two hours reserved for recording are recorded on the hard disk 28-3 of the information processing apparatus 2.

In this manner, in the network system shown in FIG. 9, the user can cause the multiple information processing apparatus 1, 2, 3 and 4 to operate as a virtual single information processing apparatus 7 by operating only one of the information processing apparatus without operating any other one of the information processing apparatus.

B. Cooperation in Recording Reservation Operation between Information Processing Apparatus through a Network As a further embodiment of the present invention, where it is desired to set recording reservations of a number of programs such as TV broadcasting programs within the same time zone, it is possible for a user to confirm, on a GUI of a particular information processing apparatus, a recording reservation situation or a free situation of a disk of another information processing apparatus connected through a network and set a recording reservation in a further information processing apparatus.

In this instance, a GUI on each information processing apparatus which has a recording reservation function has the following functions:

(1) Function of displaying a cooperation state with a different apparatus present on the same network.

(2) Function of transmitting information of a program reserved for recording on the self apparatus or function of merging and displaying recording reservation program information received from a different apparatus into and together with recording reservation program information of the self apparatus. Upon such merging and displaying, information of both of a number of recording reservation programs within the same time zone can be displayed. Further, a function of setting a recording reservation of the self apparatus or the different apparatus based on the displayed recording reservation program information.

(3) Function of displaying presence or the number of different apparatus which exist on the same network and can cooperate with the self apparatus when setting of a recording reservation is performed.

As the measures for displaying information in (1) above, such a liquid crystal display section or an LED indicator as shown in FIG. 16 may be provided on the front face of the information processing apparatus.

FIG. 16 shows an example of an indicator for indicating a system cooperation state. If an information processing apparatus which can cooperate with the information processing apparatus is connected to or disconnected from the network, then the display contents are changed. In FIG. 16, examples of display when the information processing apparatus operates in a stand-alone state (sole operation), when the information processing apparatus can cooperate and when the information processing apparatus is in an in-cooperation state are shown.

The sole operation state here signifies a state wherein the self apparatus is not connected physically or electrically to any other apparatus. Meanwhile, the cooperable state signifies a state wherein the self apparatus is physically and electrically connected to at least one of the different apparatus through a network and exchange of apparatus information has been performed as a result of execution of the MS manager or the capacity exchange program on both of the information processing apparatus. Further, the in-cooperation state signifies a state wherein the self apparatus is in the cooperable state and distributed processing is performed between the multiple information processing apparatus through transmission from one to the other of the information processing apparatus of a command for requesting for a process such as the kick command or a function program execution command.

As measures for displaying information in (2) above, it is possible to similarly use and cause such a liquid crystal display section as shown in FIG. 16 to display recording reservation program information of the self apparatus or a different apparatus as such a GUI recording reservation setting screen as shown in FIG. 17. In the example shown in FIG. 17, on a GUI recording reservation setting screen of a certain information processing apparatus, recording reservation information in all of the information processing apparatus on the network is displayed in lines in accordance with a time series on the same table.

In the example shown in FIG. 17, one entry is provided for each one reservation setting, and each entry includes fields for describing the reservation day, start time and end time, channel, recording mode, genre, apparatus name and so forth. While, in the example shown in FIG. 17, the entries are sorted in the reservation date and hour, they otherwise may be sorted in any other form.

Since the information processing apparatus on the network operate virtually as a unit, there is no necessity for the user to be particularly conscious of on which information processing apparatus each entry has been set for reservation. However, taking the usability into consideration, the entries may be displayed in different colors for individual information processing apparatus on which the recording reservation has been set.

In the example shown in FIG. 17, within a time zone from 19:00 to 22:00 within which a recording reservation of a baseball program is set by a PSX (registered trademark) 1, recording reservations of an animation program, a drama program and a variety program are set in an overlapping relationship by a PSX 2. To those items which exhibit an overlap in time in this manner, a different color is applied.

The information processing apparatus name may be the information processing apparatus ID or the information processing apparatus type ID itself, or otherwise may be the ID card number owned by a user inserted in the information processing apparatus. Further, a combination of them or a nickname of the information processing apparatus registered by the user itself may be used instead. In other words, the information processing apparatus name is recognition information with which the information processing apparatus can be identified uniquely. In the example illustrated in FIG. 17, of two information processing apparatus type IDs (PSX) unique to the information processing apparatus, the one which has a lower number is automatically recognized as PSX 1 while the one which has a higher number is automatically recognized as PSX 2. Upon such automatic recognition, if the same name is registered already, then a number different from the name is applied. If the information processing apparatus is automatically recognized once on the network, then it is registered into a nonvolatile memory in the information processing apparatus.

Figure 18:
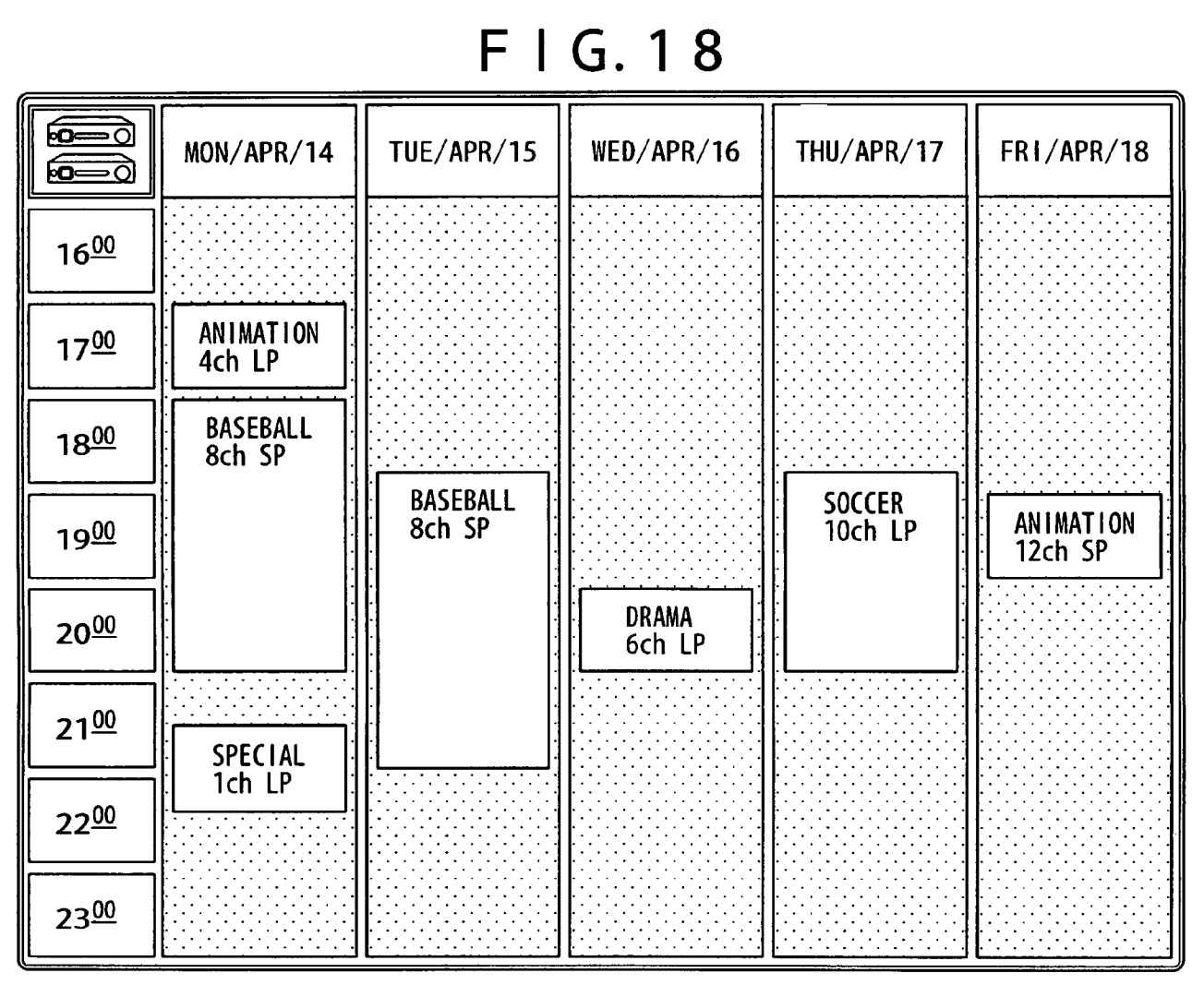

FIG. 18 shows another example of a configuration of a GUI recording reservation setting screen. In FIG. 18, the recording reservation setting screen is formed not in such a line display form as shown in FIG. 17, but rather in a calendar form in a unit of a week. In this instance, as seen in FIG. 18, recording reservation information on each information processing apparatus is disposed on the pertaining reservation day and reservation type zone on the calendar. In other words, a reservation day, a reservation time zone and reserved items (channel, recording mode and contents information) can be displayed in the form of a table.

FIG. 18 shows a recording reservation setting screen on an information processing apparatus PSX 1 where two information processing apparatus PSX 1 and PSX 2 having a recording reservation function are connected to the network and reservations do not exhibit an overlap in time. On the display section displayed in the form of a calendar, if a day of the week or a time zone on or in which a reservation is to be set is clicked, then, for example, such a recording reservation setting screen as shown in FIG. 36 is popup displayed. On the setting screen, each reservation item is set by the user.

Figure 19:
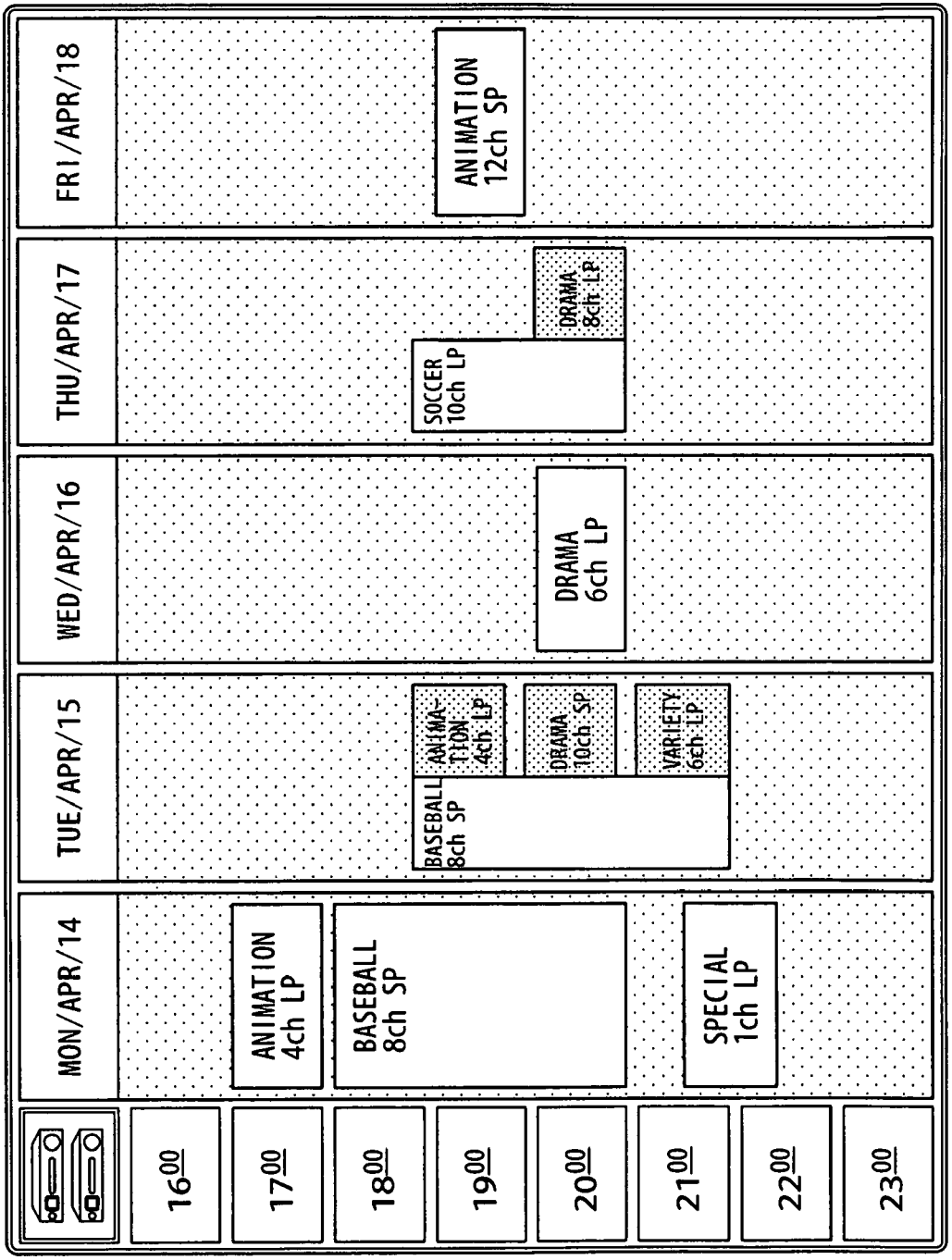

FIG. 19 shows a display example of a recording reservation setting screen on the information processing apparatus PSX 1 where reservation times of the two information processing apparatus PSX 1 and PSX 2 exhibit an overlap in time. In the example shown in FIG. 19, an overlap in reservation time can be seen, for example, in time zones of April 15 (Tuesday) 19:00 to 22:00 and April 17 (Thursday) 20:00 to 21:00.

An icon at the left upper corner of the screen indicates that, when a recording reservation setting is performed, two information processing apparatus are currently in a cooperable state and a recording reservation setting can be performed in an overlapping relationship with regard to up to two programs in the maximum. This displays the information of the item (3) given hereinabove. While cooperation only of two information processing apparatus is available in the example illustrated in FIG. 19, also it is possible to display information coordinated with a numeral of N when cooperation among N information processing apparatus is available. As measures for acquiring such information regarding those information processing apparatus which are to cooperate with each other as described above, for example, it is possible to issue an inquiry about the number of information processing apparatus which have a recording reservation function and are in a cooperable state to the master apparatus which stores apparatus information of all information processing apparatus. In this instance, it is necessary for the master apparatus to store which one or ones of the information processing apparatus on the network have a recording reservation function and are in a cooperable state upon execution of the MS manager or the capacity exchange program after the power supply is made available or in a like case. That a certain information processing apparatus has a cooperable recording reservation function refers, in other words, to the information processing apparatus having a function program for cooperable recording reservation.

Figure 20:
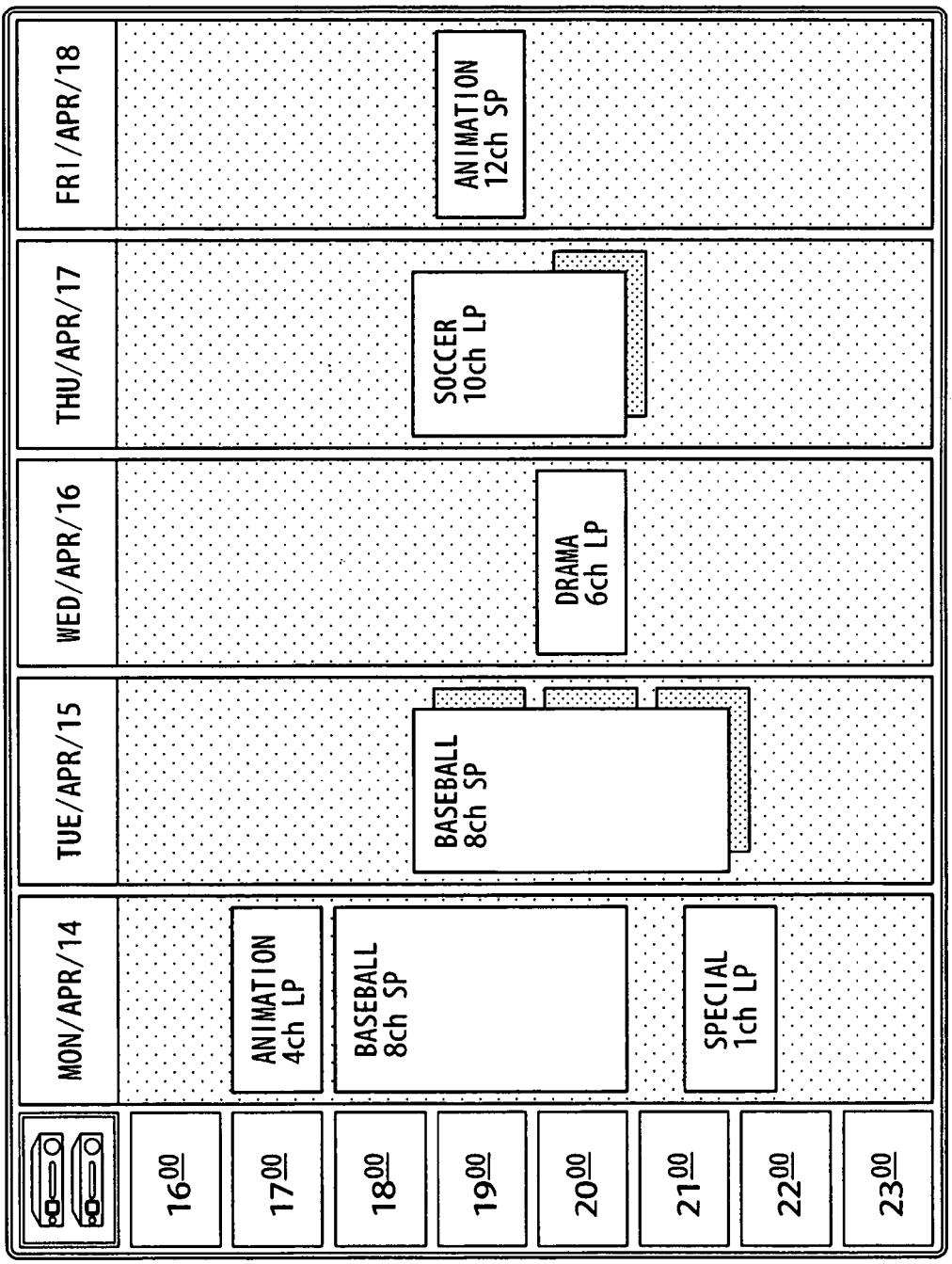
Figure 21:
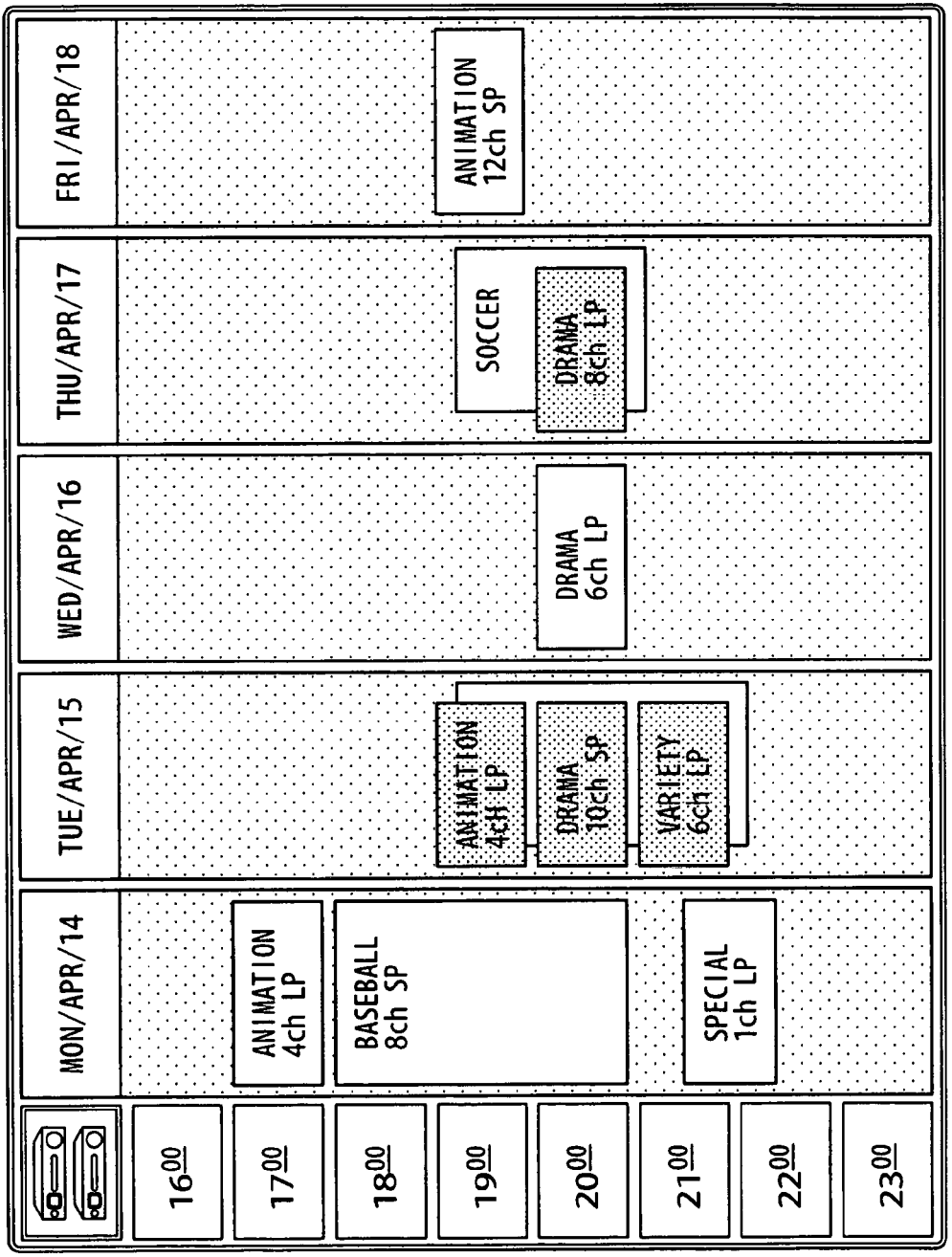

FIGS. 20 and 21 show different display forms where an overlap in reservation time is present on a recording reservation setting screen displayed in the form of a calendar similar to that of FIG. 19. However, recording reservation program information on the individual information processing apparatus is the same as that illustrated in FIG. 19.

In FIG. 20, recording reservation setting information which exhibits an overlap in time is layered to displaying such that recording reservation setting information of the information processing apparatus PSX 1 side is disposed on the front side while recording reservation setting information of the information processing apparatus PSX 2 side is disposed on the rear side. Similarly, in FIG. 21, recording reservation setting information of the information processing apparatus PSX 2 side is disposed on the front side while recording reservation setting information of the information processing apparatus PSX 1 side is disposed on the rear side. Naturally, the order in display of recording reservation program information may be switched in response to an operation of a button on a remote controller or the body of the information processing apparatus or by a user operation of some other toggle switch.

As described with reference to FIGS. 17 to 21, whichever one of the information processing apparatus on the network is operated by the user, recording reservation program information of all of the information processing apparatus is displayed in a merged fashion on a GUI screen. Accordingly, the user can operate one of the information processing apparatus to perform a setting operation for recording reservation considering the multiple information processing apparatus on the home network virtually as a single information processing apparatus and, consequently, the operability is improved significantly. Further, when the user wants to perform recording reservation setting of a number of programs within the same time zone, the user can confirm a reservation situation of or a free situation of a disk on another information processing apparatus on a GUI of a particular information processing apparatus and perform recording reservation setting for a further information processing apparatus.

In order to allow an information processing apparatus to merge recording reservation program information over the overall network to produce a GUI screen, packet communication for notifying another information processing apparatus of information regarding recording reservations is performed between information processing apparatus on the network. The packet communication may be performed at any of such timings as given below:

(1) when the power supply to the information processing apparatus is made available, or when the information processing apparatus is started after it is reset;

(2) when the information processing apparatus is newly connected to the network;

(3) when recording reservation setting information is updated on the information processing apparatus;

(4) after every fixed interval of time (after every 10 minutes or the like); and (5) when a request is received from a different information processing apparatus.

Now, an operation procedure wherein a number of information processing apparatus cooperate with each other on a network to perform recording reservation is described in detail.

Figure 22:
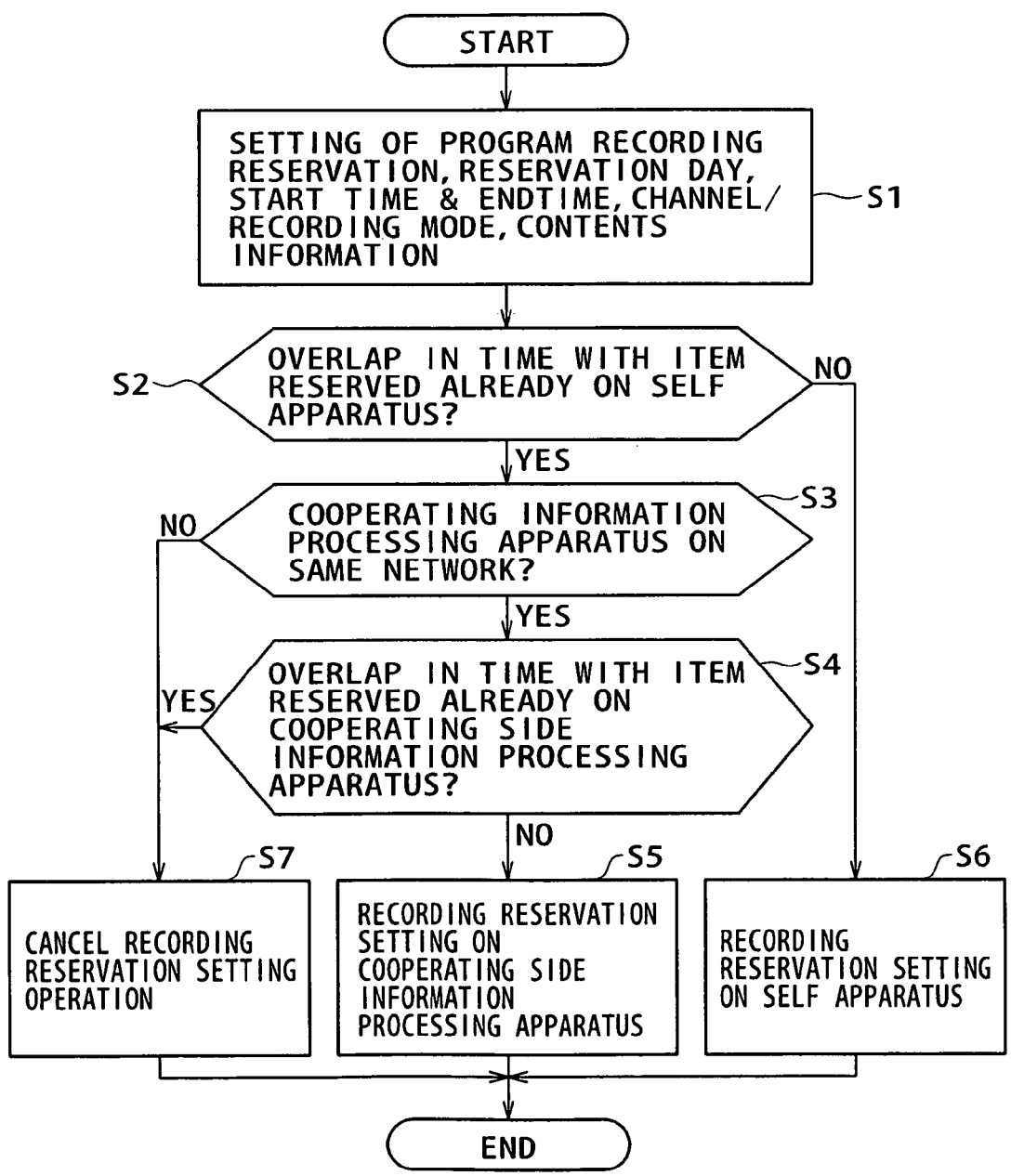
FIG. 22 is a flow chart illustrating a processing procedure when, in a network environment wherein a number of information processing apparatus having a recording reservation function are connected to each other, a user sets a recording reservation of a broadcasting program on a particular one of the information processing apparatus.

FIG. 22 shows a flow chart of a processing procedure wherein in a home network environment wherein a number of information processing apparatus having a recording reservation function are connected to each other, a user sets a recording reservation of a broadcasting program on a particular one of the information processing apparatus.

Referring to FIG. 22, the user would use an information processing apparatus to input program recording reservation setting information regarding the reservation data, start time and end time of recording, channel, recording mode, contents information and so forth (step S1).

The information processing apparatus first checks, in response to the program recording reservation setting input, whether or not the input exhibits an overlap in time with items already reserved on the information processing apparatus of the user (step S2).

If the newly inputted program recording reservation setting does not overlap with any of the items set for recording reservation, then the information processing apparatus sets a recording reservation on itself (step S6), and the present processing routine is ended.

On the other hand, if the newly inputted program recording reservation setting overlaps with any of the items set for recording reservation, then the information processing apparatus checks whether or not there exists an information processing apparatus with which the information processing apparatus can cooperate in recording reservation function on the network (step S4).

A procedure for discovering an information processing apparatus which is connected to the network and has a cooperable recording reservation function is implemented by starting of the master/slave manager and the capacity exchange program described hereinabove.

If it is discriminated that an information processing apparatus with which the information processing apparatus can cooperate in recording reservation function does not exist on the same network, then the recording reservation setting operation is canceled and the processing routine is ended.

On the other hand, if it is determined that an information processing apparatus with which the information processing apparatus can cooperate in recording reservation function exists on the same network, then it is further checked whether or not an item and time already reserved overlap on the different information processing apparatus with which the information processing apparatus cooperates in a recording reservation function on the network (step S4).

If an item and time already reserved overlap on the different information processing apparatus with which the information processing apparatus cooperates in a recording reservation function on the network, that is, if the recording reservation cannot also be set on the cooperating information processing apparatus side, the recording reservation setting operation is canceled (step S7), and this is presented to the user through a GUI screen or the like. Thereafter, the processing routine is ended.

On the other hand, if an item and time reserved do not already overlap on the different information processing apparatus with which the information processing apparatus cooperates in a recording reservation function on the network, that is, if the recording reservation can be set on the cooperating information processing apparatus side, then the recording reservation is set on the cooperating information processing apparatus (step S5). Thereafter, the processing routine is ended.

When a recording reservation is set on the cooperating information processing apparatus, the recording reservation program information over the overall network system is displayed in a merged form as described hereinabove with reference to FIGS. 17 to 21. Therefore, the user can perform the recording reservation setting operation considering the multiple information processing apparatus on the network virtually as a single information processing apparatus.

It is to be noted that a recording operation itself of a program set for a recording reservation does not have a direct relationship with the subject matter of the present invention and, therefore, description of the recording operation is omitted herein.

As such, a processing procedure as described above is executed, the multiple information processing apparatus on the network cooperate with each other and behavior as a virtual single information processing apparatus occurs. Accordingly, the user need not be conscious of an information processing apparatus placed at a different place but can operate an information processing apparatus located in front of the user as a virtually single information processing apparatus which includes the multiple information processing apparatus on the network.

Figure 23:
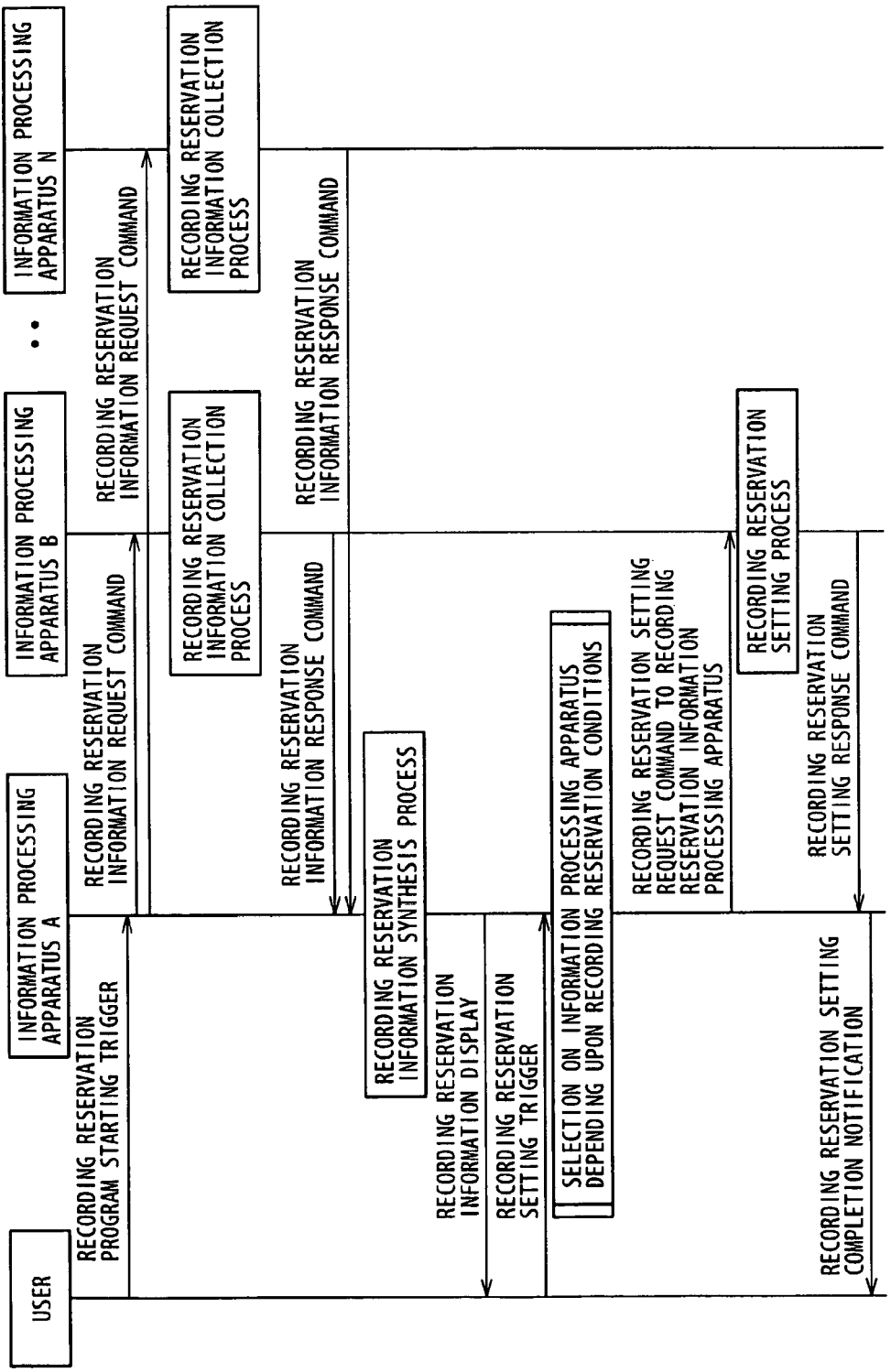
FIG. 23 is a sequence diagram illustrating an operation procedure in a case wherein a number of information processing apparatus having a recording reservation function are connected to each other by a network and, when a user performs a recording reservation setting operation on one of the information processing apparatus, recording reservation setting is finally performed on another one of the information processing apparatus.

Now, the operation executed at step S5 of FIG. 22 for setting a recording reservation on the cooperating information processing apparatus on the network is described in more detail. FIG. 23 illustrates an operation procedure where a number of information processing apparatus A to N having a recording reservation function are connected to a network and a user performs recording reservation setting operation on the information processing apparatus A whereas a recording reservation is finally set on the information processing apparatus B. It is to be noted, however, that a recording reservation program for performing recording reservation is one of the function programs loaded into the main memory of and executed by each information processing apparatus. Further, between the information processing apparatus, transfer of a command is performed in the form of a software cell.

The user would give a trigger to start the recording reservation program on the information processing apparatus A which is operated directly by the user.

In response to the trigger, the information processing apparatus A starts the recording reservation program on the information processing apparatus A itself and issues a request command for recording reservation information to the other information processing apparatus B to N.

Each of the information processing apparatus B to N receiving the request command for recording reservation information executes a process for collection of the recording reservation information including all of the recording reservation program information and returns the collected recording reservation information as a response command to the information processing apparatus A.

The information processing apparatus A receives the response commands of recording reservation information from the information processing apparatus B to N with which the information processing apparatus A cooperates on the network and synthesizes all of the recording reservation program information included in the received recording reservation information. Then, the information processing apparatus A displays the synthesized recording reservation program information in a merged form on a GUI screen as described with reference to FIGS. 17 to 12.

The user can perform recording reservation setting operation considering the multiple information processing apparatus A to N on the network as a virtual single information processing apparatus. Then, when the user wants to set a number of recording reservations of different programs within the same time zone, the user can confirm a recording reservation situation or a free situation of an external recording section of another information processing apparatus on a GUI on a certain information processing apparatus and perform recording reservation setting for a further information processing apparatus.

When a trigger for recording reservation setting is received from the user through a GUI screen, the information processing apparatus A executes an information processing apparatus selection process for selecting a cooperating information processing apparatus for which a recording reservation should be set in accordance with recording reservation setting conditions given thereto. A detailed procedure of the information processing apparatus selection process is hereinafter described.

In the example illustrated in FIG. 23, it is decided by the information processing apparatus selection process that a recording reservation setting should be performed on the information processing apparatus B. Accordingly, the information processing apparatus A issues a recording reservation setting request command to the information processing apparatus B.

The information processing apparatus B performs a recording reservation setting process in response to the recording reservation setting request command. Then, the information processing apparatus B returns a recording reservation setting response command to the information processing apparatus A of the source of the request. In response to reception of the response command, the information processing apparatus A notifies the user through a GUI screen that setting of the recording reservation is completed.

It is to be noted that the recording operation itself of a program set for a recording reservation does not have a direct relationship with the subject matter of the present invention and, therefore, description of the recording operation is omitted herein.

Figure 24:
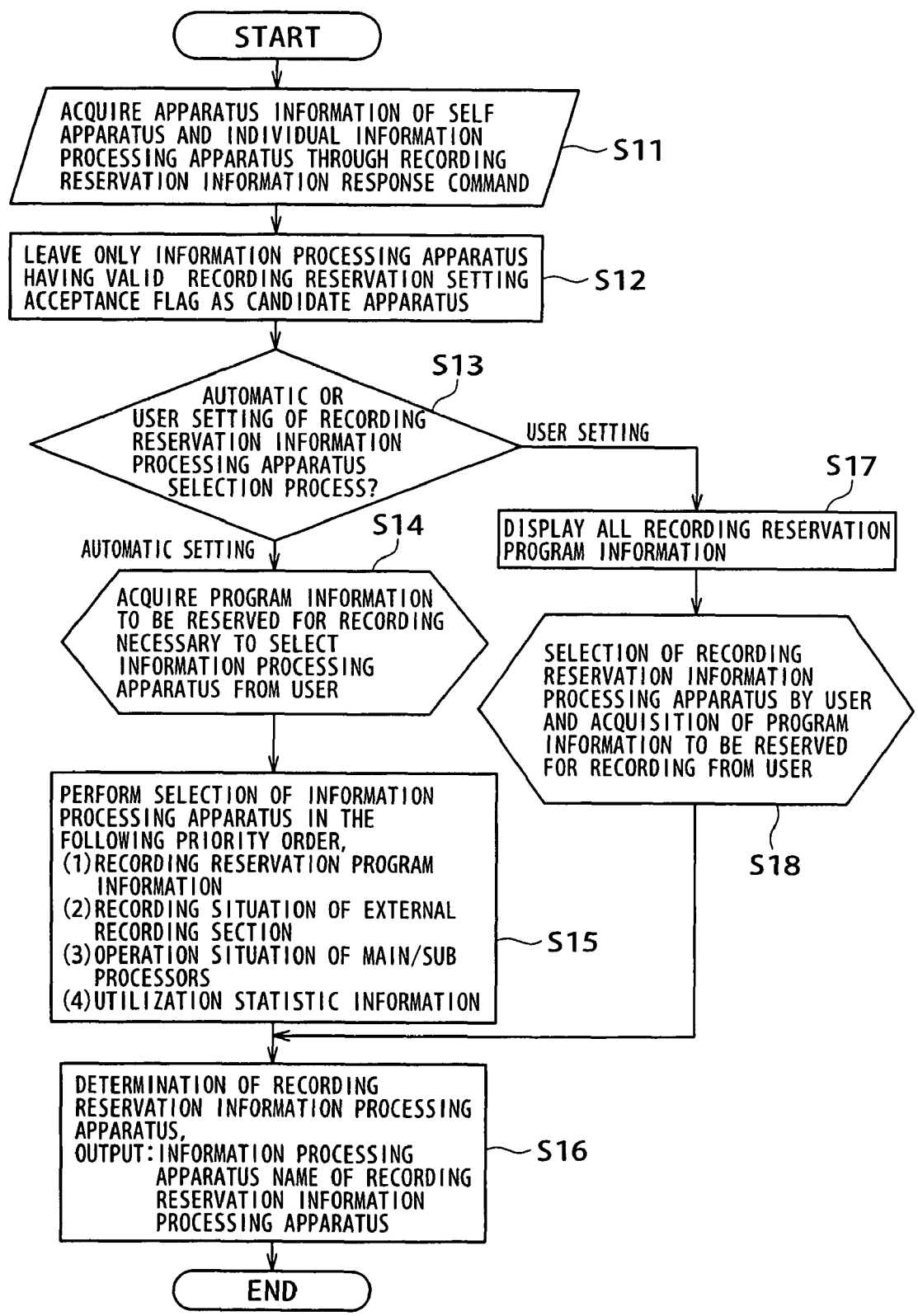
FIG. 24 is a flow chart illustrating a processing procedure for selecting one of information processing apparatus depending upon recording reservation conditions.

FIG. 24 shows a flow chart of a processing procedure for performing information processing apparatus selection depending upon recording reservation setting conditions.

An information processing apparatus on which a user performs a recording reservation setting operation acquires recording reservation information including all recording reservation program information of the self apparatus and of the different information processing apparatus with which the self apparatus cooperates in the recording reservation function through the network through the recording reservation information response commands from the different apparatus (step S11).

Figure 26:
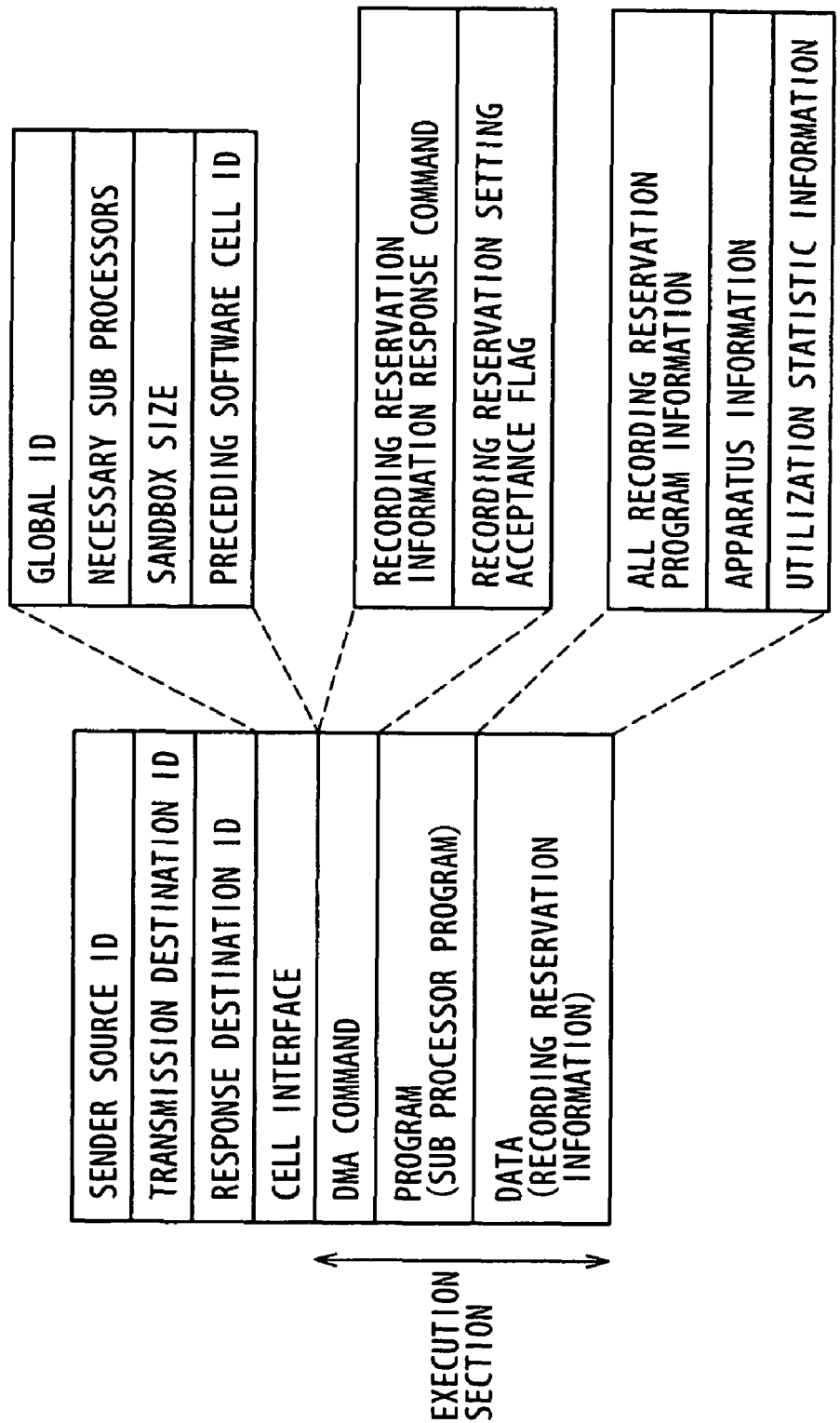
FIG. 26 is a view showing a software cell configuration of a recording reservation information response command used for setting of a recording reservation on an information processing apparatus on the cooperating side on a network.

While the recording reservation information handled here is hereinafter described, it includes a recording reservation setting acceptance flag, all recording reservation program information, apparatus information, utilization statistic information and so forth as seen in FIG. 26.

Each of the information processing apparatus cooperating through the network indicates, with the recording reservation setting acceptance flag thereof, whether or not recording reservation setting from a different information processing apparatus is accepted. The information processing apparatus of the source of the request leaves only those information processing apparatus whose recording reservation setting acceptance flag is in a validated state as candidate apparatus (step S12).

Then, the information processing apparatus discriminates whether the setting process of a recording reservation information processing apparatus should be performed automatically or by manual operation of a user (step S13).

When the setting process of a recording reservation information processing apparatus should be performed automatically, the information processing apparatus acquires program information to be reserved for recording which is necessary for selection of an information processing apparatus from the user (step S14). Then, the information processing apparatus selects an information processing apparatus which can record an acquired program in accordance with a predetermined priority order (step S115). The predetermined priority order is, for example, such as given below:

(1) recording reservation program information of each information processing apparatus;

(2) recording situation of an external recording section of each information processing apparatus;

(3) operation situation of the main processor and sub-processors of each information processing apparatus; and (4) utilization statistic information of each information processing apparatus.

On the other hand, when the setting process of a recording reservation information processing apparatus should be performed manually by the user, all of the recording reservation program information is displayed in a merged form as described hereinabove with reference to FIGS. 17 to 21 on a GUI screen of the information processing apparatus operated by the user (step S117). In addition to all of the recording reservation program information, apparatus information and utilization statistic information regarding the information processing apparatus on the network received as described above are displayed together. The user would select an information processing apparatus which the user regards most appropriate based on the displayed information and then input program information for recording reservation (step S18).

After a recording reservation information processing apparatus is decided by the automatic or manual procedure in this manner, a recording reservation setting request command is transmitted to the decided recording reservation information processing apparatus. Thereafter, the information processing apparatus name of the information processing apparatus determined after the recording reservation setting response commands are received is returned to the user (step S16), and then the processing routine is ended. Naturally, the self apparatus possibly may be decided as a recording reservation information processing apparatus.

Figure 25:
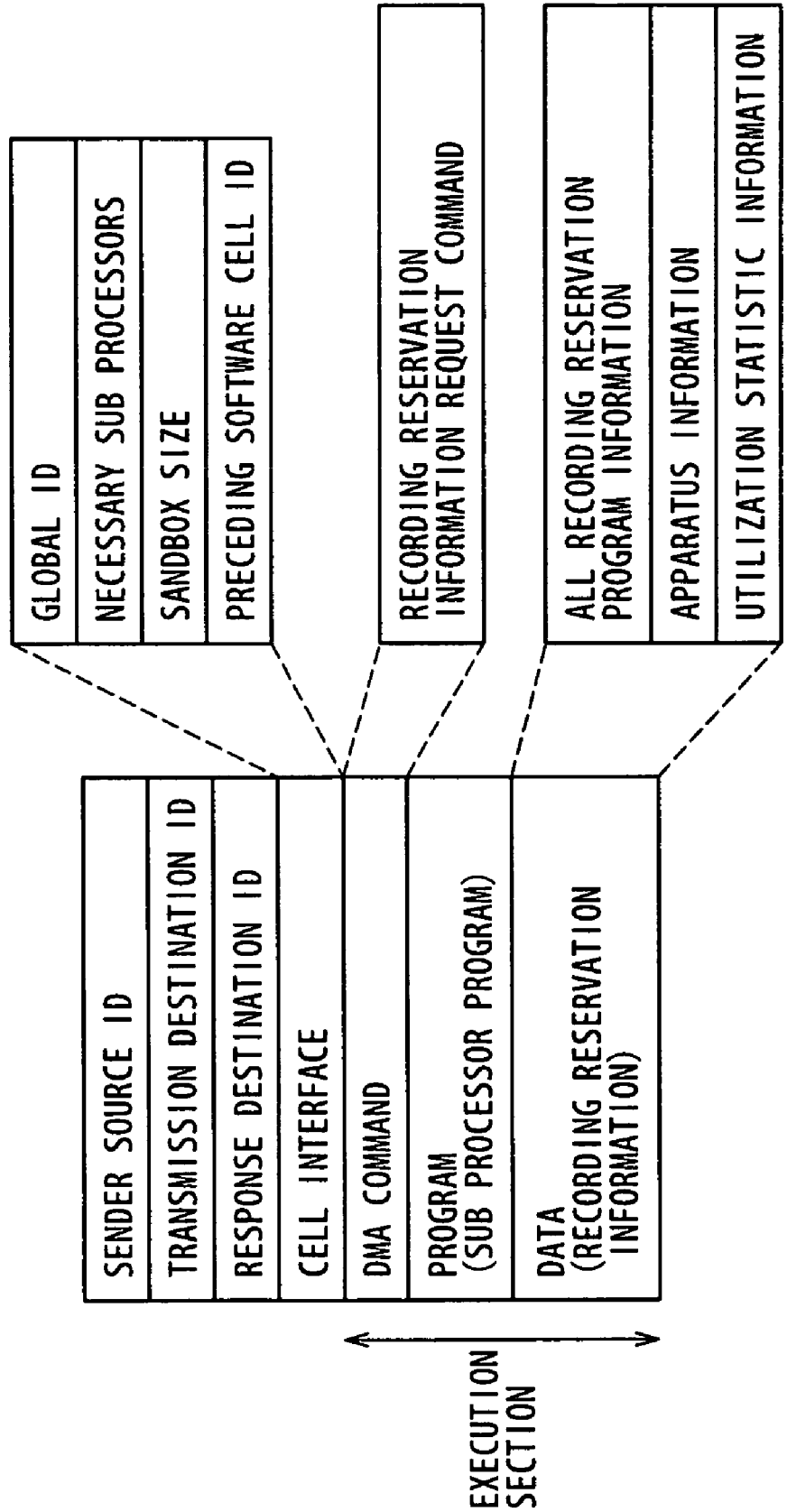
FIG. 25 is a view showing a software cell configuration of a recording reservation information request command used for setting of a recording reservation on an information processing apparatus on the cooperating side on a network.

FIG. 25 shows a software cell configuration of the recording reservation information request command. The software cell shown in FIG. 25 basically has the structure described hereinabove with reference to FIG. 3. The DMA command includes the recording reservation information request command. The program includes a recording reservation program and related sub-processor programs. Further, the data includes recording reservation information of the information processing apparatus from which the recording reservation information request command has been transmitted. The recording reservation information includes all recording reservation program information, apparatus information and utilization statistic information. The all recording reservation program information, apparatus information and utilization statistic information are hereinafter described.

FIG. 26 illustrates a configuration of a software cell of the recording reservation information response command. Also, the software cell illustrated in FIG. 26 basically has the structure described hereinabove with reference to FIG. 3. The DMA command includes a recording reservation information response command and a recording reservation setting acceptance flag. The program includes nothing. Further, the data includes recording reservation information of the information processing apparatus from which the recording reservation information response command has been transmitted. The recording reservation information in this instance includes all recording reservation program information, apparatus information and utilization statistic information.

Figure 27:
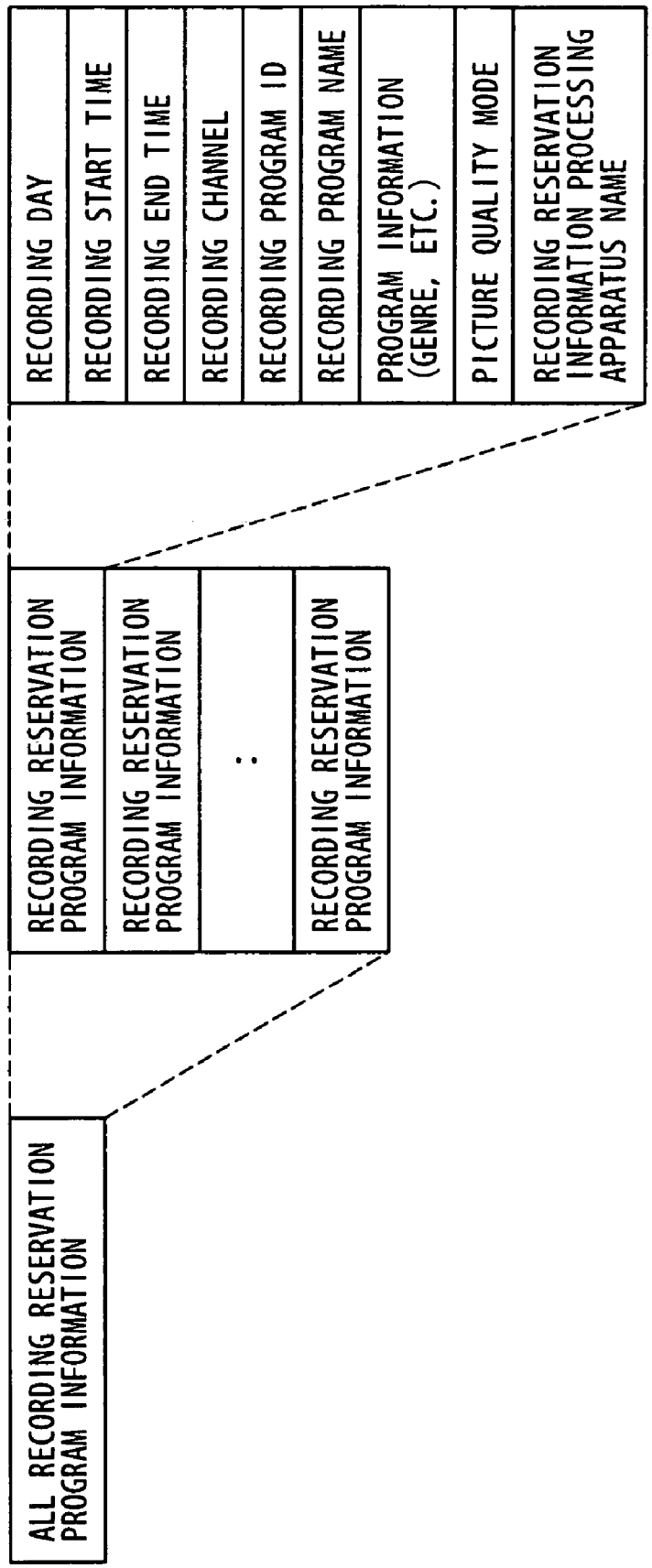
FIG. 27 is a view illustrating a configuration of all recording reservation program information included in data as recording reservation information.

Referring to FIG. 27, the all recording reservation program information includes a number of pieces of recording reservation program information corresponding to the number of programs reserved for recording. Each piece of the recording reservation program information includes fields for describing the recording reservation day, recording start time, recording end time, recording channel, recording program ID, recording program name, program information (genre and so forth), picture quality mode and recording reservation information processing apparatus name of the pertaining recording reservation.

Further, FIG. 28 shows a configuration of the apparatus information included in the data as the recording reservation information. The apparatus information illustrated in FIG. 28 includes fields having a structure the same as that described hereinabove with reference to FIG. 4.

FIG. 29 shows a configuration of the utilization statistic information included in the data as the recording reservation information. As seen in FIG. 29, the utilization statistic information includes fields for describing viewing information of channels for each hour, sound volume upon viewing, recording reservation information of channels for each hour, changing numbers of times of channels for each hour, genres of viewing for each hour and category information for each hour.

FIG. 30 shows a software cell configuration of the recording reservation information request command. The software cell shown in FIG. 30 basically has a structure described hereinabove with reference to FIG. 3. The DMA command includes the recording reservation setting request command. The program includes nothing. The data includes recording reservation setting program information and indicates recording reservation program information of a program to be set for recording reservation. Details of the recording reservation program information are such as described hereinabove with reference to FIG. 27.

FIG. 31 shows a software cell configuration of the recording reservation setting response command. The software cell shown in FIG. 31 basically has a structure described hereinabove with reference to FIG. 3. The DMA command includes the recording reservation setting response command. The program includes nothing. The data includes recording reservation setting program information and indicates recording reservation program information of a program set for recording reservation. Details of the recording reservation program information are such as described hereinabove with reference to FIG. 27. Further, the recording reservation setting program information includes a flag representative of whether the setting results in success or failure.

Now, operation when setting of a recording reservation is impossible through the processing procedure described hereinabove with reference to FIG. 22 is described. FIG. 32 illustrates an operation procedure where a number of information processing apparatus A to N having a recording reservation function are connected to a network and, although a user performs a recording reservation setting operation on the information processing apparatus A, a recording reservation cannot finally be set on any of the information processing apparatus A to N. It is to be noted, however, that a recording reservation program for performing recording reservation is one of the function programs loaded into the main memory of and executed by each information processing apparatus. Further, between the information processing apparatus, transfer of a command is performed in the form of a software cell.

The user would give a trigger to start the recording reservation program on the information processing apparatus A which is operated directly by the user.

In response to the trigger, the information processing apparatus A starts the recording reservation program on the information processing apparatus A itself and issues a request command for recording reservation information to the other information processing apparatus B to N.

Each of the information processing apparatus B to N receiving the request command for recording reservation information executes a process for collection of recording reservation information including all of the recording reservation program information and returns the collected recording reservation information as a response command to the information processing apparatus A.

The information processing apparatus A receives the response commands of recording reservation information from the information processing apparatus B to N with which the information processing apparatus A cooperates on the network and synthesizes all of the recording reservation program information included in the received recording reservation information. Then, the information processing apparatus A displays the synthesized recording reservation program information in a merged form on a GUI screen as described with reference to FIGS. 17 to 21.

The user can perform a recording reservation setting operation considering the multiple information processing apparatus A to N on the network as a virtual single information processing apparatus. Then, when the user wants to set a number of recording reservations of different programs in the same time zone, the user can confirm a recording reservation situation or a free situation of an external recording section of another information processing apparatus on a GUI on a certain information processing apparatus and perform recording reservation setting for a further information processing apparatus.

However, in this instance, execution of such a selection process of an information processing apparatus for performing recording reservation as described hereinabove with reference to FIG. 24 results in failure. The cause of the failure may be that the program designated by the user for recording reservation overlaps in time with items reserved already on all of the cooperating information processing apparatus, that a sufficient free area of an external recording section cannot be obtained with any information processing apparatus or that the recording reservation setting acceptance flag is in an invalidated state with regard to all of the information processing apparatus.

In this instance, the slave apparatus A notifies the user through a GUI screen that the desired recording reservation is impossible with all of the information processing apparatus.

Now, operation for canceling a recording reservation set once by such cooperation between information processing apparatus (refer to FIG. 23) as described hereinabove on a network is described in more detail. FIG. 33 illustrates an operation procedure where a number of information processing apparatus A to N having a recording reservation function are connected to a network and, although a user performs a recording reservation setting operation on the information processing apparatus A, the recording reservation is finally canceled. It is to be noted, however, that a recording reservation program for performing recording reservation is one of the function programs loaded into the main memory of and executed by each information processing apparatus. Further, between the information processing apparatus, a command is transferred in the form of a software cell as described hereinabove.

The user would give a trigger to start the recording reservation cancel program on the information processing apparatus A which is operated directly by the user.

In response to the trigger, the information processing apparatus A starts the recording reservation program on the information processing apparatus A itself and issues a request command for recording reservation information to the other information processing apparatus B to N.

Each of the information processing apparatus B to N receiving the request command for recording reservation information executes a process for collection of recording reservation information including all of the recording reservation program information and returns the collected recording reservation information as a response command to the information processing apparatus A.

The information processing apparatus A receives the response commands of recording reservation information from the information processing apparatus B to N with which the information processing apparatus A cooperates on the network and synthesizes all of the recording reservation program information included in the received recording reservation information. Then, the information processing apparatus A displays the synthesized recording reservation program information in a merged form on a GUI screen as described with reference to FIGS. 17 to 21.

The user can perform a cancellation operation of a recording reservation considering the multiple information processing apparatus A to N on the network as a virtual single information processing apparatus.

If the information processing apparatus A receives a trigger for canceling a recording reservation from the user through the GUI screen, then it executes a specification process of a recording reservation information processing apparatus. The specification process of a recording reservation information processing apparatus performed here is a process of an information processing apparatus on which the program whose recording reservation has been cancelled by the user was set for recording reservation formerly based on the recording reservation information processing apparatus name in the recording reservation program information included in the recording reservation information response command.

In the example illustrated in FIG. 33, it is decided by the information processing apparatus selection process that cancellation of a recording reservation should be performed on the information processing apparatus B. Accordingly, the information processing apparatus A issues a recording reservation cancel request command to the information processing apparatus B.

In response to the recording reservation cancel request command, the information processing apparatus B performs a recording reservation cancel process. Then, the information processing apparatus B returns a recording reservation cancel response command to the information processing apparatus A which is a source of the request. Where the information processing apparatus A receives the response command, it notifies the user through a GUI screen that the cancellation of the recording reservation is completed.

FIG. 34 shows a software cell configuration of the recording reservation cancel request command used to cancel a recording reservation set once through cooperation between information processing apparatus on a network. The software cell illustrated in FIG. 34 basically has a structure described hereinabove with reference to FIG. 3. The DMA command includes the recording reservation cancel request command. The program includes the recording reservation cancel program. Further, the data includes recording reservation program information which describes information of a program whose recording reservation is to be canceled by the user. Details of the recording reservation program information are such as described hereinabove with reference to FIG. 27.

FIG. 35 illustrates a software cell configuration of the recording reservation cancel response command used to cancel a recording reservation set once through cooperation between information processing apparatus on a network. The software cell illustrated in FIG. 35 basically has a structure described hereinabove with reference to FIG. 3. The DMA command includes the recording reservation cancel response command and a recording reservation cancel result flag. In the recording reservation cancel result flag, 1 is placed when the recording reservation cancel process results in success, and 0 is placed when the recording result reservation cancel process results in failure.

Although the present invention has been described with reference to specific embodiments, those of skill in the art will recognize that changes may be made thereto without departing from the spirit and scope of the present application as set forth in the hereafter appended claims.

The invention claimed is:

1. An information processing system wherein a first apparatus having a first recording reservation function cooperates with a second apparatus having a second recording reservation function on a network, the information processing system comprising:

a recording reservation information collection section for acquiring recording reservation information of the apparatuses;

a recording reservation information synthesis section for synthesizing the acquired recording reservation information of the apparatuses;

a recording reservation information display section for displaying the recording reservation information of the apparatuses in a merged form on a same recording reservation information presentation screen;

a user inputting section for inputting a request from a user regarding a recording reservation through the first apparatus, wherein in response to said request being input:

(a) said first apparatus transmits operation information to the second apparatus using a software cell; and (b) said second apparatus selects a function program in accordance with said transmitted operation information; and an apparatus comparing section for comparing apparatus information with required specifications necessary for execution of a recording function, wherein the second apparatus specifies the first apparatus to execute the recording function.

2. The information processing system according to claim 1, wherein the recording reservation information includes a reservation day, start time and end time of the recording, a channel, a reservation recording mode, a program name or genre and identification information of one of the apparatuses on which the reservation is made.

3. The information processing system according to claim 1, wherein the recording reservation information display section displays the recording reservation information of the apparatuses in accordance with a time series.

4. The information processing system according to claim 1, wherein the recording reservation information display section displays each of individual pieces of the recording reservation information of the individual apparatus at a place of a pertaining reservation date and a reservation time zone on a table screen displayed in a calendar form thereon.

5. The information processing system according to claim 4, wherein the recording reservation information display section displays, where different pieces of the recording reservation information of the apparatuses exhibit an overlap in reservation time, the individual pieces of the recording reservation information parallelly in a same reservation time zone of the table screen.

6. The information processing system according to claim 4, wherein the recording reservation information display section displays, where different pieces of the recording reservation information of the apparatuses exhibit an overlap in reservation time, the individual pieces of the recording reservation information in a layered overlapping relationship in a same reservation time zone of the table screen.

7. The information processing system according to claim 1, wherein the recording reservation information display section displays pieces of the recording reservation information corresponding to the individual apparatus on which the recording reservations are set in at least one of different colors and different displaying manners on the table screen.

8. The information processing system according to claim 1, wherein the recording reservation information display section displays that a cooperable apparatus exists on the network.

9. The information processing system according to claim 1, wherein the recording reservation information display section displays that cooperative operation with another apparatus on the network is proceeding.

10. The information processing system according to claim 1, wherein the user inputs the request regarding the recording reservation through the recording reservation information presentation screen presented by any of the apparatuses connected to the network.

11. The information processing system according to claim 10, further comprising a recording reservation setting section for specifying, in response to the input of the recording reservation request through the user inputting section, that a third apparatus on which a recording reservation should be set through the network, in accordance with a predetermined recording reservation condition.

12. The information processing system according to claim 11, wherein the recording reservation setting section performs selection of an apparatus depending upon the recording reservation condition has a recording reservation already set in a time zone overlapping with a time zone of the recording reservation request, has a sufficient free recording capacity to perform the reservation recording, and is in a state wherein the cooperating side apparatus can accept the recording reservation setting.

13. The information processing system according to claim 10, further comprising a recording reservation cancellation section for specifying, in response to a cancellation request for a recording reservation inputted through the user inputting section, from among those of the apparatuses which cooperate in the recording reservation function through the network, the apparatus on which the recording reservation whose cancellation is requested has been set to perform a cancellation process of the recording reservation.

14. An information processing method for allowing a first apparatus having a first recording reservation function to cooperate with a second apparatus having a second recording reservation function on a network, the information processing method comprising:

a recording reservation information collection step of acquiring recording reservation information of the apparatuses;

a recording reservation information synthesis step of synthesizing the acquired recording reservation information of the apparatuses;

a recording reservation information display step of displaying the recording reservation information of the apparatuses in a merged form on a same recording reservation information presentation screen;

a user inputting step of inputting a request from a user regarding a recording reservation through the first apparatus, wherein in response to said request being input:

(a) said first apparatus transmits operation information to the second apparatus using a software cell; and (b) said second apparatus selects a function program in accordance with said transmitted operation information; and an apparatus comparing step for comparing apparatus information with required specifications necessary for execution of a recording function, wherein the second apparatus specifies the second apparatus to execute the recording function.

15. The information processing method according to claim 14, wherein the recording reservation information includes a reservation day, start time and end time of the recording, a channel, a reservation recording mode, a program name or genre and identification information of one of the apparatuses on which the reservation is made.

16. The information processing method according to claim 14, wherein, at the recording reservation information display step, the recording reservation information of the apparatuses is displayed in lines in accordance with a time series.

17. The information processing method according to claim 14, wherein, at the recording reservation information display step, each of individual pieces of the recording reservation information of an individual apparatus is displayed at a place of a pertaining reservation date and a reservation time zone on a table screen displayed in calendar form.

18. The information processing method according to claim 17, wherein, at the recording reservation information display step, where different pieces of the recording reservation information of the apparatuses exhibit an overlap in reservation time, the different pieces of the recording reservation information are displayed parallelly in a same reservation time zone of the table screen.

19. The information processing method according to claim 17, wherein, at the recording reservation information display step, where different pieces of the recording reservation information of the apparatuses exhibit an overlap in reservation time, the different pieces of the recording reservation information are displayed in a layered overlapping relationship in a same reservation time zone of the table screen.

20. The information processing method according to claim 14, wherein, at the recording reservation information display step, pieces of the recording reservation information corresponding to an individual apparatus on which the recording reservations are set are displayed in at least one of different colors and different displaying manners on the table screen.

21. The information processing method according to claim 14, wherein, at the recording reservation information display step, it is displayed that a cooperable apparatus exists on the network.

22. The information processing method according to claim 14, wherein, at the recording reservation information display step, it is displayed that cooperative operation with another apparatus on the network is proceeding.

23. The information processing method according to claim 14, wherein the user inputs the request regarding the recording reservation through the recording reservation information presentation screen presented by any of the apparatuses connected to the network.

24. The information processing method according to claim 23, further comprising a recording reservation setting step of specifying, in response to the input of the recording reservation request through the user inputting step, that a third apparatus on which a recording reservation should be set in accordance with a predetermined recording reservation condition.

25. The information processing method according to claim 24, wherein, at the recording reservation setting step, selection of an apparatus is performed depending upon the recording reservation condition that a cooperating side of one the apparatuses has a recording reservation already set in a time zone overlapping with a time zone of the recording reservation request, has a sufficient free recording capacity to perform the reservation recording, and is in a state wherein the cooperating side apparatus can accept the recording reservation setting.

26. The information processing method according to claim 23, further comprising a recording reservation cancellation step of specifying, in response to a cancellation request for a recording reservation inputted through the user inputting step, from among those of the apparatuses which cooperate in the recording reservation function through the network, the apparatus on which the recording reservation whose cancellation is requested has been set to perform a cancellation process of the recording reservation.

27. A non-transitory computer readable medium encoded with a computer readable program for enabling a computer system to execute a process for allowing a first apparatus having a first recording reservation function to cooperate with a second apparatus having a second recording reservation function on a network, the computer readable program structured to cause the computer system to:

acquire recording reservation information of the apparatuses;

synthesize the acquired recording reservation information of the apparatuses;

display the recording reservation information of the apparatuses in a merged form on a same recording reservation information presentation screen;

input a request from a user regarding a recording reservation through the first apparatus, wherein in response to said request being input:

(a) said first apparatus transmits operation information to the second apparatus using a software cell; and (b) said second apparatus selects a function program in accordance with said transmitted operation information; and compare apparatus information with required specifications necessary for execution of a recording function, wherein the second apparatus specifies the first apparatus to execute the recording function.

28. The information processing system according to claim 1, further comprising a master/slave manager section for automatically setting the second apparatus as the master apparatus and the first apparatus as the slave apparatus after the first apparatus or the second apparatus is connected to the network.

29. The information processing method according to claim 14, further comprising a master/slave manager step for automatically setting the second apparatus as the master apparatus and the first apparatus as the slave apparatus after the first apparatus or the second apparatus is connected to the network.

30. The non-transitory computer readable medium encoded with a computer readable program according to claim 27, the computer readable program further structured to cause the computer system to automatically set the second apparatus as the master apparatus and the first apparatus as the slave apparatus after the first apparatus or the second apparatus is connected to the network.

* * * * *